United States Patent
Jayaram et al.

(10) Patent No.: US 11,601,498 B2
(45) Date of Patent: Mar. 7, 2023

(54) RECONCILIATION OF DATA STORED ON PERMISSIONED DATABASE STORAGE ACROSS INDEPENDENT COMPUTING NODES

(71) Applicant: Baton Systems, Inc., Fremont, CA (US)

(72) Inventors: Arjun Jayaram, Fremont, CA (US); Mohammad Taha Abidi, San Ramon, CA (US); Sumithra Kamalapuram Sugavanam, Sunnyvale, CA (US); James William Perry, San Carlos, CA (US)

(73) Assignee: Baton Systems, Inc., Fremont, CA (US)

( * ) Notice: Subject to any disclaimer, the term of this patent is extended or adjusted under 35 U.S.C. 154(b) by 0 days.

(21) Appl. No.: 17/217,956

(22) Filed: Mar. 30, 2021

(65) Prior Publication Data
US 2021/0352142 A1 Nov. 11, 2021

Related U.S. Application Data

(63) Continuation-in-part of application No. 15/701,313, filed on Sep. 11, 2017, now abandoned, and a
(Continued)

(51) Int. Cl.
*G06Q 20/40* (2012.01)
*H04L 9/40* (2022.01)
(Continued)

(52) U.S. Cl.
CPC ........ *H04L 67/1091* (2013.01); *H04L 47/782* (2013.01); *H04L 63/0435* (2013.01); *H04L 67/1089* (2013.01)

(58) Field of Classification Search
None
See application file for complete search history.

(56) References Cited

U.S. PATENT DOCUMENTS

| | | | |
|---|---|---|---|
| 6,061,692 | A | 5/2000 | Thomas et al. |
| 7,219,082 | B2 | 5/2007 | Forte |

(Continued)

FOREIGN PATENT DOCUMENTS

| | | | | |
|---|---|---|---|---|
| WO | 2015171580 A1 | | 11/2015 | |
| WO | WO 2016155625 A1 | * | 3/2016 | ......... G06Q 30/0239 |

(Continued)

OTHER PUBLICATIONS

Author: Gareth Peters Title : Understanding Modern Banking Ledgers through Blockchain Technologies: Future of Transaction Processing and Smart Contracts on the Internet of Money Date : Nov. 19, 2015 (Year: 2015).*

(Continued)

*Primary Examiner* — Alexander G Kalinowski
*Assistant Examiner* — Bhavin D Shah
(74) *Attorney, Agent, or Firm* — TechLaw Ventures, PLLC; Terrence J. Edwards

(57) ABSTRACT

Reconciliation and subscription-model permissions of data stored across independent ledger instances of a database. A system includes a resource manager coupled to a plurality of client accounts. The system includes an execution platform and a shared permissioned ledger comprising independent processing and storage nodes for executing data operations for the plurality of client accounts. The resource manager defines a settlement group comprising one or more client accounts and authenticates an observer node associated with the settlement group. The resource manager assigns ingested data an encryption level on a key hierarchy based on content of the ingested data.

19 Claims, 36 Drawing Sheets

Related U.S. Application Data continuation-in-part of application No. 15/702,684, filed on Sep. 12, 2017, now abandoned, application No. 17/217,956, which is a continuation-in-part of application No. 15/923,961, filed on Mar. 16, 2018, now abandoned, which is a continuation-in-part of application No. 15/701,313, filed on Sep. 11, 2017, now abandoned, application No. 17/217,956, which is a continuation-in-part of application No. 15/969,715, filed on May 2, 2018, now abandoned.

(60) Provisional application No. 62/393,395, filed on Sep. 12, 2016, provisional application No. 62/393,399, filed on Sep. 12, 2016, provisional application No. 62/472,891, filed on Mar. 17, 2017, provisional application No. 62/500,314, filed on May 2, 2017.

(51) Int. Cl.
*H04L 67/1087* (2022.01)
*H04L 47/78* (2022.01)

(56) References Cited

U.S. PATENT DOCUMENTS

| | | | |
|---|---|---|---|
| 7,574,389 B2 | 8/2009 | Anuszewski et al. | |
| 7,599,888 B2 | 10/2009 | Manfre et al. | |
| 7,752,132 B2 | 7/2010 | Stewart et al. | |
| 7,996,296 B2 * | 8/2011 | Lange | G06Q 40/08 705/37 |
| 10,515,409 B2 | 12/2019 | Creighton, IV et al. | |
| 2002/0178102 A1 * | 11/2002 | Scheinberg | G06Q 40/04 705/37 |
| 2008/0172314 A1 | 7/2008 | Hahn-Carlson | |
| 2009/0287601 A1 | 11/2009 | Tumminaro et al. | |
| 2010/0138325 A1 | 6/2010 | Hahn-Carlson | |
| 2011/0106675 A1 | 5/2011 | Perlman | |
| 2013/0332351 A1 | 12/2013 | Imrey et al. | |
| 2014/0114852 A1 | 4/2014 | Rajagopal et al. | |
| 2014/0222712 A1 * | 8/2014 | Samaha | G06Q 10/00 705/342 |
| 2014/0279384 A1 * | 9/2014 | Loevenich | G06Q 40/025 705/38 |
| 2015/0081566 A1 | 3/2015 | Slepinin | |
| 2015/0154570 A1 | 6/2015 | Dheer | |
| 2015/0170112 A1 | 6/2015 | DeCastro | |
| 2015/0278816 A1 | 10/2015 | Fleishman et al. | |
| 2015/0278820 A1 | 10/2015 | Meadows | |
| 2015/0287026 A1 | 10/2015 | Yang et al. | |
| 2015/0332256 A1 | 11/2015 | Minor | |
| 2015/0332395 A1 * | 11/2015 | Walker | G06Q 20/06 705/69 |
| 2015/0363778 A1 | 12/2015 | Ronca et al. | |
| 2015/0371224 A1 | 12/2015 | Lingappa | |
| 2016/0224995 A1 * | 8/2016 | Brookfield | G06Q 30/0201 |
| 2016/0226915 A1 | 8/2016 | Avesand et al. | |
| 2016/0260169 A1 | 9/2016 | Arnold et al. | |
| 2016/0260171 A1 * | 9/2016 | Ford | G06Q 20/389 |
| 2017/0039330 A1 | 2/2017 | Tanner, Jr. et al. | |
| 2017/0046526 A1 | 2/2017 | Chan et al. | |
| 2017/0109735 A1 | 4/2017 | Sheng et al. | |
| 2017/0316391 A1 | 11/2017 | Peikert et al. | |
| 2018/0075422 A1 | 3/2018 | Jayaram et al. | |
| 2018/0075536 A1 | 3/2018 | Jayaram et al. | |
| 2018/0204216 A1 | 7/2018 | Jayaram et al. | |
| 2018/0322485 A1 | 11/2018 | Jayaram et al. | |
| 2019/0050856 A1 * | 2/2019 | Vintila | G06F 16/27 |

FOREIGN PATENT DOCUMENTS

| | | |
|---|---|---|
| WO | 2018049358 A1 | 3/2018 |
| WO | 2018049423 A1 | 3/2018 |
| WO | 2018170469 A1 | 9/2018 |
| WO | 2018204548 A1 | 11/2018 |

OTHER PUBLICATIONS

"European Search Report and Written Opinion Received for PCT Application No. PCT/US2017/051026," dated Apr. 8, 2020, 8 Pages.

"European Search Report and Written Opinion Received for PCT Application No. PCT/US2017/051231," dated Apr. 9, 2020, 7 Pages.

"International Search Report and Written Opinion Received for PCT Application No. PCT/US2017/051026," dated Nov. 27, 2017, 3 Pages.

"International Search Report and Written Opinion Received for PCT Application No. PCT/US2017/051231," dated Nov. 17, 2017, 7 Pages.

Nakamato, Satoshi, "Bitcoin: A Peer-to-Peer Electronic Cash System," www.bitcoin.org, 2008, 9 pages.

"Singapore Search Report and Written Opinion for Application No. 11201903092W," dated Apr. 21, 2020, 6 Pages.

"Singapore Search Report and Written Opinion for Application No. 11201903098X," dated Apr. 21, 2020, 7 Pages.

"International Search Report and Written Opinion Received for PCT Application No. PCT/US2018/22992," dated May 24, 2018, 8 Pages.

"European Search Report and Written Opinion Received for PCT Application No. PCT/US2018/022992," dated Nov. 26, 2020, 7 Pages.

International Search Report and Written Opinion Received for PCT Application No. PCT/USUS18/30741, dated Aug. 9, 2018, 6 Pages.

* cited by examiner

RECONCILIATION OF DATA STORED ON PERMISSIONED DATABASE STORAGE ACROSS INDEPENDENT COMPUTING NODES

CROSS-REFERENCE TO RELATED APPLICATIONS

This application is a continuation-in-part of U.S. patent application Ser. No. 15/701,313, filed Sep. 11, 2017, which claims the benefit of U.S. Provisional Patent Application No. 62/393,395, filed on Sep. 12, 2016, and claims the benefit of U.S. Provisional Patent Application No. 62/393,399, filed Sep. 12, 2016; and this application is also a continuation-in-part of U.S. patent application Ser. No. 15/702,684, filed Sep. 12, 2017, which claims the benefit of U.S. Provisional Patent Application No. 62/393,399, filed on Sep. 12, 2016, and claims the benefit of U.S. Provisional Patent Application No. 62/393,395, filed Sep. 12, 2016; this application is also a continuation-in-part of U.S. patent application Ser. No. 15/923,961, filed Mar. 16, 2018, which claims the benefit of U.S. Provisional Patent Application No. 62/472,891, filed Mar. 17, 2017, and which is a continuation-in-part of U.S. patent application Ser. No. 15/701,313, filed Sep. 11, 2017, which claims the benefit of U.S. Provisional Patent Application No. 62/393,399, filed on Sep. 12, 2016, and claims the benefit of U.S. Provisional Patent Application No. 62/393, 395, filed Sep. 12, 2016; and this application is also a continuation-in-part of U.S. patent application Ser. No. 15/969,715, filed May 2, 2018, which claims the benefit of U.S. Provisional Patent Application No. 62/500,314, filed May 2, 2017. The aforementioned patent applications are incorporated herein by reference in their entireties, including but not limited to those portions that specifically appear hereinafter, the incorporation by reference being made with the following exception: In the event that any portion of the above-referenced patent applications is inconsistent with this application, this application supersedes the above-referenced patent applications.

TECHNICAL FIELD

The present disclosure relates to permissioned database storage across ledger instances and specifically to reconciliation of data entries.

BACKGROUND

Numerous industries generate and output data in high volumes that can become unmanageable for ingestion, analysis, and storage. Example industries generating high-volume data entries include, for example, retail industries generating transactional data, financial industries executing trades between parties, research and development industries receiving sensor data, and so forth. Traditional systems for data ingestion, analysis, and storage are complicated by processing and storage constraints. These traditional systems experience high latency when different data output nodes provide data at different volume rates over time. In some industries, it can be critical to ingest and assess enormous sums of data in near real-time.

In some cases, and particularly in the financial transaction industry, it can be important for multiple parties to ingest and assess incoming data in near real-time. In traditional transactional systems, executing a transaction between two or more counterparties can take several days because each of the two or more counterparties must analyze large sums of data to determine obligations and exposures before settling the transaction. The delay in executing transactions between counterparties is associated with the latency in processing and storage resources for assessing incoming, up-to-date transactional data. Additionally, most transactions can only be executed during business hours when various entities such as banks, clearinghouses, and exchanges are open and operating. This is due at least in part to the individualized data analysis performed by the counterparties.

What is needed are centralized data ingestion, analysis, and storage resources for multiple parties that cannot share data for security reasons but must coordinate actions based on data analysis. In light of the foregoing, disclosed herein are systems, methods, and devices for near real-time analysis of information consumed by high-throughput data ingestion. Additionally, disclosed herein are systems, methods, and devices for partitioning data in a database for secured, permissioned access such that the data can be assessed by independent nodes for coordinating actions between parties.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

Figure 1:
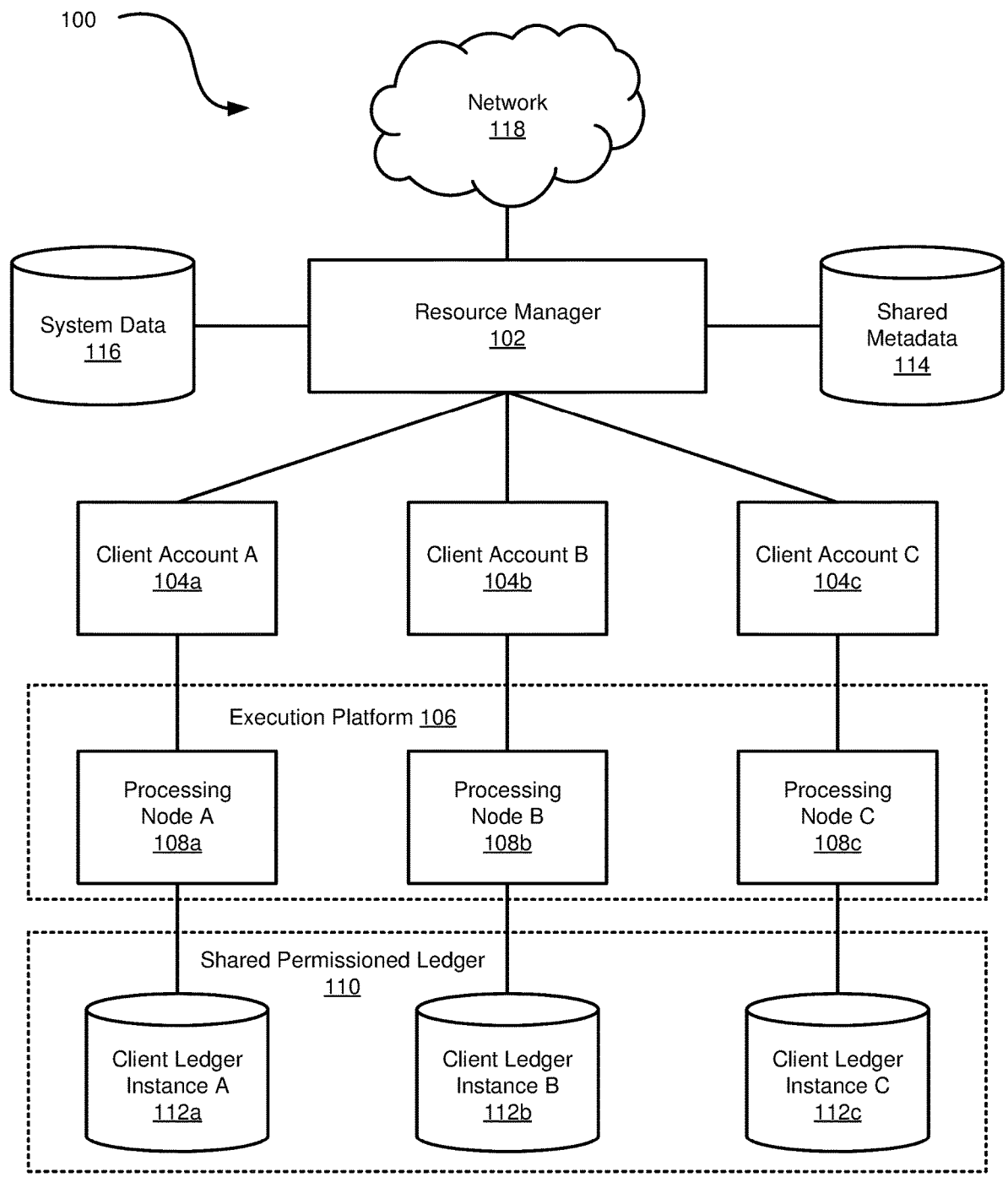
FIG. 1 is a schematic block diagram of a system for data management, permissioned access to database entries, and load-balancing of processing resources.

Disclosed herein are systems, methods, and devices for reconciliation and subscription-model permissions of data stored on permissioned database storage across independent computing nodes. A system disclosed herein includes a resource manager in communication with a network, an execution platform comprising a plurality of processing nodes, and a shared permissioned ledger comprising a plurality of ledger instances. The resource manager scales the processing resources and storage resources independently of one another across a plurality of client accounts based on need. The resource manager defines a settlement group comprising one or more settlements clients and ingests data for each of the one or more settlement clients. The resource manager assigns permissions to ingested data and provides data to authenticated observers by way of a push or pull data model. The resource manager reconciles data stored on the shared permissioned ledger.

The systems, methods, and devices disclosed herein leverage scalable processing and storage resources for near real-time analysis of enormous sums of data consumed by high-throughput data ingestion. The consumed data is analyzed in near real-time to calculate metrics for a plurality of unrelated entities such that the unrelated entities can make informed decisions based on up-to-date data analysis. Additionally, the consumed data is normalized, partitioned, and replicated across multiple ledger instances of a shared permissioned ledger such that the unrelated parties can query their own ledger instances to read their own data while ensuring their data is not accessible to other parties without express authorization.

The systems, methods, and devices disclosed herein reduce latency in data analysis and database management systems by leveraging independent scalability of processing and storage resources. Additionally, the systems, methods, and devices disclosed herein enable efficient, low-latency ingestion of enormous sums of data from multiple source-nodes, wherein the data can be ingested in different proprietary formats and normalized into a standard canonical format being stored across an independent database ledger instances. The data ingestion, normalization, and analysis can be executed by dedicated, node-specific ingestion, normalization, and analysis nodes for each incoming data channel. The processing and storage resources for the node-specific ingestion, normalization, and analysis nodes can be scaled up and down across the system based on need.

The systems, methods, and devices disclosed herein can be implemented in a centralized trade management system, although it should be appreciated that the disclosures presented herein represent computer-based improvements applicable to numerous industries. Specifically, the systems and methods described herein can be implemented in a distributed trading platform for tracking, managing, and executing transactions between parties based on real-time liquidity metrics. The computer-centric improvements described herein allow for nearly instantaneous transaction settlement between parties.

Referring now to the figures, FIG. 1 is a schematic diagram of a system 100 for data management and permissioned access to database entries. The system includes a resource manager 102 in communication with a network 118. The resource manager 102 is executed by one or more servers in communication with the components illustrated in FIG. 1, such as the system data 116, shared metadata 114, client accounts 104, execution platform 106 processing nodes, and shared permissioned ledger 110 client ledger instances 112. In an implementation, the resource manager 102 is additionally in communication with financial institutions, exchanges, clearinghouses, and so forth for executing complex financial transactions for multiple parties.

The resource manager 102 oversees data ingestion and data management for a plurality of client accounts 104, such as client account A 104*a*, client account B 104*b*, and client account C 104*c* (may generically be referred to as client account 104).

The resource manager 102 manages an execution platform 106 that includes a plurality of processing nodes 108 associated with the client accounts 104. The client accounts 104 may share the processing resources of the execution platform 106 and/or may be assigned independent processing resources. FIG. 1 illustrates a plurality of processing nodes within the execution platform 106, including processing node A 108*a*, processing node B 108*b*, and processing node C 108*c*.

The resource manager 102 manages the ingestion, normalization, organization, and storage of data entries within the shared permissioned ledger 110. The shared permissioned ledger 110 includes data entries pertaining to transactions associated with the client accounts 104. The client accounts 104 may have secure, permissioned access to data entries based on permissions stored in shared metadata 114. The shared permissioned ledger 110 includes data entries stored across a plurality of ledger instances, including, for example, client ledger instance A 112*a*, client ledger instance B 112*b*, and client ledger instance C 112*c* (may generically be referred to herein as client ledger instance 112). It should be appreciated that the resource manager 102 may be in communication with any number of client accounts 104, processing nodes 108*a*-108*b*, and client ledger instances 112*a*-112*c*.

The resource manager 102 detects and records all client metadata on the shared metadata 114 store. This creates an audit trail for the client metadata. Trade data is not stored on the shared metadata 114 store and is instead stored on the shared permissioned ledger 110. The shared metadata 114 store includes information about, for example, the life cycles of accounts, thresholds defined by client accounts 104, rules-based triggers defined by client accounts 104 and/or the resource manager 102, bank accounts, financial institution identifiers, currency data, market data, and so forth.

In an embodiment, the shared metadata 114 only stores data that is marked to be shared publicly between client accounts 104. The shared metadata 114 store includes, for example, name and public identifier of the client account 104 along with other identifiers the client account 104 might utilize on incoming trade data. The shared metadata 114 store may be implemented as a common store that is stored separately from the shared permissioned leger 110 and the client ledger instances 112. The shared metadata 114 store serves as a directory service to provide lookups for identifying participants.

The shared permissioned ledger 110 stores data in partitions that can be queried by the resource manager 102. The data entries in the shared permissioned ledger 110 are immutable such that the entries cannot be deleted or modified and can only be replaced by storing a new, superseding data entry. The data stored in the shared permissioned ledger 110 is auditable. In particular implementations, replicated data store 114 is an append only data store which keeps track of all intermediate states of the transactions. Additional metadata may be stored along with the transaction data for referencing information available in external systems. In specific embodiments, replicated data store 114 may be contained within a financial institution or other system.

In an implementation, the shared permissioned ledger 110 stores data entries comprising transaction information for client accounts and outside entities. The shared permissioned ledger 110 includes an independent client ledger instance 110 associated with each client account. The independent client ledger instances 110 may include separate and unique hardware for storing ledger data entries. In an embodiment, the shared permissioned ledger 110 includes scalable storage hardware that can be partitioned to client ledger instances 112 based on need. The resource manager 102 can allocate additional storage space within the shared permissioned ledger 110 based on which client account 104 requires additional storage. The storage space within the shared permissioned ledger 110 is independently scalable of the processing resources within the execution platform 106. This enables numerous benefits and ensures that each client account 104 has access to sufficient processing resources and storage resources based on need.

The independent client ledger instances 112 store different versions of the shared permissioned ledger 110 based on the permissions for the corresponding client account. The shared permissioned ledger 110 holistically stores transaction state information for all transactions requested, pending, and settled by all entities within the resource manager's 102 network of client accounts 104. However, different versions of the shared permissioned ledger 110 are stored on the independent client ledger instances 112 based on need. In an embodiment, the system 100 does not include a single, centralized copy of all data entries within the shared permissioned ledger 110. Instead, the data entries within the shared permissioned ledger 110 are dispersed amongst the client ledger instances 112 based on client account permissions stored in shared metadata 114. Each client account 104 has access only to the client ledger instance 112 associated with that client account. For example, client account A only has access to data entries stored on client ledger instance A; client account B only has access to data stored on client ledger instance B; and client account C only has access to data entries stored on client ledger instance C. The resource manager 102 manages access to the data entries stored on the client ledger instances and ensures, for example, that processing node A cannot read or write to the client ledger instance C.

The shared permissioned ledger 110 is modeled after double-entry accounting principles. When a transaction is initiated between counterparties, at least two data entries are stored on the shared permissioned ledger 110, including a first data entry stored on a first client ledger instance associated with the first party to the transaction, and a second data entry stored on a second client ledger instance associated with the second party to the transaction. The first data entry and the second data entry are not necessarily duplicates of one another and may include different information that is applicable to the corresponding party to the transaction. In some cases, the first data entry and the second data entry are duplicates of one another. Nevertheless, the processing node associated with the first party cannot read the second data entry stored on the client ledger instance associated with the second party. The first party does not have permissions to query, read, or write to the client ledger instance associated with the second party (and vice versa).

In some cases, the resource manager 102 causes only one data entry (with no duplicate) to be stored on one client ledger instance of the shared permissioned ledger 110. This occurs when the content of the data entry is applicable to only one client account. For example, if a first party to a transaction has completed an internal review of a transaction, cleared funds for the transaction, etc., and this update does not involve the second party to the transaction, then the resource manager 102 may cause a data entry to be stored on the client ledger instance associated with the first party that includes the applicable information. In this case, the resource manager 102 does not cause a duplicate data entry to be stored on the client ledger instance associated with the second party to the transaction because the second party does not have permission to view the applicable information and/or the applicable information is not relevant to the second party. As part of the normalization process, the resource manager 102 identifies the principals of a trade. The trades are replicated and stored on all participant client ledger instances 112. Generally, incoming data is stored to the client ledger instances 112 of all participants to the trade.

The shared permissioned ledger 110 can be implemented to store an auditable trail of financial transaction data. A data entry comprising financial transaction data includes one or more of data related to the principal parties to the transaction, a transaction date, a transaction amount, a transaction state (e.g., initiated, pending, cleared, settled), relevant workflow references, a trade ID, a transaction ID, and additional metadata to associate the transaction(s) with one or external systems. The data entries stored on the shared permissioned ledger 110 include cryptographic hashes to provide tamper resistance and auditability.

In some embodiments, the shared permissioned ledger 110 is a shared ledger that can be accessed by multiple financial institutions and other systems and devices. In particular implementations, both parties to a specific transaction can access all details related to that transaction stored in the shared permissioned ledger 110. All details related to the transaction include, for example, the parties involved in the transaction, the type of transaction, the date and time of the transaction, the amount of the transaction, and other data associated with the transaction. In some embodiments, each transaction entry stored on the shared permissioned ledger 110 includes a client identifier, a hash of the transaction, an initiator of the transaction, and a time of the transaction.

The resource manager 102 allows for selective replication of data stored on the shared permissioned ledger. The resource manager 102 can permit an outside entity (e.g., a bank, financial institution, clearinghouse, exchange, and so forth) to replicate certain data entries stored on the shared permissioned ledger 110. The resource manager 102 does not allow any outside party to query, read, or write to any data stored on a client ledger instance without receiving express authorization. In an example implementation, client account A wishes to release certain data entries to an outside party. Client account A communicates with the resource manager 102 and indicates that the resource manager 102 should permit the outside party to query, read, and/or write to the certain data entries. The resource manager 102 then grants the outside party access to the certain data entries stored on the client ledger instance A.

The processing nodes 108 for each client account can calculate the overall obligations, exposures, and liquidity for that client account in real-time based on data stored on the shared permissioned ledger 110. The resource manager 102 is notified when a trade is initiated and generates an auditable trail of data entries for the lifetime of that trade. The resource manager 102 causes data entries to be stored on the shared permissioned ledger 110 whenever the trade undergoes a state change. The processing nodes 108 can reference the shared permissioned ledger to calculate the obligations, exposures, and liquidity of a client account in real-time because current transaction information is continually stored on the shared permissioned ledger 110.

The network 118 includes any type of network, such as a local area network, a wide area network, the Internet, a cellular communication network, or any combination of two or more communication networks. The resource manager 102 communicates with some client accounts 104 and outside parties by way of communication protocols such as SWIFT MT (Society for Worldwide Interbank Financial Telecommunication Message Type) and proprietary application interfaces. The resource manager 102 ingests data and receives communications from client accounts 104 (and entities associated with the client accounts 104) using secure APIs (Application Program Interfaces) and other protocols. The resource manager 102 can integrate with existing financial institutions, banks, clearinghouses, and exchanges without significant modification to the institution's systems.

The network 118 may include a data communication network, such as a local area network, wide area network, the Internet, a cellular communication network, or any combination of two or more communication networks. The resource manager 102 and other components described herein may communicate by way of the network 118 in a suitable communication protocol. The resource manager 102 may communicate with external datastores associated with the client accounts 104 by way of SWIFT MT (Society for Worldwide Interbank Financial Telecommunication Message Type) messages such as MT 2XX, 6XX, 9XX. The resource manager 102 may communicate with ISO 20022 (a standard for electronic data interchange between financial institutions), and proprietary application interfaces exposed by particular financial institutions. Each of the client accounts 104 may be associated with a financial institution such as a bank, exchange, hedge fund, or other type of financial entity or system.

In an implementation, the resource manager 102 oversees and manages trades between client accounts 104 and outside parties. Because the resource manager 102 is in communication with the shared permissioned ledger 110, the resource manager 102 can calculate liquidity and overall obligations and exposures for each of the client accounts 104 in real-time. This enables the resource manger 102 to settle financial transactions even when exchanges and clearinghouses are closed. Thus, the resource manager 102 can execute a financial transaction nearly immediately upon receiving a request to execute the transaction. This represents a significant improvement over traditional trading systems, wherein a financial transaction may take several days to settle to ensure the transaction counterparties have sufficient liquidity.

As discussed in greater detail herein, the resource manager 102 manages asset transfers between numerous entities. In many cases, execution of an asset transfer includes the use of a central bank to clear and settle the funds. The central bank provides financial services for a country's government and commercial banking system. In the United States, the central bank is the Federal Reserve Bank. In some implementations, resource manager 102 provides an on-demand gateway integrated into the heterogeneous core ledgers of financial institutions (e.g., banks) to view funds and clear and settle all asset classes. The resource manager 102 may also settle funds using existing services such as FedWire.

The resource manager 102 communicates with authorized systems and authorized users. The authorized set of systems and users often reside outside the jurisdiction of the resource manager 102. Typically, interactions with these systems and users are performed via secured channels such as SWFIT messaging and/or secure APIs. To ensure the integrity of the resource manager 102, various constructs are used to provide system/platform integrity as well as data integrity.

In an embodiment, the system data 116 database stores a listing of authorized machines, devices, and accounts (i.e., "whitelisted"). The resource manager 102 accesses the system data 116 to determine whether a user is authorized, and what data that user is authorized to access. The resource manager 102 verifies the identity of each machine using security certificates and cryptographic keys. The resource manager 102 securely communicates with outside parties by way of secure API access points. The resource manager 102 stores a listing of authorized users and roles, which may include actual users, systems, devices, or applications that are authorized to interact with resource manager 102 and/or access certain data stored on the shared permissioned ledger 110. System/platform integrity is also provided through the use of secure channels to communicate between resource manager 102 and external systems. In some embodiments, communication between the resource manager 102 and external systems is performed using highly secure TLS (Transport Layer Security) with well-established handshakes between the resource manager 102 and the external systems. Particular implementations may use dedicated virtual private clouds (VPCs) for communication between the resource manager 102 and any external systems. Dedicated VPCs offer clients the ability to set up their own security and rules for accessing resource manager 102. In some situations, an external system or user may use the DirectConnect network service for better service-level agreements and security.

The resource manager 102 allows each client account 104 to configure and leverage their own authentication systems. This allows clients to establish custom policies on user identity verification, including two-factor authentication and account verification.

The resource manager 102 supports role-based access control of workflows and the actions associated with workflows. Example workflows may include Payment vs Payment (PVP) and Delivery vs Payment (DVP) workflows. In some embodiments, users can customize a workflow to add custom steps to integrate with external systems that can trigger a change in transaction state or associate them with manual steps. Additionally, system developers can develop custom workflows to support new business processes. In particular implementations, some of the actions performed by a workflow can be manual approvals, a SWIFT message request/response, scheduled or time-based actions, and the like. In some embodiments, roles can be assigned to particular users and access control lists can be applied to roles. An access control list controls access to actions and operations on entities within a network. This approach provides a hierarchical way of assigning privileges to users. A set of roles also includes roles related to replication of data, which allows the resource manager 102 to identify what data can be replicated and who is the authorized user to be receiving the data at an external system.

Additionally, one or more rules identify anomalies which may trigger a manual intervention by a user or principal to resolve the issue. Example anomalies include system request patterns that are not expected, such as a high number of failed login attempts, password resets, invalid certificates, volume of requests, excessive timeouts, http errors, and the like. Anomalies may also include data request patterns that are not expected, such as first time use of an account number, significantly larger than normal number of payments being requested, attempts to move funds from an account just added, and the like. When an anomaly is triggered, the resource manager 102 is capable of taking a set of actions. The set of actions may initially be limited to pausing the action, notifying the principals of the anomaly, and only resuming activity upon approval from a principal.

Figure 2:
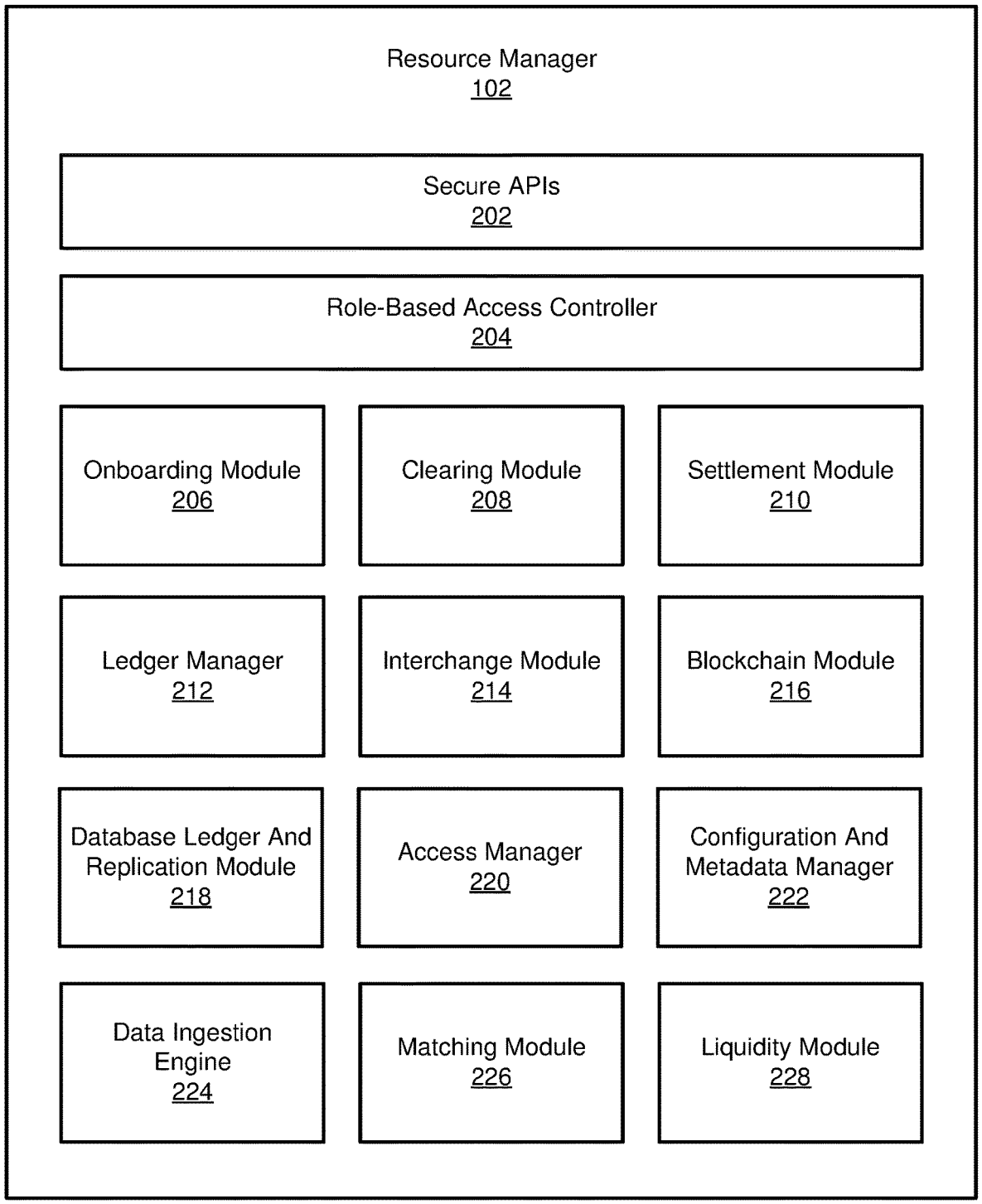
FIG. 2 is a schematic block diagram illustrating example components, modules, and functionality of a resource manager as described herein.

FIG. 2 is a schematic block diagram illustrating example modules and functionalities of the resource manager 102. In an implementation wherein the resource manager 102 oversees and manages financial transactions for certain parties, the resource manager 102 can communicate directly with one or more Central Counterpart Clearinghouses (CCPs), exchanges, banks, asset managers, hedge funds, or data ingestion engines. CCPs are organizations that facilitate trading in various financial markets. Exchanges are marketplaces in which securities, commodities, derivatives, and other financial instruments are traded. Banks include any type of bank, credit union, savings and loan, or other financial institution. Asset managers include asset management organizations, asset management systems, and the like. In addition to hedge funds, the resource manager 102 may also communicate with other types of funds, such as mutual funds. The resource manager 102 communicates with CCPS, exchanges, banks, asset managers, and hedge funds using a suitable and secure communication network and communication protocol.

The resource manager 102 includes secure APIs 202 that are used by partners to securely communicate with the resource manager 102. In some embodiments, the secure APIs 202 are stateless to allow for automatic scaling and load balancing. The resource manager 102 scales based on numerous factors, including the rate of incoming requests and the time of day to correspond with settlement and cutoff windows. During higher rates, services scale up to provide larger capacity for the processing nodes 108 to process the requests for their respective client accounts 104. The resource manager 102 load balances the request across the processing nodes 108 and client ledger instances 112 to ensure no individual instance is overlooked. When the rate returns to normal, the resource manager 102 scales down to keep optimum usage of resources and cost.

The role-based access controller 204 provide access to modules, data, and activities based on the roles of an individual user or participant interacting with the resource manager 102. In some embodiments, users belong to roles that are given permissions to perform certain actions. The resource manager 102 may receive an API request and check the API request against the role to determine whether the user has permissions to perform an action.

The onboarding module 206 includes the metadata associated with a particular financial institution, such as bank account information, user information, roles, permissions, settlement groups, assets, and supported workflows. The onboarding module 206 includes functionality for authenticating ownership of a bank account or other account.

The onboarding module 206 of the resource manager 102 authenticates clients during onboarding and validates transactions. The resource manager 102 receives a connection request from a node such as a financial institution, authorized system, authorized user device, and so forth. The resource manager 102 authenticates the node and, if authenticated, acknowledges the node as known. The resource manager 102 receives a login request from the node to connect to a client account. In response to the login request, the resource manager 102 generates an authentication token and communicates the authentication token to the node. The authentication token may be used to determine the identity of the user for future requests, such as fund transfer requests. The identity is further checked for permissions to various services or actions.

The resource manager 102 receives a transaction request from the node, such as a request to transfer assets between two financial institutions or other entities. In response to the received transaction request, the resource manager 102 verifies the node's identity and validates the requested transaction. The node's identity may be validated based on an authentication token, and then the resource manager 102 checks permissions to determine whether the node has permissions to perform a particular action or transaction. The transfer of assets further includes validating approval of an account by multiple roles to avoid compromising the network. If the node's identity and requested transaction are verified, the resource manager 102 creates one or more ledger entries on the client ledger instance 112 to store details of the transaction. The resource manager 102 sends acknowledgement regarding the transaction to the node with a server transaction token. The server transaction token may be used at a future time by the client account when conducting audits. The resource manager 102 initiates the transaction using the systems and methods described herein.

The clearing module 208 includes functionality to transfer assets between accounts within a financial institution. As used herein, DCC refers to a direct clearing client or an individual or institution that owes an obligation. A payee refers to an individual or institution that is owed an obligation. A CCG (or Guarantor) refers to a client clearing guarantor or an institution that guarantees the payment of an obligation. A CCP refers to a central counterparty clearinghouse and a Client is a customer of the FCM (Futures Clearing Merchant or Futures Commission Merchant)/CCG guarantor. Collateral settlements refer to non-cash based assets that are cleared and settled between CCP, FCM/CCG guarantor, and DCC. CSW refers to collateral substitution workflow, which is a workflow used for the pledging and recall (including substitution) of collateral for cash. A settlement group refers to a logical grouping of stakeholders who are members of that settlement group that are involved in the clearing and settlement of one or more asset types. A workflow, when executed, facilitates a sequence of clearing and settlement instructions between members of a settlement group as specified by the workflow parameters.

The settlement module 210 monitors and manages the settlement of funds or other types of assets associated with one or more transactions handled by the resource manager 102. Settlement execution includes executing a complex workflow for managing data and asset transfers between parties.

The resource manager 102 and the system 100 provide a unique improvement to computer-based communications and data storage that can be leveraged particularly in the financial transaction industry for (a) increasing the speed with which transactions can be executed; (b) increasing the reliability of liquidity metrics; (c) increasing the reliability of risk metrics; and (d) enabling the obligations and exposures of parties to be calculated in near real-time based on incoming data streams. Because of the structure of the system 100, the settlement module 210 of the resource manager 102 is capable of initiating bidirectional movement of assets in capital markets. The settlement module 210 can finalize a transaction within minutes, and in some cases as quickly as two minutes. This is a significant improvement over traditional systems, which require 24-48 hours to fully settle a transaction. This significant increase in settlement type is enabled by the structure of the system 100 and the communications the resource manager 102 has with outside parties, client accounts, client processing nodes, and the shared permissioned ledger 110.

In some implementations, the settlement module 210 operates under a number of rule-based triggers to initiate settlements based on certain circumstances. For example, the settlement module 210 may include a rule-based trigger to initiate all pending, valid settlements one-hour before cutoff time for an exchange. The rule-based triggers for the settlement module 210 can be automated, manually configured, and/or suggested by a neural network that is trained to predict risk and suggest settlement triggers based on the predicted risk.

The settlement module 210 enables authorized users to execute complex workflows to enable institutions to move assets on demand. The settlement module 210 may additionally allow one or more third parties to view and confirm payment activities between parties. The settlement module 210 enables on-demand settlements across multiple parties based on near real-time liquidity analysis, even when markets are closed.

A workflow describes the sequence of activities associated with a particular transaction, such as an asset transfer. The settlement module 210 provides a clearing and settlement gateway between multiple entities, e.g., different banks, mutual funds, hedge funds, and so forth. When a workflow is executed, the settlement module 210 generates and issues clearing and settlement messages (or instructions) to facilitate the movement of assets. The shared permissioned ledger 110 tracks asset movement and provides visibility to the parties and observers in substantially real time. The integrity of these systems and methods is important because the systems are dealing with core payments that are a critical part of banking operations. Additionally, many asset movements are final and irreversible. Therefore, the authenticity of the request and the accuracy of the instructions are crucial. Further, reconciliation of transactions between multiple parties are important to the management of financial data.

Payments between parties can be performed using multiple asset types, including, for example, currencies, treasuries, securities such as notes, bonds, bills, and equities, and the like. Payments can be made for different reasons, such as margin movements, collateral pledging, swaps, delivery, fees, liquidation proceeds, and the like. As discussed herein, each payment may be associated with one or more metadata.

The settlement module 210 may additionally trigger reconciliation and regulatory reporting for executed trades. In capital markets, asset movement is triggered due to a settlement on a set of trades between parties. All parties involved in the trade as well as the clearing and settlement of the trade need to perform post trade activities that include reconciliation and regulatory reporting of the trades as well as the payments associated with the trades. In traditional systems, reconciliation and regulatory reporting is a significant pain point for operations teams because it is mostly manual and labor intensive. The main problems related to reconciliation and the regulatory reporting are the heterogeneous systems that are involved in traditional transaction data systems.

In many implementations, the number of trade events that occur in a day is three to five orders of magnitude greater than the number of settlements that occur in a day. The settlement module 210 captures the trade events and determines if a trade has been completed or fully settled. This simplifies the reconciliation and regulatory reporting problems experienced by institutions, users, and the like.

The ledger manager 212 manages the shared permissioned ledger 110. Traditional financial institutions typically maintain account information and asset transfer details in a ledger at the financial institution. The ledgers at different financial institutions do not communicate with one another and often use different data storage formats or protocols.

Thus, each financial institution can only access its own ledger and cannot see data in another financial institution's ledger, even if the two financial institutions implemented a common asset transfer. The shared permissioned ledger 110 described herein enables secure coordination between principals based on near real-time liquidity metrics without sacrificing data security.

The shared permissioned ledger 110 includes distributed ledger technology (DLT) in a database format that is spread across multiple systems or sites, such as different institutions and/or different geographic areas. In contrast with traditional distributed ledger technology (e.g., Blockchains), data stored on the shared permissioned ledger 110 described herein cannot be accessed by all parties and is not replicated by each party. The shared permissioned ledger 110 described herein is replicated only when necessary for more than one party to access the information, e.g., when both counterparties to a transaction require a copy of the same information. Other entities who are not a party to the transaction do not have access to that information. The ledger manager 212 oversees the organization, replication, and access to data entries stored across the plurality of client ledger instances of the shared permissioned ledger.

The interchange module 214 communicates with outside parties and facilitates transaction settlement. The interchange module 214 may communicate by way of FedWire, NSS (National Settlement Service), ACH (Automated Clearinghouse), or other suitable means of communication and transaction settlement. In most jurisdictions, all bank accounts are associated with an account on a federal or national level. In the United States, banks each have an account with the Federal Reserve. When two or more accounts at the same bank seek to trade assets, the trade is easy to execute. However, when two or more accounts at different banks seek to trade assets, the trade settlement is more complex, because assets must be debited from an account at the first bank and transferred to an account at the second bank. The Federal Reserve serves as the "bank of banks," wherein all banks have an account at the Federal Reserve. The process of moving assets by debiting money from the first bank includes moving the money to the first bank's account at the Federal Reserve, and then crediting the second bank's account at the Federal Reserve, and the crediting the account at the second bank. The interchange module 214 communicates with outside parties for executing transactions between banks.

The blockchain module 216 provides interoperability with blockchains for settlement of assets on a blockchain.

When some financial transactions undergo a state change (e.g., initiated—pending—approved—cleared—settled, etc.) it may trigger one or more notifications to the parties involved in the transaction. The systems and methods described herein provide multiple ways to receive and respond to these notifications. In some embodiments, these notifications can be viewed and acknowledged using a dashboard associated with the described systems and methods or using one or more APIs.

The database ledger and replication module 218 exposes constructs of the shared permissioned ledger 110 to the resource manager 102. The database ledger and replication module 218 stores immutable transaction states on the shared permissioned ledger 110 such that the transaction states, and the history of a transaction, can be audited by querying the shared permissioned ledger 110. The database ledger and replication module 218 oversees the replication and authorized read/write of data entries stored on the shared permissioned ledger 110.

The access manager 220 monitors permissions to data stored on the shared permissioned ledger 110 and elsewhere throughout the system 100. In some cases, an outsider who is not a party to a transaction may need access to information about the transaction. The outsider may be granted "observer" status to information about the transaction. The observer may be a stakeholder in a transaction or may be involved in the execution of clearing or settling the transaction. The access manager 220 permits an authorized observer to subscribe to a subset of notifications associated with a transaction. The access manager 220 may grant access upon receiving authorization from one or more parties to the transaction who agree the observer can receive the subset of notifications.

The configuration and metadata manager 222 oversees and directs the storage of metadata and trade data across the shared metadata 114 database and the shared permissioned ledger 110.

The resource manager 102 includes or communicates with a data ingestion engine 224. The data ingestion engine 224 includes at least one data ingestion platform that consumes transaction data in real-time along with associated events and related metadata. The data ingestion engine 224 is a high throughput pipe that provides an ability to ingest transaction data in multiple formats. The resource manager 102 normalizes the ingested data to a canonical format. The normalized data is used by downstream engines like the matching module 226, liquidity module 228, optimizers, netting modules, real-time count modules, and so forth.

Figure 15:
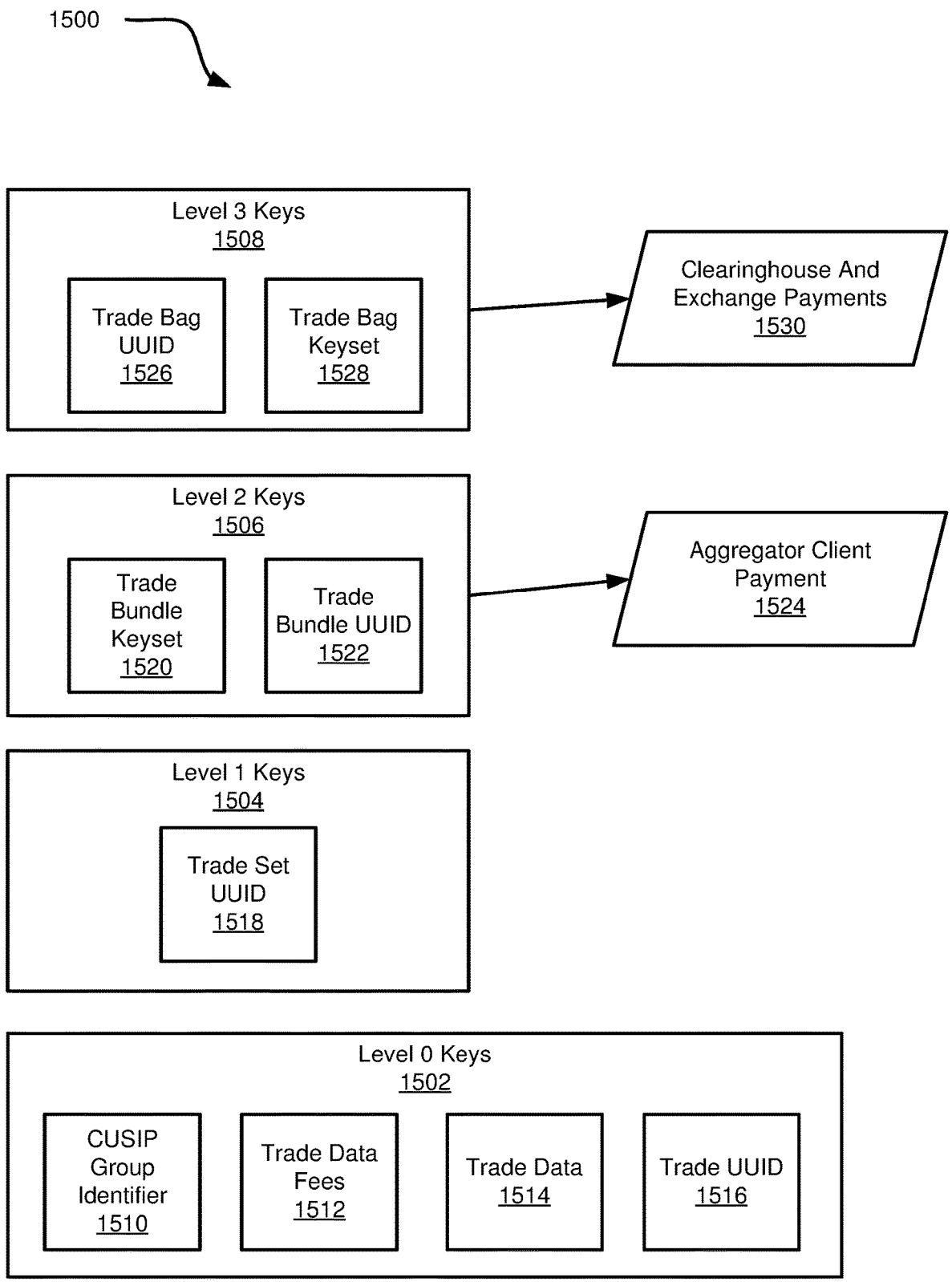
FIG. 15 is a schematic diagram of a multiple level key hierarchy.

The matching module 226 is a real-time streaming processor. The matching module 226 identifies multiple data entries and/or transactions that should be stitched together as multiple components of a single trade (or another event). In an embodiment, the matching module 226 is a windowed stream processing component. The matching module 226 can read from a normalized data stream (e.g., trade data in FIXML format) and compute the status of the trade orders. FIG. 15 illustrates an example of a schema produced as a stream by the matching module 226.

The matching module 226 can identify data entries associated with multiple transactions of a single trade. In some cases, a single trade is split into multiple smaller "tradelets," and each trade-let may be executed as a single transaction. It can be important to identify each of the trade-lets, determine whether the trade-lets have been fully executed, and then determine whether the trade is settled based on whether each of the trade-lets has been executed.

An example of parsing a trade into multiple transactions (i.e., trade-lets) is described as follows. In the example, a client initiates a request to purchase 10,000 shares of IBM stock with a sell side dealer. The dealer proceeds to execute the order. Often, the order is executed in smaller sizes or lots. The smaller transactions are received by the back office settlement systems. In this example, assume the order of 10,000 shares is executed in lot sizes of 2,500 shares each. When it is time to settle the trade, the settlement will occur for all of the 10,000 shares (or four executions) at the same time. To ensure the trade settles completely, the system 100 stitches together all of the unique executions. Once stitched together, the system 100 can deem that the trade is ready for settlement.

In some embodiments, the data received by the data ingestion engine 224 is for the executions and not for the complete trade order. The executions will each include a unique trade ID. The multiple executions are identified based on the unique trade ID. In some cases, the retrieval of the multiple executions is a technically complicated process.

For example, if the first execution occurred at 10:00 AM and the second execution occurred at 11:00 AM, the chances that the first execution is in memory when the second execution is received are low. The retrieval component of the matching module 226 must determine that the order is not complete when the first execution is received and the system 100 should prepare to receive another execution of the same trade order. The retrieval component additionally determines that the first execution needs to be retrieved from the shared database ledger 110 when the second execution is received. When the second execution is received, the matching module 226 retrieves the first execution from the shared database ledger and stitches the first execution to the second execution. The retrieval component must additionally determine whether the system 100 should expect a third execution.

In some cases, subsequent executions (such as the third and fourth executions in the above example) do not occur. This is deemed a partially executed trade. The resource manager 102 does not leave the trade hanging at the close of the trading day. Instead, the resource manager 102 completes the trade and marks the trade as having been only partially completed.

The following XML-like snipped can be used by the matching module 226. This example is for purposes of illustration and is not representative of a real trade. The real trade messages are typically proprietary to the client.

```
Order
<Tx>
    <OrderID>23847387DHHHD22</OrderID>
    <ExecID>667667GttyNm1</ExecID>
    <Symbol>AAPL</Symbol>
    <OrderQty>10000</OrderQty>
    <OrderPrice>50</OrderPrice>
    <Filled>0</Filled>
    <ToBeFilled>10000</ToBeFilled>
    <FillPrice>0</FillPrice>
    <TransactionTime>20170323-10:00:00:000</TransactionTime>
</Tx>
Execution 1
<Tx>
    <OrderID>23847387DHHHD22</OrderID>
    <ExecID>667667GttyNm2</ExecID>
    <Symbol>AAPL</Symbol>
    <OrderQty>10000</OrderQty>
    <OrderPrice>50</OrderPrice>
    <Filled>2500</Filled>
    <ToBeFilled>7500</ToBeFilled>
    <FillPrice>51</FillPrice>
    <TransactionTime>20170323-12:00:00:000</TransactionTime>
</Tx>
Execution 2
<Tx>
    <OrderID>23847387DHHHD22</OrderID>
    <ExecID>667667GttyNm3</ExecID>
    <Symbol>AAPL</Symbol>
    <OrderQty>10000</OrderQty>
    <OrderPrice>50</OrderPrice>
    <Filled>2500</Filled>
    <ToBeFilled>5000</ToBeFilled>
    <FillPrice>49</FillPrice>
    <TransactionTime>20170323-14:00:00:000</TransactionTime>
</Tx>
Execution 3
<Tx>
    <OrderID>23847387DHHHD22</OrderID>
    <ExecID>667667GttyNm4</ExecID>
    <Symbol>AAPE</Symbol>
    <OrderQty>10000</OrderQty>
    <OrderPrice>50</OrderPrice>
    <Filled>2500</Filled>
    <ToBeFilled>2500</ToBeFilled>
    <FillPrice>49</FillPrice>
    <TransactionTime>20170323-14:00:00:000</TransactionTime>
</Tx>
Execution 4
<Tx>
    <OrderID>23847387DHHHD22</OrderID>
    <ExecID>667667GttyNm5</ExecID>
    <Symbol>AAPL</Symbol>
    <OrderQty>10000</OrderQty>
    <OrderPrice>50</OrderPrice>
    <Filled>2500</Filled>
    <ToBeFilled>2500</ToBeFilled>
    <FillPrice>49</FillPrice>
    <TransactionTime>20170323-16:00:00:000</TransactionTime>
</Tx>
```

The liquidity module 228 calculates liquidity in near real-time for parties that push trade data to the data ingestion engine 224 of the resource manager 102. The liquidity module 228 calculates overall obligations and exposures and real-time liquidity for all asset types traded for various parties. In an implementation, the resource manager 102 oversees a plurality of settlement groups, wherein each settlement group is dedicated to a certain asset-type, such as securities, bonds, certain currencies, and so forth. The liquidity demand for a party includes multiple components, including: each counterparty, the asset type being exchanged with each counterparty, and other factors. These components are evaluated each time the liquidity demand is calculated or updated.

In some embodiments, different financial institutions in a distributed environment may have different business rules. For example, a particular business rule for a specific financial institution may state that if a risk exposure exceeds a predetermined threshold value (based on currency, jurisdiction, etc.), the financial institution needs to take action to mitigate its risk, such as generate an alert, force a settlement, open another position with a different counterparty to reduce exposure, and the like.

The liquidity module 228 may additionally calculate risk exposure for various parties. The liquidity module 228 executes a statistical model to predict future obligations and exposures, and calculate predicted risk based on the future obligations and exposures. The liquidity module 228 receives the normalized data from the normalized data channel (first illustrated as 508 in FIG. 5) and executes the statistical model using data received from the client in near real-time by way of the normalized data channel. The statistical model represents a risk model associated with a particular financial institution. The liquidity module 228 may execute a different statistical model and/or risk model for each client account based on that client's risk tolerances and risk preferences. For example, different financial institutions may use different factors (and apply different weightings to various factors) when determining their own risk tolerance. These factors include, for example, past history with a counterparty, current exposures, current obligations, and the like. Thus, each financial institution's statistical model may generate its own unique risk score.

The liquidity module 228 may apply multiple different statistical models to the same data to achieve multiple risk scores. These multiple risk scores are useful to financial institutions for different types of trades or products. For example, different risk scores may be used for spots versus swaps.

In traditional systems, financial institutions have access to a limited amount of counterparty data because the data is spread across multiple internal systems. The systems described herein, and the processes executed by the resource manager 102, allow financial institutions to obtain a holistic view of data across all currencies, all jurisdictions, all counterparties, all products, and so forth. The liquidity module 228 calculates risk exposure and identifies high-risk counterparties. Thus, a financial institution can identify high-risk counterparties in substantially real time and act, if necessary, to mitigate risk associated with the high-risk counterparties.

The system 100 protects proprietary information across the various client accounts 104 by executing the liquidity module 228 on independent processing nodes 108 assigned to the client accounts 104. The execution platform 106 may comprise a large sum of processing resources that can be scaled up and down to the various client accounts 104 based on need. However, the results of the processing executions are not shared across the client accounts 104. This ensures that client data remains confidential and that counterparties do not have unwanted insight into a client's proprietary operations.

In an example implementation, client account A wishes to mitigate risk when trading assets with client account B and client account C. The resource manager 102 oversees data ingestion, analysis, and storage for each of client account A, client account B, and client account C. Nevertheless, to protect the privacy of all client accounts 104, the resource manager 102 does not permit client account A to view confidential data or analyses associated with client accounts B and C. Instead, the resource manager 102 causes the processing node A (associated with client account A) to execute its own instance of the liquidity module 228 to predict risk associated with client accounts B and C. The liquidity module 228 instance associated with client account A does not have access to confidential information associated with client accounts B and C (even though that information is stored on the shared permissioned ledger 110). The liquidity module 228 must instead predict the risk associated with client accounts B and C based on information "owned" by client account A. This information includes, for example, past interactions with client accounts B and C, predict obligations and exposures associated with client accounts B and C, and known processes or rules associated with client accounts B and C.

The system and platform integrity is important to the secure operation of the resource manager 102. This integrity is maintained by ensuring that all actions are initiated by authorized users or systems. When an action is initiated and the associated data is created, an audit trail of any changes made, and other information related to the action, is recorded on the shared permissioned ledger 110 for future reference. In particular embodiments, the resource manager 102 includes (or interacts with) a roles database and an authentication layer. The roles database stores various roles of the type discussed herein.

Although particular components are shown in FIG. 2, alternate embodiments of resource manager 102 may contain additional components not shown in FIG. 2 or may not contain some components shown in FIG. 2. The resource manager 102 is implemented, at least in part, as a cloud-based system. In other examples, resource manager 102 is implemented, at least on part, in one or more data centers. In some embodiments, some of these modules, components, and systems may be stored in (and/or executed by) multiple different systems. For example, certain modules, components, and systems may be stored in (and/or executed by) one or more financial institutions.

Figure 3:
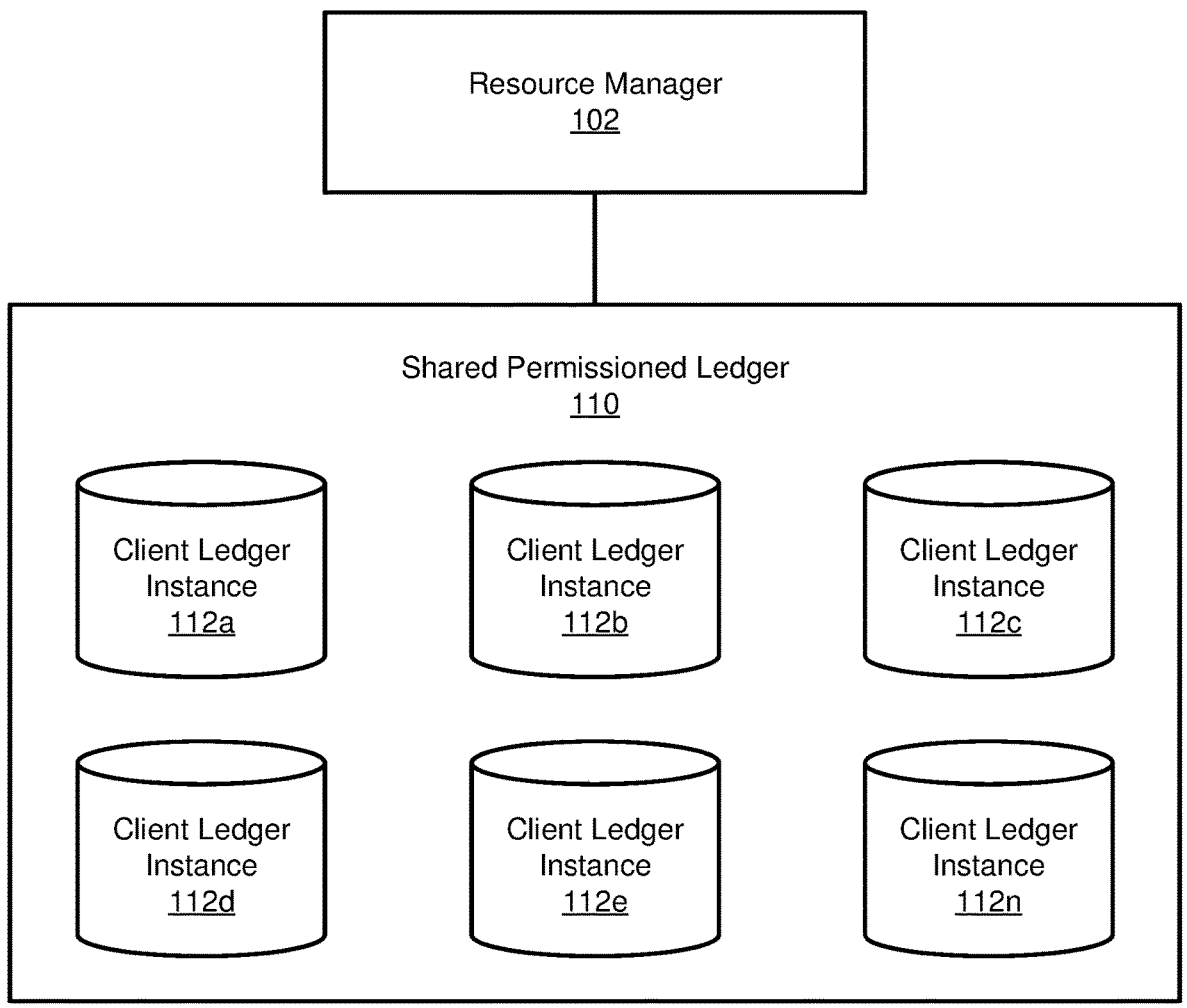
FIG. 3 is a schematic diagram illustrating communication between a resource manager and a shared permissioned ledger comprising a plurality of client ledger instances.

FIG. 3 is a schematic diagram of communications between the resource manager 102 and the shared permissioned ledger 110. The shared permissioned ledger 110 is a database including a plurality of client ledger instances 112, such as client ledger instances 112a-112n illustrated in FIG. 3. Each of the client ledger instances 112 may be stored on independent hardware that is partitioned for a certain client account. In an embodiment, the shared permissioned ledger 110 is stored across a plurality of storage hardware in a cloud-based database system in communication with a network. The storage hardware that is holistically assigned to the shared permissioned ledger 110 may then be partitioned by the resource manager 102 for use by the independent client ledger instances 112.

In an embodiment, the resource manager 102 scales usage of database hardware to each of the client ledger instances 112 based on need. The storage hardware for the shared permissioned ledger 110 is independently scalable from the processing resources of the execution platform 106. The resource manager 102 scales storage and processing resources up and down to each of the client processing nodes and client ledger instances based on need. The resource manager 102 may determine, for example, that one client account needs additional processing resources but does not require additional storage resources at a certain time.

The client ledger instances 112 are partitions of the shared permissioned ledger 110. Each of the client ledger instances 112 may be stored on storage hardware located in one geographical location, and that storage hardware may be in communication with a network 118 to form a cloud-based database platform. Alternatively, the client ledger instances 112 may be stored on storage hardware located in a plurality of geographical locations that collectively make up the shared permissioned ledger 110. Each of the client ledger instances 112 stores a different dataset applicable to a certain client account. The client ledger instances 112 do not store duplicate data, and data stored across the shared permissioned ledger is not shared by different client ledger instances. If a certain data entry needs to be duplicated for two or more client accounts (e.g., when two client accounts are counterparties to a financial transaction and require the same information about the transaction), then the data entry will be duplicated and independently stored on two or more client ledger instances that are associated with the two or more client accounts.

The resource manager 102 manages permissions for the shared permissioned ledger. The resource manager 102 ensures that a client account 104 can only access the data entries stored on that client account's 104 client ledger instance 112. In some cases, the resource manager 102 may grant special permission for a client account 104 or outside party to access data entries that do no "belong" to that party. The resource manager 102 will only grant special permission after receiving express authorization to release the data to the other client account or outside party.

Each transaction can have two or more participants. In addition to the multiple parties involved in the transaction, there can be one or more "observers" to the transaction. The observer status is important from a compliance and governance standpoint. For example, the Federal Reserve or the CFTC is not a participant of the transaction but may have observer rights on certain type of transactions stored on the shared permissioned ledger 110. In some embodiments, the resource manager 102 permits outside observers to subscribe to certain types of events.

The shared permissioned ledger 110 replicates a financial institution's internal ledger. In some implementations, the shared permissioned ledger 110 includes an exact, raw-format duplicate of the financial institution's internal ledger, and additionally includes a normalized version of the financial institutions internal ledger that includes only the required datapoints that can be used by the system 100. Financial institutions (i.e., the real-world entities associated with the client accounts 104) will never alter their own internal ledgers. The resource manager 102 oversees the shared permissioned ledger 110 which serves as a replication of the financial institutions' internal ledger.

The shared permissioned ledger 110 holistically includes information about numerous client accounts 104 (i.e., financial institutions such as banks, hedge funds, clearinghouses, exchanges, and so forth). The shared permissioned ledger 110 may include a copy of the data stored in the internal ledgers of two different financial institutions that may serve as counterparties to a trade. The shared permissioned ledger 110 is partitioned to store data on independent hardware for each client (i.e., the client ledger instances 112). The client ledger instances may be virtually partitioned while stored on the same hardware devices in a single geographic location. The client leger instances 112 may be spread across numerous geographic server locations that are each connected to a cloud-based database system.

Each data entry stored on the shared permissioned ledger 110 is associated with a principal (i.e., a financial institution or a party to a trade). The data entries may additionally include metadata that indicates who has permission to access the data. The data entries stored on the shared permissioned ledger 110 are immutable such that they cannot be deleted or modified. When a data entry needs to be deleted or modified, a new data entry is generated that references the obsolete data entry and includes an indication that the obsolete data entry should be deleted, and/or that information the obsolete data entry should be superseded. The resource manager 102 performs analysis on the trade data stored in the shared permissioned ledger 110 based on the most-recent data entries presumed to include the most up-to-date and accurate information.

In some cases, a trade undergoes a state change, and only one data entry is stored on the shared permissioned ledger 110 that reflects the state change. For example, if a trade is in the process of being settled and assets have been transferred out of an account associated with a first client and into a suspense account associated with the first client, then the resource manager 102 may cause a data entry to be stored only on the client ledger instance 112 associated with the first client, and not on any other client ledger instance associated with a counterparty to the trade. The resource manager 102 is generally trained to generate a data entry for an event only for those parties who require information about the event. In the example illustrated above, the counterparty to the trade does not need or have access to information indicating that the assets have been transferred from the account to the suspense account associated with the first client. In most cases, when assets move out of Bank A, a data entry is stored only on the client ledger instance for Bank; and when assets are moved to Bank B, a data entry is stored only the client ledger instance for Bank B.

Figure 4:
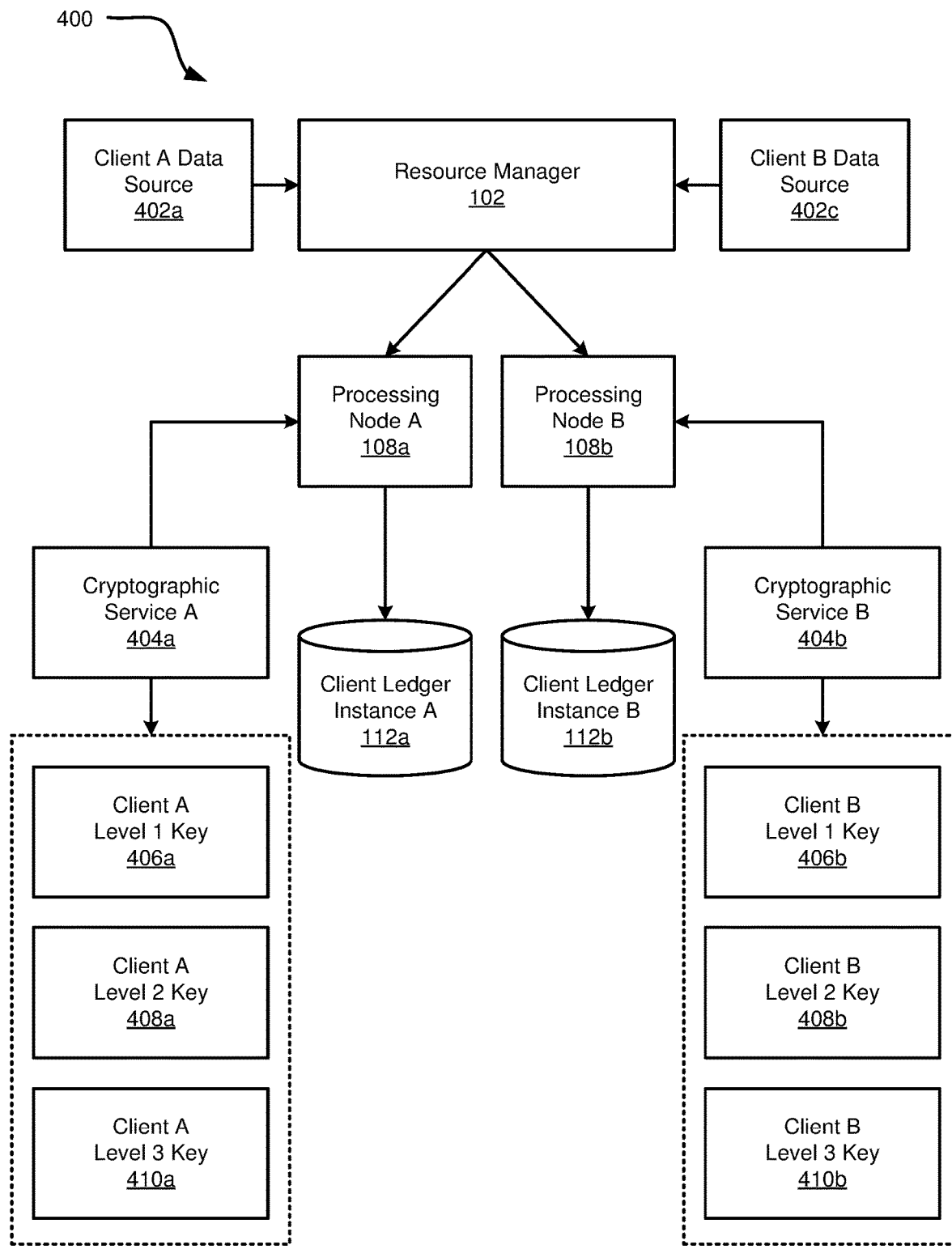
FIG. 4 is a schematic diagram of a system for data ingestion, user authentication, and granting access to data stored across a plurality of client ledger instances on a shared permissioned ledger.

FIG. 4 is a schematic diagram of a system 400 for data ingestion, user authentication, and granting access to data stored on the shared permissioned ledger 110. The system 400 includes the resource manager 102 receiving information from a plurality of data sources, including client A data source 402a, client B data source 402b, and so forth as needed. The resource manager 102 ingests the data from the client data sources 402 in a variety of data formats as provided by the client accounts. The resource manager 102 normalizes that data and causes the data to be stored on the shared permissioned ledger 110 in the applicable client ledger instances 112.

The resource manager 102 causes the data entries to be encrypted prior to storage on the client ledger instances 112. The resource manager 102 communicates with a cryptographic service 404 associated with each of the client accounts. The resource manager 102 communicates with cryptographic service A 404a for data associated with client account A, and the resource manager 102 communicates with cryptographic service B 404b for data associated with client account B. The cryptographic service 404 provides secured access to one or more keys associated with each client account.

In the example illustrated in FIG. 4, the cryptographic service A 404a enables access to three keys associated with client account A. The keys include client A level one key 406a, client A level two key 408a, and client A level three key 410a. Conversely, cryptographic service B 404b enables access to three keys associated with client account B. The keys include client B level one key 406b, client B level two key 408b, and client B level three key 410b. The different levels of keys may pertain to different types of data and/or different storage constructs within the client ledger instance 112.

The cryptographic service 404 may be run directly on the processing node 108. In some implementations, the cryptographic service 404 includes a software package provided by a third-party that is executed by the process node associated with the applicable client account. The resource manager 102 routes the node-specific traffic to the applicable processing node. The process node uses its own cryptographic key to encrypt the data. Thus, each processing node uses its own cryptographic service to encrypt the data. Therefore, only the processing node associated with a certain client account can read the data associated with that certain client account.

The cryptographic service 404 accesses each client's key stored in the client key storage and causes the data stored in the shared permissioned ledger to be encrypted or de-encrypted as needed. The cryptographic service 404 ensures security of the data entries stored in the shared permissioned ledger 110 using, for example, secure bifurcated keys that are stored in the client key storage. Each key is unique for the associated client node. When the resource manager 102 access the shared permissioned ledger 110, the resource manager 102 provides a data access request to the cryptographic service 404 that includes the appropriate key. This ensures that the data access request is authorized.

Cryptographic safeguards are used to detect data tampering in the resource manager 102 and any other systems or devices. Data written to the shared permissioned ledger 110 and any replicated data may be protected by one or more of the following, including: stapling all events associated with a single trade; providing logical connections of each commit to those that came before it was made; and immutable data entries. The logical connections in the shared permissioned ledger 110 are also immutable, but principals who are parties to a transaction can send messages for relinking. In this case, the current and preceding links are maintained. For example, trade amendments are quite common A trade amendment needs to be connected to the original trade. For forensic analysis, a bank may wish to identify all trades by a particular trader. Query characteristics will be graphs, time series, and RDBMS (Relational Database Management System).

The resource manager 102 implements various constructs to ensure data integrity. The resource manager 102 implements cryptographic safeguards to allow a transaction to span 1-n principals. An original trade can pass through multiple lifecycle events where the trade can be split into multiple sub-trades (may be referred to as sublets). The sub-trades can further change ownership due to other contracts and lifecycle events. These changes are captured with cryptographic safeguards to only grant read permissions to portions of the trade (i.e., individual sub-trades) which the party is a principal to. The resource manager 102 creates independent data entries stored on the shared permissioned ledger 110 to represent updates for each of the individual sub-trades. The data entries for the individual sub-trades include cryptographic safeguards to ensure that only certain parties have read access to that information. The resource manager 102 ensures no other users (other than principals who are parties to a transaction) can view data in transaction. Additionally, no other use has visibility into the data as the data traverses the various channels. The resource manager 102 handles failure scenarios, such as a loss of connectivity in the middle of a transaction. Any data transmitted to a system or device is explicitly authorized such that each ledger entry can only be seen and read by the principals who were a party to the transaction.

The resource manager 102 implements cryptographic safeguards to detect data tampering. The data written to the client ledger instances 112 of the shared permissioned ledger 110 is protected by one or more of: stapling all events associated with a single transaction, providing logical connections of each commit to those that came before it was made, and ensuring the logical connections are also immutable. Principals can send messages for relinking. The current and preceding links are maintained after being updated or relinked by principals to the transaction. This can be common where a trade amendment is submitted to the original trade. For forensic analysis, a financial institution may wish to identify all trades by a particular trader. The query characteristics include graphs, time series, and RDBMS.

The resource manager 102 monitors for data tampering. If the shared permissioned ledger 110 is compromised in any way and the data is altered, the resource manager 102 detects precisely what was changed. The resource manager 102 guarantees all participants on the network that the data has not been compromised or changed. Information associated with changes are made available by way of events such that the events can be sent to principals via messaging or presented on a user interface.

Regarding data forensics, the resource manager 102 is configured to determine the previous value of an attribute was X, the value is now Y, and the value was changed at time T, by a certain person. If the resource manager 102 is hacked or compromised, there may be any number of changes to attribute X and all of those changes are captured by the resource manager 102. This ensures that data tampering is discoverable and evident.

Figure 5:
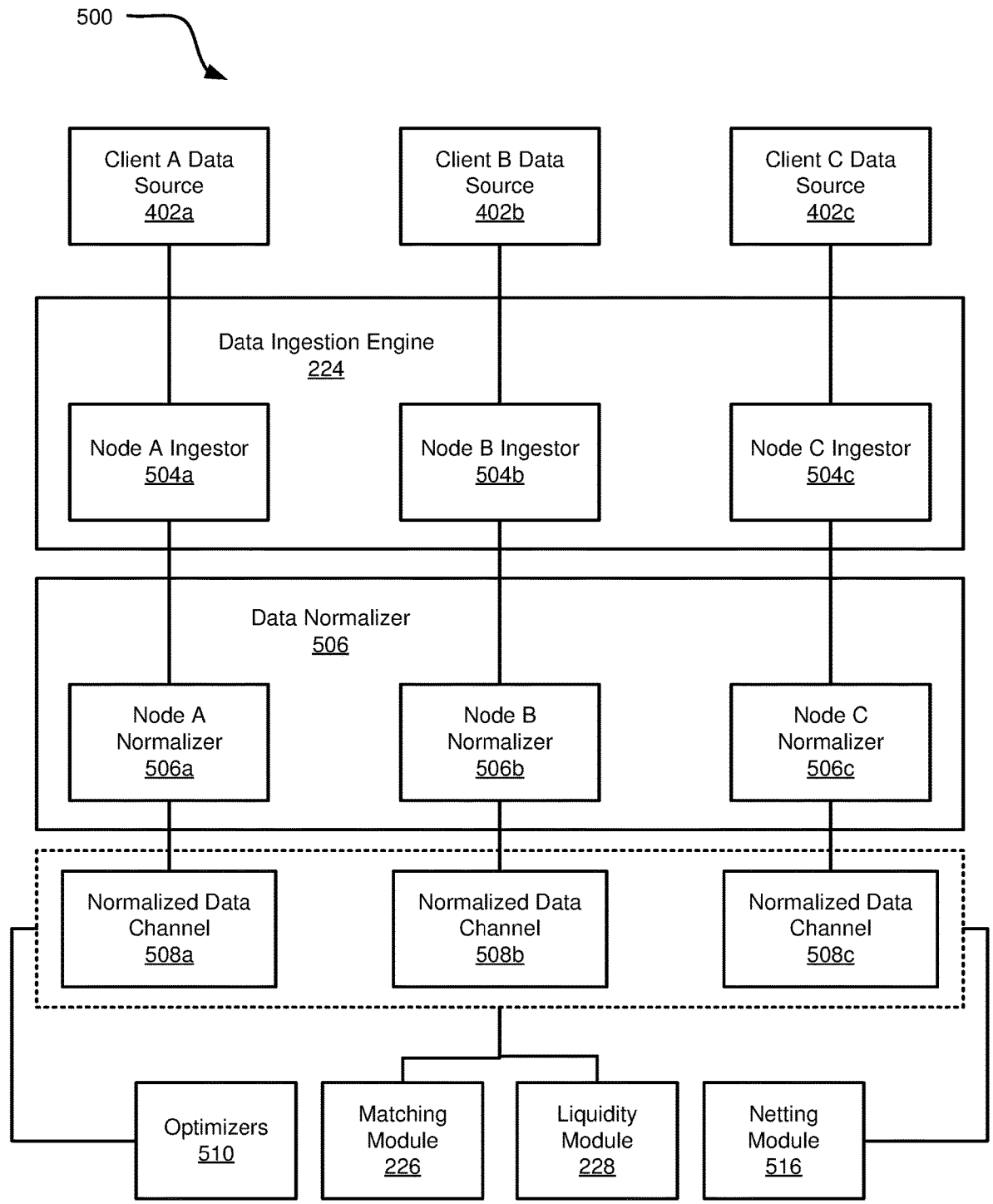
FIG. 5 is a schematic diagram of a system for data ingestion comprising node-specific ingestors and node-specific normalizers for ingesting and processing data received from independent data stream event channels.

FIG. 5 is a schematic diagram of a system 500 for data ingestion. The system includes the data ingestion engine 224 of the resource manager 102. The data ingestion engine 224 includes an independent ingestor node for each client account. In the example illustrated in FIG. 5, client account A feeds data to the data ingestion engine 224 by way of client A data source 402a, and this data is received by the node A ingestor 504a Similarly, client account B feeds data to the data ingestion engine 224 by way of the client B data source 402b, and this data is received by the node B ingestor; client account B feeds data to the data ingestion engine 224 by way of the client C data source 402, and this data is received by the node C ingestor 504c. The data ingestion engine 224 receives data in a variety of formats and languages.

The system consumes data in real-time along with associated events and related metadata. The data ingestion engine 224 is a high throughput pipe that ingests data in multiple formats. The data is normalized to a canonical format, which is used by downstream engines. The system provides access to information in real-time to different parties of a trade, including calculations such as obligations and exposures of the participating parties.

The data ingestion engine 224 feeds the ingested data to the data normalizer 506 for the data to be normalized to a canonical format that can be stored on the shared permissioned ledger 110. The data normalizer 506 includes an independent normalizer node for each client account. In the example illustrated in FIG. 5, the data from client account A is ingested and fed to the node A normalizer 506a; data from client account B is ingested and fed to node B normalizer 506b; and data from client account C is ingested and fed to the node C normalizer 506c. The data normalizer 506 partitions independent processing resources for each normalizer node. In an embodiment, the data normalizer 506 includes a plurality of processors, and the resource manager 102 scales the processing capability up and down based on current need across all client accounts. In an alternative embodiment, each client account has a set amount of processing resources allocated to data normalization, and the resource manager 102 does not scale the processing resources in real-time according to need.

The data ingestion engine 224 is a reliable high-throughput pipe with idempotency such that repeats of the same events do not alter the transaction data. The data ingestion engine 224 operates with idempotency by identifying unique identifiers associated with each event. The data ingestion engine 224 assigns a unique identifier to each event processed by the system 500. If the same event is processed again, the data ingestion engine 224 will generate the same unique identifier for that event. This ensures that the single event is not processed further by any other module (e.g., optimizers 410, matching module 226, liquidity module 228, netting module 516, and so forth), and the system 500 can operate with idempotency.

The data ingestion engine 224 supports the ability to ingest data in different formats from different participants. In some implementations, trade data entries include one or more of the following characteristics. All parties of the trade (principals, broker-dealers, exchanges, etc.) need to get access the information in near real time. A trade has a life cycle from the point of entry into the system, the execution, the augmentation of the data in the middle and back offices all the way through to the point where the trade is cleared/settled. Sometimes, the trades may be reversed before it is settled. During this lifecycle, trade metadata is being augmented. The parties of the trade as well as the banks that act as the custodians of the assets of the principals follow a protocol of confirmations and affirmations that are similar to an ACK set in a TCP protocol (with the noted difference that these are asynchronous systems). Trades are of different types and the metadata of the trade can change depending on the type of trade. Metadata can be thought of as columns to a row in a csv or fields of attributes in XML or JSON. The Financial Information eXchange (FIX) protocol (and the xml version of it—Fixml) have become standards for the messages to capture the trade metadata between parties.

The data ingestion engine 224 may receive and categorize incoming data entries according to the following example protocol. A Node N(i) can trade with parties M(1) . . . M(N) for various products P(1) . . . P(N). A Trade notation T{(Mi, Ni), Pi} can be used to say that parties Mi and Ni have traded a product Pi. In the case of a partial trade, it is possible that a trade submitted by Ni to Mi may be executed by Mi in separate batches that aggregate to the whole trade. A trade will result in several events to be recorded by each party of the trade. Each event is associated with a set of attributes. By association, these attributes are associated with the trade. Although these attributes are for the trade T{(Mi, Ni), Pi}, Mi and Ni may not have all the attributes as some attributes may be internal tracking attributes for either Mi or Ni. The data ingestion engine 224 ingests these events and the associated metadata for an event from both Mi and Ni.

The data normalizer 506 reads the data in the ingestor stream and converts the data into a standard format. The standard format may include a simplified version of the FIXML standard. The normalized data is pushed to a new stream (the normalized data channel 508) which will be consumed by downstream modules.

In an example implementation, wherein the data ingestion engine 224 is ingesting trade data for financial orders, the incoming messages (orders) ingested by the normalizer are given below:
 babacf6a-0c20-44b9-b837-5d1a28fc0acb,ABT,1500,100, 0,1500,0,05/04/2017 01:55
The corresponding Normalized format is

```
<Order>
<ClOrdID>babacf6a-0c20-44b9-b837-5d1a28fc0acb</ClOrdID>
<ClExeID></ClExeID>
<Side></Side>
<OrdTyp></OrdTyp>
<Px>100</Px>
<Acct></Acct>
<PriNode></PriNode>
<SecNode></SecNode>
<Instrmt>
<Sym>ABT</Sym>
<ID></ID>
<IDSrc></IDSrc>
</Instrmt>
<OrdQty>
<Qty>15OO</Qty>
</OrdQty>
<meta_data></meta_data>
<TransactTime>05/04/2017 01:55</TransactTime>
</Order>
```

The normalized data is fed to the normalized data channel 508. The normalized data can then be used by downline modules and engines such as optimizer 510, the matching module 226, the liquidity module 228, and the netting module 516. The normalized data is stored on the shared permissioned ledger 110 according to database schema. The normalized data is partitioned and stored on a client ledger instance based on which client provided the data to the data ingestion engine 224.

The normalized data channel 508 is illustrated in FIG. 5 as a single logical unit. However, the normalized data channel 508 may be further broken down into specific channels for each client node. The purpose of normalized is to enable the system 100 to build models such as netting, matchers, optimizers, machine learning models, and the like on a normalized data format.

In an embodiment, each ingestor node 504 ingest data in a different format and in different locations. Some ingestor nodes may acquire data available in, for example, an FT folder. The files may be generated in real-time or by a batch process. Other ingestor nodes in the system 500 may acquire data available on a file storage system, such as a permissioned storage system or an HDFS (Hadoop Distributed File System). Some ingestor nodes in the system 500 may acquire data available in a queuing system such as an MQseries implementation.

Prior to ingestion, the data resides within the boundaries of the client's systems and data centers (i.e., the client data source 402). The client must push the data to the data ingestion engine 224 for the data to be ingested by the systems described herein. The client pushes the data in near real-time to the data ingestion engine 224 so the data can be ingested, normalized, and assessed in real-time to determine the client's obligations, exposures, and real-time liquidity. The data ingestion engine 224 may include a "client push module" to establish a secure connection between the resource manager 102 and the client data source 402 using one or more client authentication modules to push the data from the client data source to the resource manager 102 in near real-time. The client may do this to handle vast amounts of data on the client side. In an embodiment, there is no attempt to normalize messages at the edge, and instead, the raw data is pushed to the data ingestion engine 224 in the received format. This can be important in implementations where normalization (by the client) could alter the data's original format in a manner that cannot be recovered once published to the data ingestion engine 224. Additionally, software errors in the client module could cause some data to be lost forever prior to ingestion by the data ingestion engine 224.

The system 500 may include a node-specific event channel for each node associated with a single client. In this alternative implementation (not illustrated in FIG. 5), each of the "client data sources" is a node event channel associated with a client. One client may have a plurality of node event channels that may push different types of data, different volumes of data, and data in different formats. In this case, a separate ingestion event channel is opened for each of a client's nodes such that the system 500 dedicates a plurality of ingestion event channels to a single client. This can resolve numerous inefficiencies and inaccuracies that naturally arise when ingesting enormous sums of data in near real-time. This enables the data ingestion engine 224 to independently scale processing and storage resources for each of the plurality of ingestion event channels. The volume and rate of data may be different for each of a client's nodes, and therefore, a single node could overwhelm the system 500 and add latency to data ingestion for that client and other clients within the system 500. This issue is overcome by dedicating an independent ingestion event channel to each of the client's nodes, and then scaling processing and memory resources for the independent ingestion event channels as needed.

In an implementation where the system 500 includes a node-specific ingestion event channel for each of the client's nodes, the system 500 may additionally include a node-specific normalizer for each of the ingestion event channels. In this implementation, the system 500 includes an independent node normalizer 506 for normalizing data from each of a client's nodes. This can be particularly important where a single client has multiple nodes that each push data in a different format. If this is the case, the system 500 can still efficiently normalize the client's data by having a dedicated node normalizer for each of the client's data push nodes.

Additionally, strict service-level agreements (SLAs) may be in place that prohibit commingling to data. In some embodiments, this is treated as a "leased line" to the client. The resource manager 102 may implement a backup policy to archive data in the shared permissioned ledger 110 for longer periods of time than the client typically maintains the data in their own internal data systems. The resource manager 102 may cause a copy of the data to be stored on the shared permissioned ledger 110 in its raw format as received from the client, rather than the normalized format processed by the data normalizer 506.

The data received from the client data sources 402 is still in a raw format that is custom to the client's site. The node-specific event channels feed into the node-specific ingestors 504 and the node-specific normalizers 506 to normalize the data into a standard format that can be used by the resource manager 102. In an embodiment, the data is stored on the shared permissioned ledger 110 in the raw format as received from the client and is additionally stored in the normalized format that is organized according to database schema. The normalized data is fed into downline modules such as the optimizers 510, matching module 226, liquidity module 228, netting module 516, and so forth.

In an embodiment, the data normalizer 506 ingests data in the client's custom format and maps the data to a normalized format. This can be implemented similar to message-level ETL. The node-specific normalizer loads the data into the normalized data channel. The same design patterns that are used for building custom Swift adapters in a clearing gateway can be used in this component as well. The platform has support for building a normalized format based on a pluggable architecture which can be used to map the custom formats to the normalized format using templates. Based on the format of the customer specific data, a default template for the format can be used and then customized for any customer specific details. For example, SWIFT message processing can be based on the standard SWIFT message and further enhanced to support any customer specific fields. The platform is able to support multiple formats like FIXML, SWIFT, XML and comma separated files using pluggable architecture and templates.

The data ingestion engine 224 is a complex layer with numerous design considerations that compensate for the difficulty in predicting the various formats in which the system 500 will receive transaction messages. In some implementations, a bank (or other financial institution) will use the FIX format while others will send transaction data in internal, proprietary formats. The proprietary format may include a binary format, and each asset class may have its own format. The FIX specification can define different asset classes different. In some cases, a client will use the SWIFT messaging format for cash transfer requests and will use different formats for other transaction requests. Additionally, the data ingestion engine 224 consumes enormous sums of data from multiple clients in near real-time and must quickly normalize, categorize, and store the data so that it can be processed by downline systems.

The data ingestion engine 224 includes a parser for parsing messages and other data entries received from clients. The parser creates a set of name-value pairs for the data contained in a message. The parser causes the data to be nested, and the nesting is preserved when creating the name-value pairs. Once the nested name-value pairs are created, the data normalizer 506 attempts to normalize the message into a standard format. In some cases, the system 500 can simulate SWIFT messages and normalize those messages based on current standards.

In some cases, an exception will occur during the parsing process. Typically, the exception is a business exception but may also include an infrastructure exception. If an exception occurs during the parsing process, the exception will be captured. The exception is memorialized in an exception message that is sent to an exception queue. The client may be granted access to the exception queue by way of a dashboard. The exceptions are identified as messages in exception queues, some examples are having invalid data in the message fields like alphanumeric data in amount field. Another example is having an unmatched trade. The clients view the exception events/messages via a dashboard and can instruct to reprocess the data. Example an unmatched trade is resent for processing since the exception could be because of delay in receipt of other side of message.

In some implementations, as applicable, the data ingestion engine 224 and the data normalizer 506 do not truncate or make any data unavailable in the normalized format. The normalized format may not use all fields/attributes of the data. Any data that is not extracted is still made available.

In some cases, each of the channels (e.g., the raw event channels and the normalized data channels) have different archival policies. An archival policy determines the type of persistent (e.g., disk, storage area network, HDFS, etc.) archival, and the purging of older data. The archival policies may be different for each node, and by association, each channel. The system 500 supports the various archival policies through a configuration.

Figure 6:
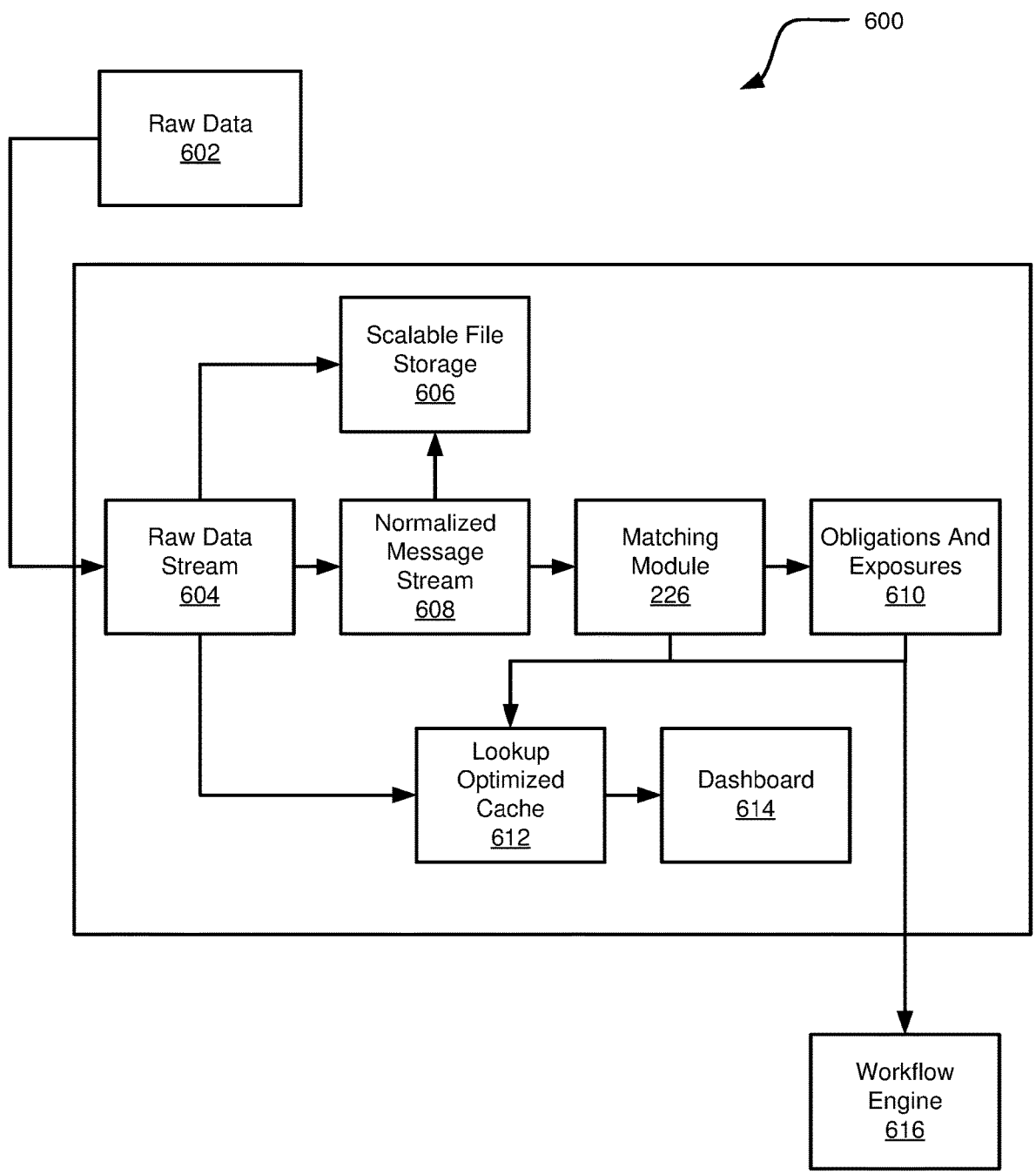
FIG. 6 is a schematic diagram of a system for data ingestion and real-time data processing.

FIG. 6 is a schematic diagram of a system 600 for data ingestion. The trade data generator generates sample trade data required for downstream processes. The trade data generator generates sample trades based on input parameters that can be used for testing setup, different netting strategies, and for running liquidity simulations. This is used to simulate where data is coming into the system from external (client) sources.

The trade data generator consumes raw data 602. The raw data 602 is input to a raw data stream 604. The data in the raw data stream 602 is normalized into the normalized message stream 608. The normalized message stream 608 is fed to scalable file storage 606 for storage and is further fed to the matching module 226. The normalized message stream 608 is additionally fed to the obligations and exposures 610 module that can further feed to the workflow engine 616. The results of the matching module 226 and the obligations and exposures 610 modules are fed to the lookup optimized cache 612 and the dashboard 614.

The generated trade data may be generated in a suitable format such as CSV, XML, or JSON. The generated trade data includes, for example, the following fields: order_id; execution_id; primary_node_id; secondary_node_id; settlement_date; settlement_cycle; symbol; order_price; fill_price; order_quantity; filled_quantity; to_be_filled_quantity.symbol: symbol of the security that is to be bought or sold; fill_price: +/−10% of the order_price. For some trades, the fill price needs to be the same as the order price; order_quantity; filled_quantity; and/or to_be_filled_quantity.

The generated trade data will have both orders and executions. An order can have multiple executions. For example, an order to buy 500 shares of IBM might be executed in five separate executions, with each individual execution having an order quantity of 100 IBM shares. An order or execution is differentiated by the availability of the execution ID.

Orders and executions are generated for all trading hours. For example, if the data generator is triggered on 2017 May 2023 with an argument to generate 100 orders, the data generator generates 100 orders along with executions. Both the buy and sell side of the trade have events that are added to the data ingestion pipeline. There is one stream for each primary node. So, for each trade, there will be two events (one for buy and one for the sell side of the trade). Thus, for each order execution, there will be two streams, including one data stream for the buyer and an additional data stream for the seller.

For example, suppose there are three participant nodes that are involved in bilateral trade between themselves. The data will be generated in three separate streams: node_a; node_b; and node_c, (corresponding to nodes 1, 2 and 3). The data in the stream node_a will be the records where node1 is the primary_node_id, and so on.

The generated order will be of various types, such as completed orders, pending orders, and exceptions. If the order is completed, the data generator generates orders for every hour for the date on which the job is run. While generating orders for every hour, the generator randomly completes an order in the subsequent hours. If the order is pending, some orders will not complete at all. If the order includes exceptions, some orders will have more executions than expected. For example, an order of 500 shares of IBM may have six executions, with each individual execution having an order quantity of 100 IBM shares. This is an exception because the sum of the order quantity in the individual executions exceeds the order quantity specified in the order.

After generating the trade samples, the data generator creates two summary files. One summary file provides the details of the number of orders that has been generated for every hour grouped by order type. Another summary file has the cumulative count of the various types of orders at the end of every hour. For example, if the generator has generated ten pending and twelve completed orders in 00 hour, and five pending and ten completed orders in 01 hour, the summary file will include a count of fifteen pending and 22 completed orders for the 01 hour. The generator also provides the total number of records (both orders and executions) that have been generated in that particular run. If the size of the file in which the trade data is being generated exceeds the maximum limit, file rotation is performed. For example, the system can have multiple files for a single hour such as 00.csv, 00.csv.1 . . . and so on.

Figure 7:
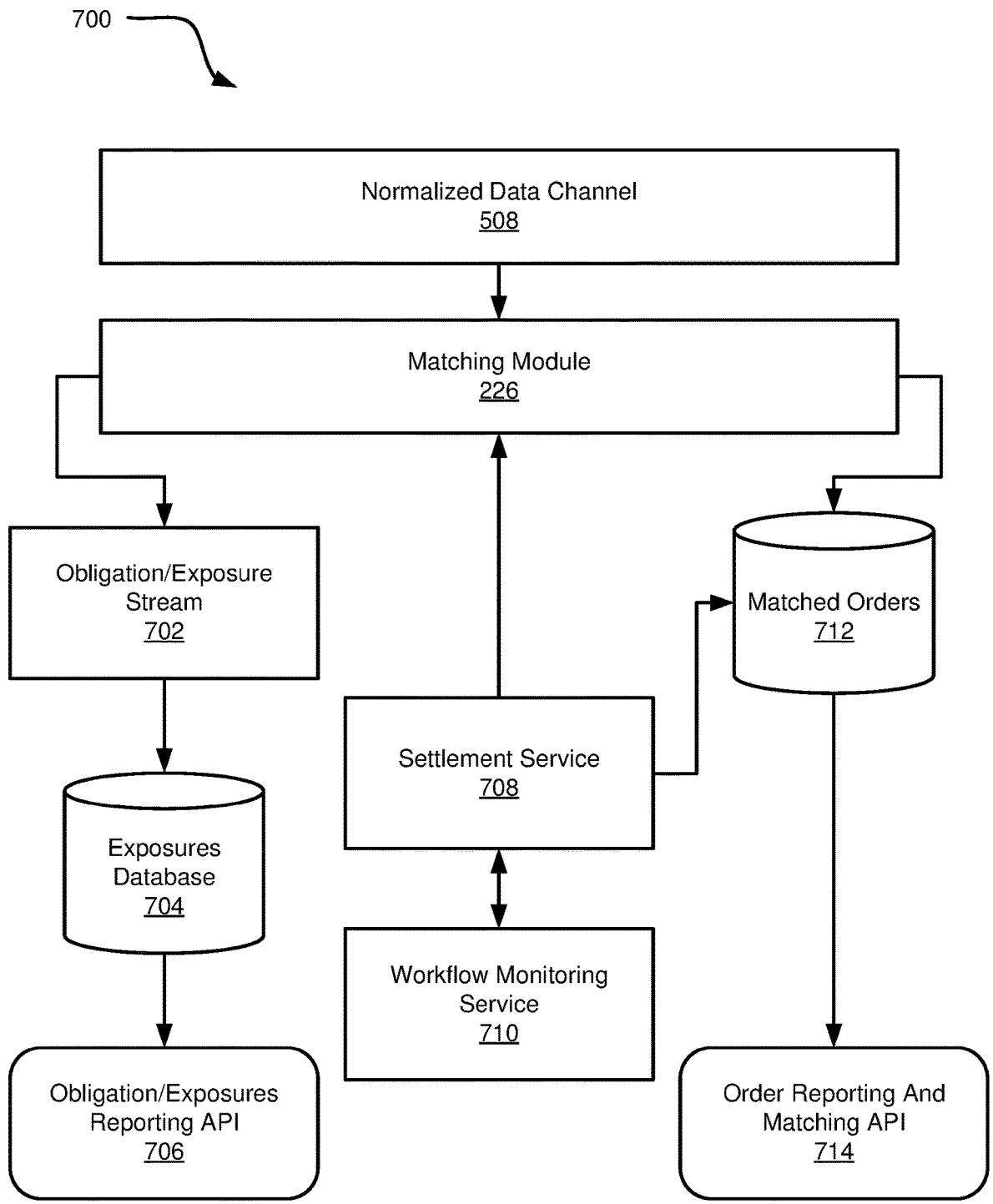
FIG. 7 is a schematic diagram of a system and process flow for data ingestion and calculating obligations and exposures of parties in near real-time based on the ingested data.

FIG. 7 is a schematic diagram of a process flow 700 for data ingestion and determining obligations and exposures based on the ingested data. The system includes the normalized data channel 508 wherein normalized data is received and partitioned as needed. The normalized data is stored on the shared permissioned ledger 110 and may be further fed to the matching module 226. The matching module 226 identifies matching counterparty data entries, multiple transactions as part of a single trade, and other data entries that should be stitched together. The matching module 226 stitches data entries together based on metadata.

The matching module 226 identifies attributes of independent data entries applicable to the same trade and stitches those data entries together to determine whether a trade has been fully settled. The matching module 226 identifies these attributes by a(1), a(2) . . . a(n). Similar to databases, some of these attributes may be primary keys or candidate keys to uniquely identify a trade. Examples of these are counterparty-id, cusip, trade-id, etc. The matching module 226 refers to the E(Tx Mi)=>{a1, a2 . . . an} as the events for trade 'Tx' ingested from Mi. Likewise the systems and methods will also refer to E(Tx, Ni). A trade is said to be 'Matched to Trade x' when all the candidate keys from E(Tx Mi) match those from E(Tx, Ni). The inverse constitutes an unmatched trade. That occurs when all the candidate keys of E(Tx, Mi) do not match E(Tx Ni).

The matched data entries feed into the obligation/exposure stream 702 and are stored on the exposures database 704. The obligations and exposures of each client account (and other outside parties) are calculated based on the normalized, matched transaction data. The obligations and exposures may be reported to the client accounts and to outside parties by way of the obligation/exposures reporting API 706.

The matched data entries are stored on the matched orders 712 database. Order reporting and matched data entries may be provided to client accounts and outside parties by way of the order reporting and matching API 714.

A settlement service 708 triggers a workflow 710 based on the data stored in the matched order 712 database. The settlement service is used to execute settlement of trades as gross or netted settlement. The service initiates the settlement workflow between trading parties for trades. Settlement service can initiate trades based on user input or based on rules set agreed between parties as part of counterparty management. Different states of the settlement workflow are monitored by the workflow monitoring service and state changes published to all the observer services like the obligation/exposure stream service. The obligation/exposure stream services consumes incoming trades and settlement events to calculate a node's real-time positions against counterparties for currency pairs.

The process flow includes a data generator to create trades for the client nodes involved. A node-specific data ingestor consumes a specific data stream application from the client node. A node-specific normalizer normalizes the data stream into a canonical format. The matching module 226 calculates real-time order matching on the normalized data to identify separate executions of a trade, updates to the same trade, and so forth. The matched order stream is used to calculate real-time obligations and exposures for the parties. The obligations and exposures are stored in the shared permissioned ledger 110 and provided to the client nodes by way of the obligation/exposures reporting API 706. The matched orders are stored on the shared permissioned ledger 110 to be used in other downstream processing.

The settlement service 708 and reporting layer are the final states of the data ingestion pipeline. These services obtain the required data from the analytics application. The data from the analytics applications is pushed to data warehouses, which are used to store a historical view of obligations and exposures. The settlement service 708 is responsible for calculating the netted values of the trades that have been ingested and for scheduling the trades to settle on the requested settlement cycle.

The workflow monitoring service 710 monitors the workflow queue to listen for events propagated to the workflow engine. These events hold the status of the workflow. If the status of the workflow changes, the workflow monitoring service 710 updates the newer status into the settlement table. Once the workflow status is COMPLETE, a feedback signal is sent to the matched orders stream with record type as "Feedback."

The feedback signal is similar to the CSV data of the matched orders, which refers the buyer, seller, symbol, settlement cycle, total value, and quantity. The values of total value and quantity may be negative, which indicates the settlement has already been completed. The two fields hold aggregated values of the order value and order quantity of the individual orders that contribute the netting.

The data ingestion pipeline described herein introduces numerous improvements over data ingestion systems known in the art. The data ingestion pipeline described herein is capable of consuming enormous sums of data associated with capital markets. For example, the data ingestion pipeline can handle the data throughput and latency associated with a large volume of financial transaction in various types of capital markets. These markets can process one billion or more events on a daily basis. Events include, for example, placing an order, updating an order, fulfilling an order, partially filling an order, initiating an order to sell, initiating an order to buy, amending an existing order, executing a transaction, and so forth. Any number of trading systems in a capital market match buy orders or sell orders with one or more corresponding sell orders or buy orders. For example, an order to sell 1000 shares initiated by one or more trading systems. Thus, the initial order to sell 1000 shares may cause multiple buy orders, resulting in multiple events for the single order to sell. The systems and methods described herein can handle these types of events in high volume with acceptable latency and in substantially real-time.

Additionally, the data ingestion pipeline described herein is useful in analyzing the various financial data associated with the high volume of events. In particular, the described systems and methods can handle streaming analytics for one or more financial markets (including all events) across multiple financial institutions in substantially real time.

When an order is placed with a financial institution, a liquidity demand will be placed on the financial institution at some time in the future. The liquidity demand may indicate that the financial institution is to receive funds in the future, or the financial institution must pay funds in the future. The funds can be in different asset types, such as currency, securities, bills, bonds, and the like. Additionally, the funds can be in different financial jurisdictions. Each liquidity demand is with a counterparty (or multiple counterparties). A particular financial institution with multiple liquidity demands is typically dealing with multiple different counterparties, where each counterparty has different a different risk profile. Some counterparties may be more prone to risk than other counterparties, and the risk profile of each counterparty may change regularly based on changing liquidity demands, changing exposures, changing obligations, credit profile, and other factors. The risk profile of a counterparty is also based on a jurisdiction, where some jurisdictions have a higher risk for fraud or failed payment than other jurisdictions. For example, the risk profile for a particular financial institution changes in substantially real time based on what funds are owed to the financial institution and the amount of funds owed to other financial institutions.

In addition to the risk profile, a liquidity profile for a particular financial institution is defined based on how much is owed to the financial institution and how much the financial institution owes to others (e.g., exposures and obligations). In previous systems, financial institutions do not have access to liquidity demands, risk profiles, or liquidity profiles for other financial institutions in substantially real time. These existing systems are limited to a particular financial institution's data and do not provide visibility into the risk profile or liquidity profile of other financial institutions.

However, the systems and methods described herein do provide substantially real time data associated with liquidity demand information for a particular financial institution by jurisdiction, by asset type, and by counterparty. These systems and methods operate in a distributed environment that includes multiple financial institutions, multiple data formats, and the like.

Additionally, the described systems and methods provide substantially real time data associated with a financial institution's risk profile based on the counterparties, jurisdictions, time zones, and the like. Thus, these systems and methods allow a particular financial institution to determine its current liquidity profile and risk profile in substantially real time, which was not previously available. This is accomplished by processing streams of financial data in substantially real time as it flows through the financial market. Additionally, the data from different financial institutions and different data feeds is normalized for consistent processing.

Figure 8:
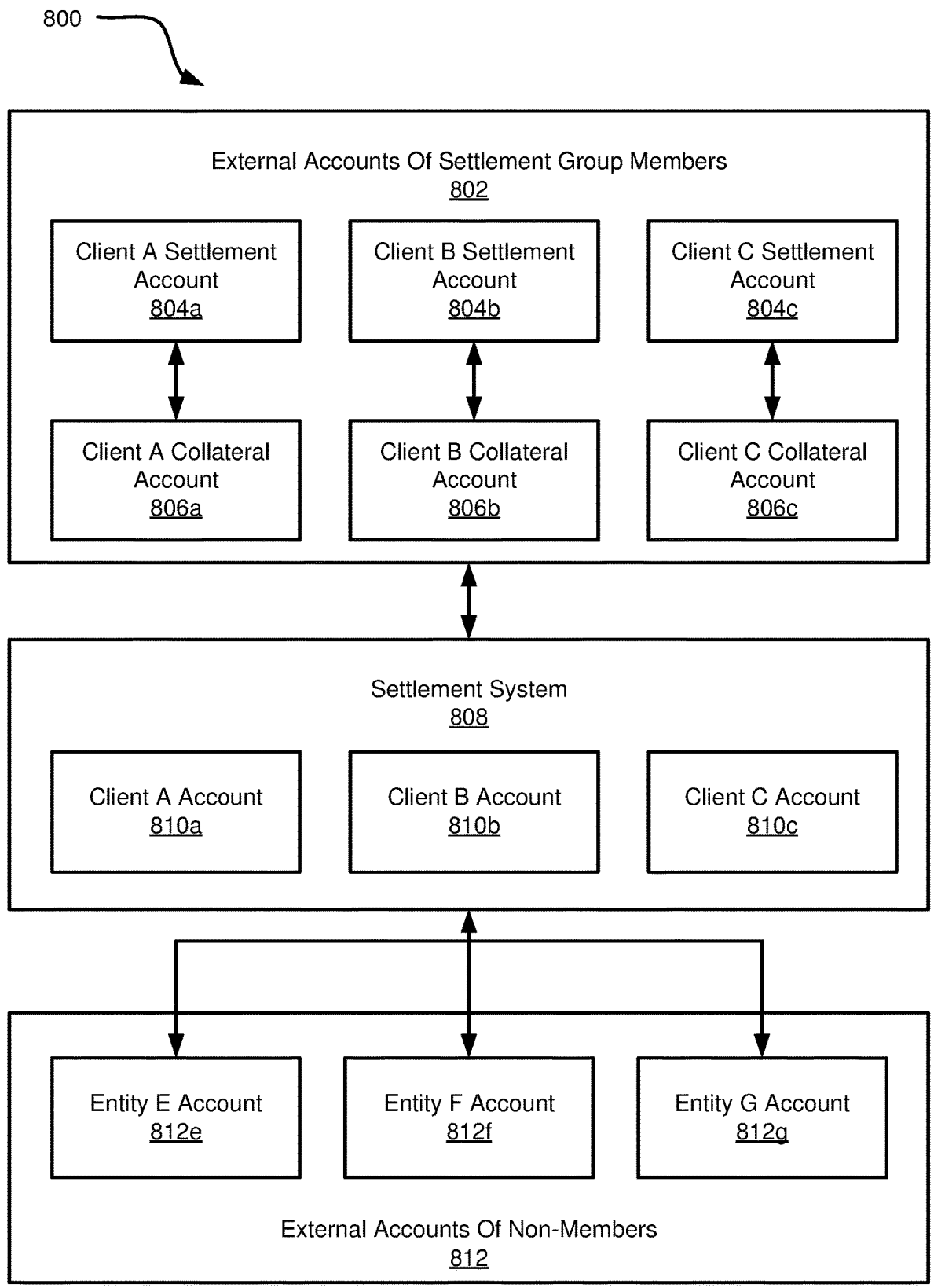
FIG. 8 is a schematic diagram of a system for trade settlement amongst members of a settlement group.

FIG. 8 is a schematic diagram of a system 800 for trade settlement amongst members of a settlement group. The system 100 described herein enables trades and other financial transactions to be settled within minutes of the trade being requested. This a significant improvement over traditional systems that require several days to determine liquidity of the parties and finalize the trade settlement. The systems and methods described herein solve numerous technological problems in the financial industry by moving clients to a settlement group and tracking the clients' real-time liquidity, obligations, and exposures based on data stored in the shared permissioned ledger 110.

Workflows, Clearing, and Settlement

The settlement of assets between participants can involve complex workflows. The workflows may continue from the creation of settlement instructions until assets are actually credited and debited from the accounts. The sequence of actions for enabling a settlement can depend on the workflow and type of assets. Some commonly used settlement sequences include DVP, PVP, FOP (Free of Payments), simple one way payments, and payments to and from segregated client accounts.

The resource manager 102 can be used to build and execute complex workflows. Execution of the workflows results in assets being cleared and settled as agreed upon by participants. In capital markets, participants agree on a set of operating rules which include specific rules on settlement finality. The rules can differ depending on the trade type, asset types or jurisdiction. In some cases, the rules are set by a central counterparty (CCP) or regulatory bodies. Some examples of the operating rules are discussed in the CME US Rule Book, ICE US Rule Book, ICE European Rule Book, and the Board of the International Organization of Securities Commissions on margin requirements for bilateral trades. In some embodiments, movement of assets involves clearing and settlements across multiple banks.

In some embodiments, clearing is defined as the intra-bank movement of assets. More specifically, clearing may involve the following steps. One step for clearing includes integrating into the core ledgers and payment gateway of the financial institutions that are involved in the asset movement. Another step for clearing includes issuing and receiving a series of messages to determine the balance, initiating requests for debits and credits, and getting confirmations of debits and credits. In some embodiments, the aforementioned steps support multiple assets classes.

Settlement is defined as the inter-bank movement of assets in a manner that is final and irreversible. This may involve the following steps. One step of settlement includes integrating into the payment gateway of the banks to issue settlement instruction to the appropriate central settlement agency (e.g., US Fed or DTC in the US) to move the assets between two accounts that reside at the settlement agency. Another step of settlement includes direct communication with the central settlement agencies. In this case, participants can grant the resource manager 102 a power of attorney to issue settlement instructions on behalf of the parties to perform the same settlement.

The system 800 facilitates nearly immediate trade settlement between clients within a settlement group. In the example illustrated in FIG. 8, the settlement system includes three clients, including client A, client B, and client C. It should be appreciated that a settlement group may include any number of clients, and that the efficiency of trading within the settlement group will improve as additional entities join the settlement group.

The settlement group includes a plurality of entities that agree to common terms for settling trades, calculating liquidity, calculating obligations and exposures, and so forth. The clients within the settlement group fall within the jurisdiction of the resource manager 102 and agree to trade with other members of the settlement group according to processes executed by the components of the system 100. The resource manager 102 oversees and manages trades for members of the settlement group, including the ingesting of trade data, storing trade data on the shared permissioned ledger 110, calculating the liquidity of members of the settlement group, and causing trades between members to be executed nearly immediately. The system 100 described herein eliminates the need for time-consuming trade processes that include verifying liquidity, transitioning funds into a suspense account, and finally executing the transition of funds between entities.

The system 800 includes communication with external accounts of settlement group members 802. The external accounts may include the actual bank accounts, mutual funds, hedge funds, cash reserves, securities, and so forth of entities that have joined the settlement group. The external accounts include a suspense account and collateral account for each member of the settlement group. In the example illustrated in FIG. 8, the settlement group includes client A, client B, and client C. The external accounts 802 includes a client A suspense account 804a, a client A collateral account 806a, a client B suspense account 804b, a client B collateral account 806b, a client C suspense account 804c, and a client C collateral account 806c. For settlement utility, each member bank has an account. In some embodiments, the accounts are mirror images of the collateral accounts. Funding and defunding refers to the act of moving money from the suspense account to the collateral account and vice versa.

The system 800 includes the settlement system 808, which is internal to the system 100 described herein. The settlement system 808 is overseen and managed by the resource manager 102. The settlement system includes an internal virtual account for each member of the settlement group. In the example illustrated in FIG. 8, the settlement system 808 includes a client A account 810a, a client B account 810b, and a client C account 810c.

The system 800 may additionally communicate with external accounts of non-members 812 of the suspense account. The non-member accounts may take part in the settlement system 808 despite not having an account within the bank associated with the settlement system 808. The non-member accounts typically work through an intermediary. The non-member banks may work through one or more intermediaries, and typically there is a 1:1 relationship between the number of intermediary accounts associated with the number of non-member accounts. When a trade is executed between a member of the settlement group and a non-member of the settlement group, the trade will require more length verifications of liquidity to transfer assets. Nevertheless, these trades may be executed by communicating directly with the outside parties. Each of the outside parties may have an associated account for crediting and debiting trades, such as entity E account 812e, entity F account 812f, and entity G account 812g illustrated in FIG. 8.

The system 100 may ingest trade data from all settlement group members. The settlement members may be account members or non-account members within the system 100. Non-account members typically work through an intermediary to settle transactions within the settlement group.

The system may execute asset transfers between banks using the ACH (Automated Clearinghouse) payment service. The ACH enables entities to electronically collect payments from customers for either one-off or recurring payments by directly debiting a customer's checking or saving accounts. Common uses of ACH include online bill payment, mortgage and loan repayment, and direct deposit of payroll. Also, many investment managers and brokerage firms allow users to link a bank account or an online funding source to a trading account.

Traditionally, connecting directly to bank accounts has been preferred for numerous reasons, including, for example: lower cost to transfer money using ACH versus paper checks or credit cards; the ability to move large amounts of money; and fewer instances of fraud from ban on accounts compared to credit cards. As discussed herein, a retail payment is considered a movement of amounts smaller than $100,000 (although this can be any amount). Typically, retail payments in and out of a bank account are settled over settlement venues and protocols such as ACH in the U.S., SEPA (Single Euro Payments Area), NACH in India, etc. These payments have numerous advantages, including, for example: low costs; the ability to schedule automatic payments, and the ability to issue a debit pull or credit push.

Despite the aforementioned advantages of ACH, the ACH introduces some disadvantages, including, for example: the inability to determine the validity of the account (this is possible if the user has closed the bank account at a later point in time); the inability to determine the balance in the account even if valid; slow multi-phased settlement protocol that can take hours or even days; and reject codes with the ability to recall the payments later by the account holder. In some situations, rejections in payments are in the range of 1-10% depending on the type of products that are being purchased. For example, certain types of product purchases (e.g., electronics, jewelry, and the like) are more prone to fraud.

The resource manager 102 may add a funding source for moving money between accounts. The resource manager 102 may add the funding source by selecting a bank from a list of retail banks using IAV (Instant Account Verification) and/or microdeposits. IAV is done by asking a user to submit a username and password for the bank (or account). The process proceeds to use these credentials to log in on behalf of the user to validate the account. Microdeposits include a multi-step process, including the following: the user enters the account number and routing number of their banking institution; process makes two or more deposits of small amounts, typically less than $0.25, using the account number and routing number; and if the above step fails, the account number and routing number are considered to be incorrect and the user has to return to the beginning of the process to add a funding source. If there is no error, the process proceeds to the next step. The user comes back to the website or process to complete the addition of the bank account as the funding source by validating the two micro deposit amounts. The fact that the user knew their account number and the routing number, and then was able to accurately validate the two micro deposits is enough proof that the user is indeed the owner of the account. In addition, it also satisfies the BSA (Bank Secrecy Act) requirement for the website or process. When the bank account has been added as a funding source, the website or process will attempt to debit money from or credit money to the account. Debits are done when the website or process attempts to "pull" money from the account to complete a transaction. Credits are done when the website or process allows the user to "push" money to their bank account. This is done when the website or process has an associated product that allows the user to hold money in their account. This can be for online payments products, brokerage accounts, tax products, auction sites, mortgage or rent payments, and the like.

In many systems, payments are completed over ACH or equivalent methods. The initiator is called the originator of the request. The banking regulations require that the originator be a financial institution and is typically called the ODFI (Originating Depository Financial Institution) and the receiver is called the RDFI (Requesting Depository Financial Institution). In the case of a debit-pull, the ODFI is requesting a debit from the other institution. In the case of a credit-push, the ODFI pushes money to the RDFI. In most cases (but not always), the risk is higher on the ODFI as it is the originator of the request.

During the attempt to pull funds, there can be failures which can lead to a direct economic loss for the companies. The following is an illustrative example using an example company brokerage firm ABC-Trading Inc. A customer of ABC Trading adds a bank account as a funding source for their trades and allows ABC Trading to pull and push funds based on their trading activity with the brokerage firm. The customer instructs ABC Trading to buy $5,000 worth of a stock and does not have sufficient balance in their brokerage account to cover the purchase. ABC Trading makes the stock purchase and then must initiate a "pull" of $5,000 from the customer's bank account. ABC Trading initiates a debit-pull by issuing ACH debit instructions to its ODFI. In some cases, ABC Trading may be a bank and can be the ODFI. In other cases, the firm may choose one or more banks where it has a banking relationship to originate the ACH request for them. This can happen on T+0 or T+1 days depending on the cut off time for the ODFI. The ACH debit instructions can be rejected anywhere from T+0 to T+4 days. If at any point, the ACH transfer is rejected, ABC Trading will need to undo the transaction and may be subject to losses if the stock has lost value. There are also operational costs associated with tracking down the funds from the customer.

The steps above may be repeated many thousands of times per day depending on the size of the broker. The process is similar for other companies that offer services such as bill payments, mortgage payments, or online peer-to-peer payment. The firm takes the risk of an unsuccessful debit from point T+0 to T+4 days when the request is complete. The rejections, despite the successful validation of the account, can occur due to one or more of the following. The inability to validate the account at point T+0: It is possible that the account may have been closed by the user. ABC Trading has no information about the closure of the account at point T+0. Following the closure of the account, any attempt to debit the amounts from the account will result in a rejection. Another reason for rejection is caused by insufficient balance in the account, wherein the account did not have sufficient balance to complete the request. In the example above, the account did not have $5000.

Figure 9:
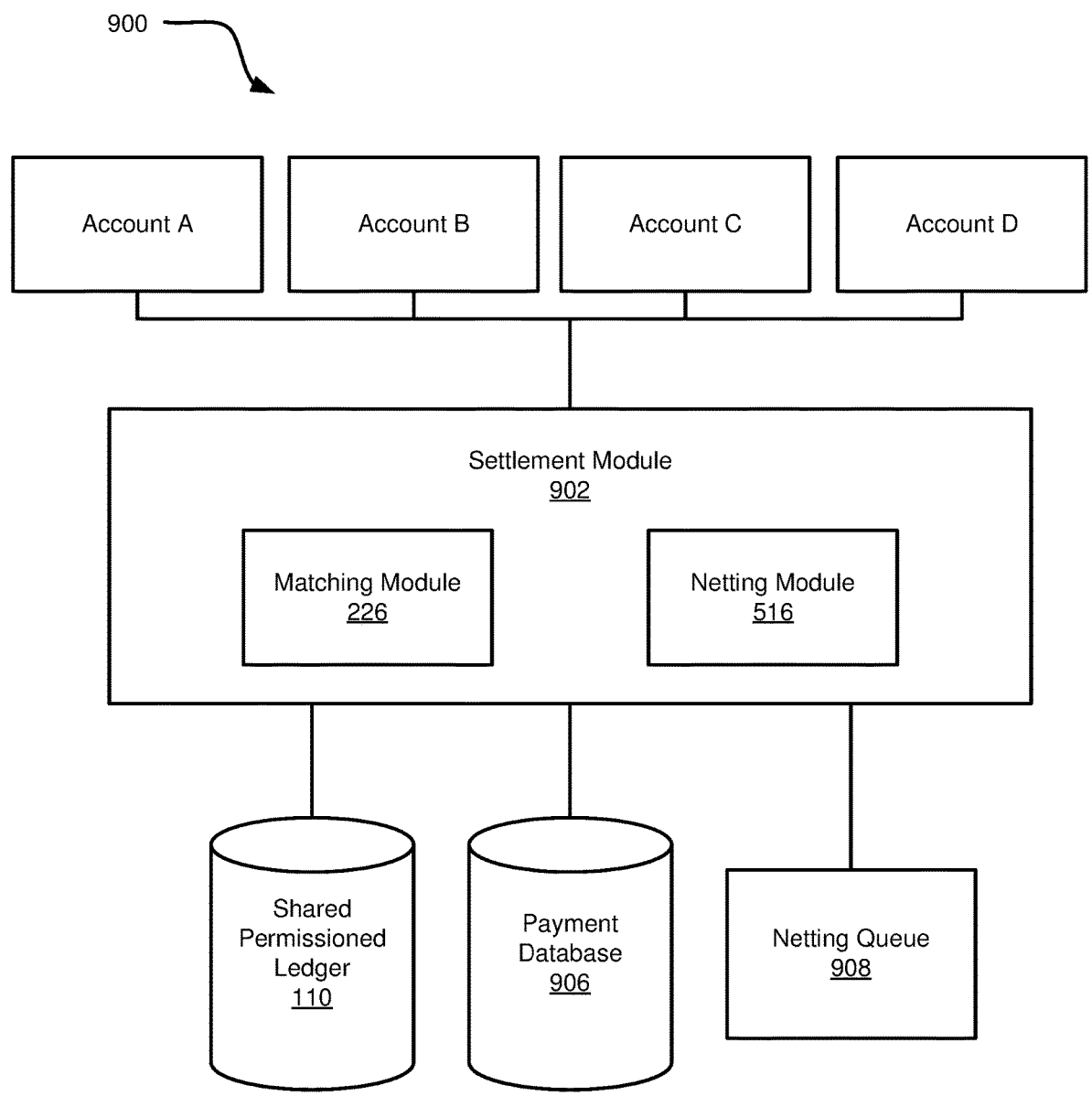
FIG. 9 is a schematic diagram of a system for settling trades between members of a settlement group based at least in part on outputs from a settlement module.

FIG. 9 is a schematic diagram of a system 900 for settling trades between members of a settlement group. The system 900 includes a settlement module 902. In an embodiment, the settlement module 902 is a component of the resource manager 102. The settlement module 902 leverages information and calculations executed the matching module 226 and the netting module 516. The settlement module 902 is in communication with the shared permissioned ledger 110, a payment database 906, and a netting queue 908. The settlement module 902 manages the nearly real-time settlement of trades between members of a settlement group. In the example illustrated in FIG. 9, the settlement group includes account A, account B, account C, and account D. It should be appreciated that the settlement group may include any number of accounts.

The settlement module 902 includes numerous adapters for communicating with outside parties. The settlement module 902 includes one or more software modules that are trained to speak with certain dialogue of SWIFT message. In some cases, the settlement module 902 includes a software module that provides instructions on how to communicate with an outside party in a proprietary language associated with the outside party. For example, the settlement module 902 is configured to provide language-specific SWIFT messages to different banks based on the protocols used at each bank. The settlement module 902 can be configured to speak in a different message format for each financial institution the settlement module 902 communicates with. The settlement module 902 additionally receives SWIFT messages from outside parties (e.g., financial institutions such as banks, clearinghouses, hedge funds, exchanges, and so forth) and is configured to translate those messages into the correct format. The translated data may be recorded on the shared permissioned ledger 110. The settlement module 902 can additionally provide a message to the counterparty to a trade indicating that the assets are being moved.

The system uses the matching module 226 and the netting module 516 during various processing and settlement activities. A particular trade may contain a settlement cycle in addition to a value date, which allows the system to support multiple settlement cycles within a particular day. The settlement cycles may occur at the top of the hour. Each party within the settlement cycle can view incoming and outgoing data associated with any transaction wherein that party is a principal. The parties cannot view data for other transactions wherein they are not a principal to the trade. If the party is a beneficiary of a trade, the party cannot see the trade information but can view the settlement.

The system 100 supports multiple types of payments based on the urgency of the settlements. For example, a particular implementation may include normal payments, priority payments, and urgent payments. The different types of payments may be thought of as priority queues.

The system 100 supports the ability for a specific payment to be split into multiple parts. The system 100 provides an option for a specific payment to be split into multiple parts. The settlement module 902 indicates that the smaller payments are "payparts," or partial payments. The system 100 leverages the liquidity savings mechanisms when offering the ability to split up a payment. The settlement module 902 causes data entries to be stored on the payment database 906 that link the payment into its payparts, and additionally pink the payparts to the parent payment.

The liquidity savings mechanism enables numerous benefits. By default, payments are optimized to give participants the maximum liquidity efficiency. The urgent payment option is slightly different because the payment needs to be carried out very quickly. In some implementations, the settlement module 902 will settle payments on the top of the hour. The settlement module 902 may set urgent payments to be settled every minute. The urgent payments have the option to bypass optimization.

Once a settlement is completed, there is a feedback loop into the input stream of the obligations and exposures processor that will adjust the obligations and exposures for the parties. In an example implementation, the trades are assumed to be bilateral such that each client node has the information on who it is selling to or buying from. The data generation is currently computed at a trade ID level. The data includes one or more of the following fields: primary node, secondary node, order/trade ID, symbol, order quantity, order price, execution ID, record type, order date, and settlement date. For purposes of this example, three nodes are described, including node1, node2, and node3. For each order there will be a corresponding buy and sell record. The data is generated in three separate streams, including node_a, node_b, and node_c (corresponding with node1, node2, and node3). The data in the stream node_a will include records where node1 is the primary node. The data in the stream node_b will include records where node2 is the primary node, and the data in the stream node_c will include records where node3 is the primary node. The kinesis client will push the CSV (comma-separated values) records to three separate streams, including node-a-sample, node-b-sample, and node-c-sample.

Further to the above example, the matching module 226 assesses the buy and sell records and matches on the trade/order ID to identify the buyer, seller, and trade information with settlementDate in a separate stream called the settlement sample. The obligations and exposures module calculates the obligations and exposures on the matched ordered stream (i.e., the settlement-sample) and produces a new stream, i.e., the obligations-exposures stream.

In some implementations, the trades need to be settled in net or in gross. One or more of the attributes of the trades $E(Tx\ Mi) => \{a1, a2 \ldots an\}$ will indicate the settlement mode (gross vs net). The attributes will also include other fields such as 'value date', 'value amount', 'settlement date', 'settlement cycle', and the like.

The netting module 516 calculates a netting group based on one or more of the following steps. The netting module 516 groups matched trades (as determined by the matching module 226) between parties based on join criteria with an AND clause. The join criteria includes one or more of matching counterparty, same settlement date, same settlement cycle, and settlement type (i.e., netted versus gross). The netting module 516 calculates the sum of the value amounts for each of the groups. This is the netted amount.

The netting module 516 calculates bilateral and multilateral netting of transactions. Bilateral netting is a process where two parties reduce or aggregate the overall number of transactions between them. This bilateral netting decreases the actual transaction volume between the two parties. Multilateral netting is an arrangement between multiple parties that transactions be aggregated or summed rather than settled individually. The multilateral netting process may be executed as part of a settlement group as described herein. Multilateral netting streamlines the settlement process among multiple parties. In some situations, multilateral netting reduces risk by specifying that all outstanding contracts will be terminated if there is a default or other termination event.

The netting module 516 assigns a netting identifier to all trades within the netting group. The netting module 516 defines the netting ID and additionally identifies all trade IDs that are associated with the netting ID (i.e., all trades that will be settled as part of the netting group). The netting module 516 may cause a new data entry to be stored on the shared permissioned ledger 110 that includes an indication of the netting ID for the netting group, and further includes an indication of all trade IDs and/or transactions that are executed as part of the netting group. The data entry may additionally include state information for the netting group, for example, when the netting group was settled, whether all trades within the netting group were settled successfully, whether there was an error in settling the netting group, and so forth.

The resource manager 102 may be in communication with financial institutions that participate in the FX (Forex) markets. FX markets deal with settlement of over 140 currencies. The supply and demand along with credit extension for each of these currencies can vary significantly by counterparty and by trading currency pair. In some implementations, these factors, along with limited visibility on payment receivables by counterparties, may contribute to suboptimal settlement among trading parties.

In particular situations, certain limitations may cause increased risk in the financial systems as counterparties build exposures and obligations settling occasionally. For example, problems can occur when there is limited overlap between settlement windows of different currencies. For trades with limited overlap of currency settlements, one side makes the payment on T+1, increasing the risk in the system.

In another example, some systems are free of payments transactions for settling obligations, which may lead to limited visibility on fulfillment of exposures. Additionally, credit limit thresholds for currencies can present problems. For example, some institutions have limited credit for various currencies and need to have their exposures by trading parties paid before making more payments which can cause deadlocks to occur.

In another example, an end-of-day settlement can result in the most efficient demand requirements from a treasury perspective. However, this may lead to the greatest inter-party risk and deadlocks. This is especially true when payments are made as FOP (Free of Payment) rather than PVP (Payment versus Payment), DVP (Delivery versus Payment), or DVD (Delivery versus Delivery). In some situations, gross trade settlement (PVP) has the least risk but can lead to undue strain on liquidity requirements for the participants.

The systems and methods described herein address these possible limitations and problems. The system may efficiently net payments bilaterally and multilaterally with any number of counterparties. The system may use settlement groups, which are logical groupings of parties involved in various trades. These parties include principals, observers, settlement agents, and regulatory bodies. Settlement groups in the described platform define a set of operational rules between parties of the group. Some of these rules may be related to settlement frequencies and/or thresholds, rules related to notification of observers, and settlement venues and/or agents for different assets.

The settlement module 902 may include suspense accounts, which are special purpose accounts in which account assets are protected from the risk of default by the institution at which the suspense accounts are held. The suspense account assets are protected from default of the originator of the assets that fund the suspense accounts.

The netting module 516 additionally determines when trades should be settled. The netting module 516 includes one or more processors for executing stochastic trading liquidity models. The stochastic trading liquidity models represent predictability models of future trade obligations and exposures based on historical data. The stochastic trading liquidity models predict future obligations and exposures for the parties within the settlement group. These predictions are based on numerous factors, including one or more of: quantity and standard deviation. The quantity includes the predictive quantity p(q) for each asset obligation and exposure for a given counterparty.

The netting module 516 includes a demand optimization engine that leverages output from the stochastic trading liquidity model, data stream inputs ingested by the data ingestion engine 224, data stored on the shared permissioned ledger 110, and settlement frequencies defined as part of the settlement group. The demand optimization engine constructs and smooths liquidity demands across settlement cycles. The demand optimization engine ensures the liquidity demands for settlement group principals closely align with end-of-trading-day requirements. The stochastic trading liquidity models are based on historical trading data, such as historical trade volumes.

The data ingestion engine 224 receives data streams from the parties in near real-time. The data ingested by the data ingestion engine 224 is analyzed by the netting module 516 and/or liquidity module 228 to calculate overall netted obligations and exposures. The netting module 516 and/or liquidity module 228 calculates the obligations and exposures by counterparty. This is made possible by the unique structure of the system 100 described herein, wherein multiple parties push data to the data ingestion engine 224 that can be assessed by the resource manager. The resource manager 102 can therefore calculate overall obligations and exposures for all parties within a settlement group falling under the jurisdiction of the resource manager 102. This significantly minimizes risk and allows parties to execute trades within minutes, if desired.

At any given point t1 the liquidity module 228 is able to calculate overall obligations and exposures by assets and counterparties. The demand optimization engine of the netting module 516 selects trades for a given netting cycle based on one or more of the current state of workflows, stochastic models built from historical trading predications, asset thresholds, and netting. The netting module 516 determines whether the trades within a netting cycle align with the overall bilateral netted obligations and exposures between two counterparties with some standard deviation for netting cycle (sn0).

Multilateral netting is an extension of bilateral demand optimization. However, in a multilateral netting cycle, the demand optimization engine operates in two phases. In the first phase, the demand optimization engine generates overall obligation and exposures for the cycle based on the factors similar to bilateral netting. In the second phase, the initial multilateral netting cycle is broken down into multiple bilateral netted cycles by the demand optimization engine. In the second phase, the objective function of the demand optimization engine is changed to break trades bilaterally and use the overall obligations and exposures as the thresholds between trading parties.

The netting module 516 identifies differences in the netting groups identified by various parties. For example, a first party in a netting may identify a certain set of trades to be executed in the net, and a second party may identify a different set of trades to be executed in the net. The netting module 516 analyzes the netting groups trade-by-trade to identify differences in the netting groups. In traditional systems, if the netting groups between parties are not identical, then parties typically initiate a phone call to walk through the netting groups trade-by-trade and identify the differences. This traditional process is a time-intensive, manual process. The netting module 516 described herein automates this process to determine (a) what trades are different between the two netting groups; and (b) determine whether the netting group should be settled despite the differences based on predetermined thresholds. For example, the netting module 516 may be trained to carry forward with the settlement of the netting group if the netting calculations between counterparties are off by only a threshold amount. In this case, the counterparties may agree that the disparate amount is negligible enough to not justify a thorough examination of the disparities between the netting groups. If the disparity between the netting groups exceeds the threshold for either counterparty, the netting module 516 triggers a notification to all counterparties. The counterparties may then manually review the netting group and approve or deny settlement of the netting group.

The netting module 516 selects trades that will be included in a netting group and settled. In most cases, the netting group includes all trades that have not been executed since closing of the last netting group. This includes trades left in the pipeline that have not yet been settled. The netting module 516 groups the trades in the netting group by generating a unique netting ID and attaching the netting ID to each of the trades in the netting group. The netting module 516 causes a new data entry to be stored on the shared permissioned ledger 110 for each trade within the netting group. The new data entry supersedes prior data entries of that trade and indicates that the trade is part of the netting group. The new data entry additionally provides the netting ID associated with the trade. The shared permissioned ledger 110 can subsequently be queried on the netting ID to identify all trades that were part of the netting group. Any remaining trades that are not included in the netting group are paused and may be recaptured in a subsequent netting group.

In some cases, the netting module 516 eliminates one or more trades that would normally be included in the netting group. A trade may be eliminated from a netting group because the trade does not meet a threshold defined by a client account, for example, the trade is deemed to exceed a quantity threshold, a value threshold, a risk threshold, and so forth. Client accounts can provide rules for generating netting groups. The netting module 516 may adhere to these rules to form custom netting groups according to client specifications. For example, the netting module 516 may generate independent netting groups for executing only a portion of the trades, independent netting groups based on business function, independent netting groups based on asset-type, independent netting groups based on internal/external entities, and so forth.

Figure 10:
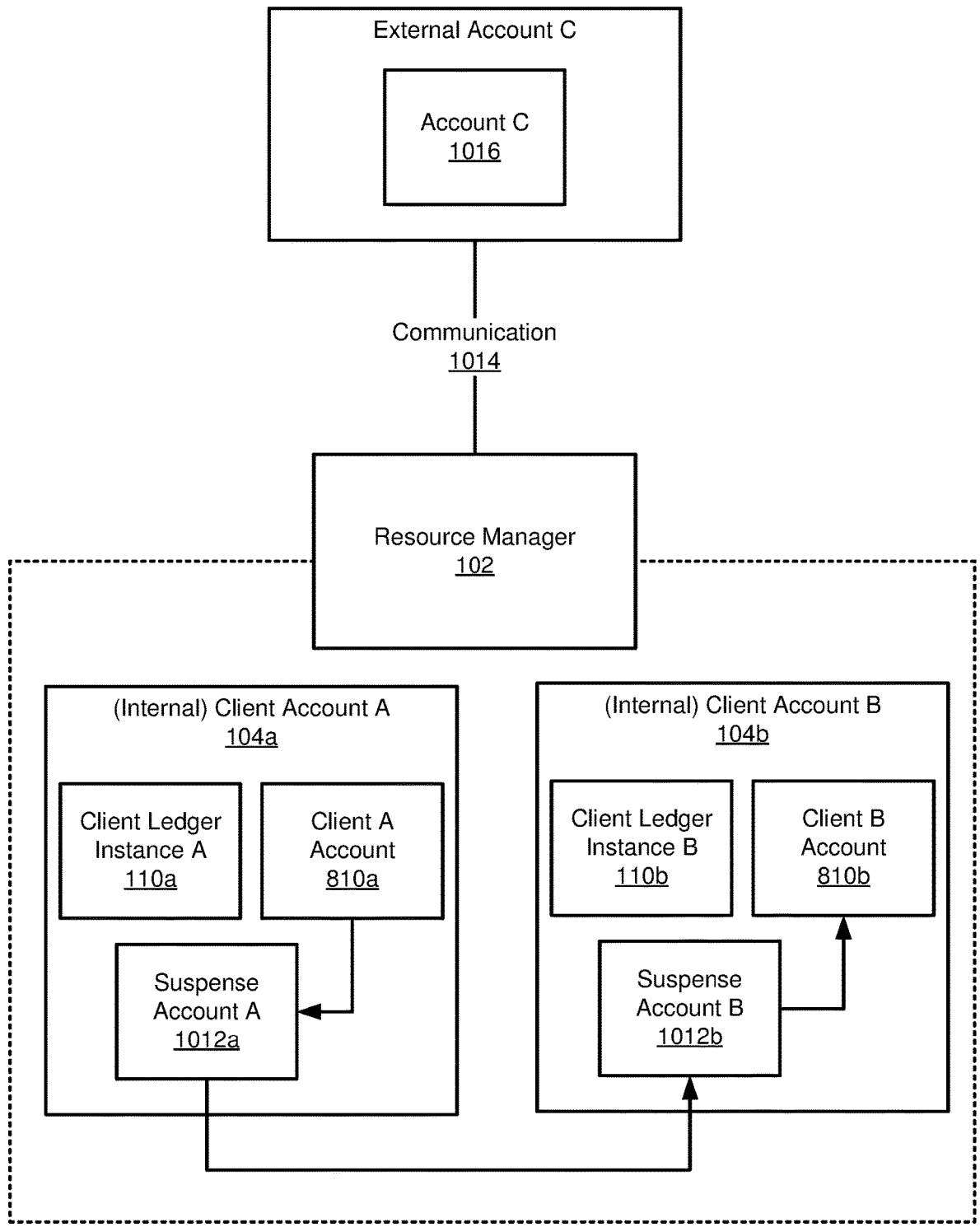
FIG. 10 is a schematic diagram of a system and process flow for executing an asset transfer between client accounts and/or an external account.

FIG. 10 is a schematic diagram of a system and process flow for executing an asset transfer between client accounts and/or an external account. The example illustrated in FIG. 10 includes two client accounts and one external account. The client accounts agree to the terms of a settlement group within the jurisdiction of the resource manager 102. The external account is outside the jurisdiction of the resource manager 102. The client accounts and external account may include a financial institution such as a bank, hedge fund, and so forth.

The resource manager 102 is in communication with the (internal) client account A and the (internal) client account B. As discussed herein, the resource manager 102 calculates real-time liquidity, obligations, and exposures for the client accounts based on data that is ingested from the client accounts in real-time and data that is stored in the shared permissioned ledger 110. The resource manager 102 does not have real-time insight into the liquidity, obligations, and exposures of the external account. The resource manager 102 must communicate 1014 directly with the external account to execute a trade between the external account and one or more internal accounts. The communication 1014 between the resource manager 102 and the external account may include SWIFT messaging. The resource manager 102 may include a software module specific to the external account that enables the resource manager 102 to communicate with the external account in the language used by the external account, and further to translate messages received from the external account.

When the resource manager 102 executes a netting cycle or other settlement with an external account (i.e., an account outside the "jurisdiction" of the resource manger 102), the resource manager receives a data stream from the external account. The data stream may be received by way of a secure API, SWIFT messaging, and/or some other secure and suitable means of communication. The resource manager 102 matches the incoming data stream from the external account to another data stream associated with an internal client account. The resource manager 102 calculates the risk profile and nets transactions based on the matched trade data from the external account and the internal account.

The resource manager 102 facilitates the transfer of funds between banks associated with client account A and client account B. In an embodiment, the suspense accounts 1012a, 1012b are established as part of an onboarding process when the client account joins the jurisdiction of the resource manager 102. For example, the resource manager 102 administrators may work with financial institutions to establish suspense accounts that can interact with the resource manager 102 as described herein.

In some embodiments, one or more components discussed herein are contained in a traditional infrastructure of a bank or other financial institution. For example, an HSM (Hardware Security Module) in a bank may execute software or contain hardware components that interact with a resource manager 102 to facilitate the various methods and systems discussed herein. In some embodiments, the HSM provides security signatures and other authentication mechanisms to authenticate participants of a transaction.

To facilitate the transfer of funds out of client A account 810a, the funds are transferred from client A account 810a to the suspense account A 1012a at a bank associated with client account A 104a. The suspense accounts discussed herein are "For Benefit Of" (FBO) accounts operated by the resource manager 102 for members of the network (i.e., client accounts under control of the resource manager 102 and other principals to transactions). The resource manager 102 facilitates the transfer of assets into and out of suspense accounts 1012. However, the resource manager 102 does not take ownership of the assets in the suspense accounts 1012. The credits and debits associated with each suspense account 1012 are issued by the resource manager 102. The shared permissioned ledger 110 is used to track ownership of funds within the suspense accounts 1012. Each suspense account 1012 has associated governance rules that define how the suspense account 1012 operates.

At the bank associated with client account B 104b, the transferred funds are received by the suspense account B 1012b. The funds are moved from the suspense account B 1012b to client B account 810b at the bank associated with the client account B 104b. The resource manager 102 facilitates the transfer of funds between the bank associated with client account A 104a and the bank associated with client account B 104b.

Although only one account and one suspense account is shown for each client account in FIG. 10, particular embodiments of the banks associated with the client accounts may include any number of accounts and suspense accounts. Additionally, the banks may include any number of internal data systems and ledgers. The suspense accounts 1012 may be established as part of an onboarding process when connecting the client account 104 to the resource manager 102. Resource manager 102 administrators may work with financial institutions to establish suspense accounts that can interact with the resource manager 102 as discussed herein.

One or more components discussed herein are contained in a traditional infrastructure of a bank or other financial institution, For example, an HSM (Hardware Security Module) in a bank may execute software or contain hardware components that interact with the resource manager 102 to facilitate the various methods and systems discussed herein. The HSM may provide security signatures and other authentication mechanisms to authenticate participants of a transaction.

Figure 11:
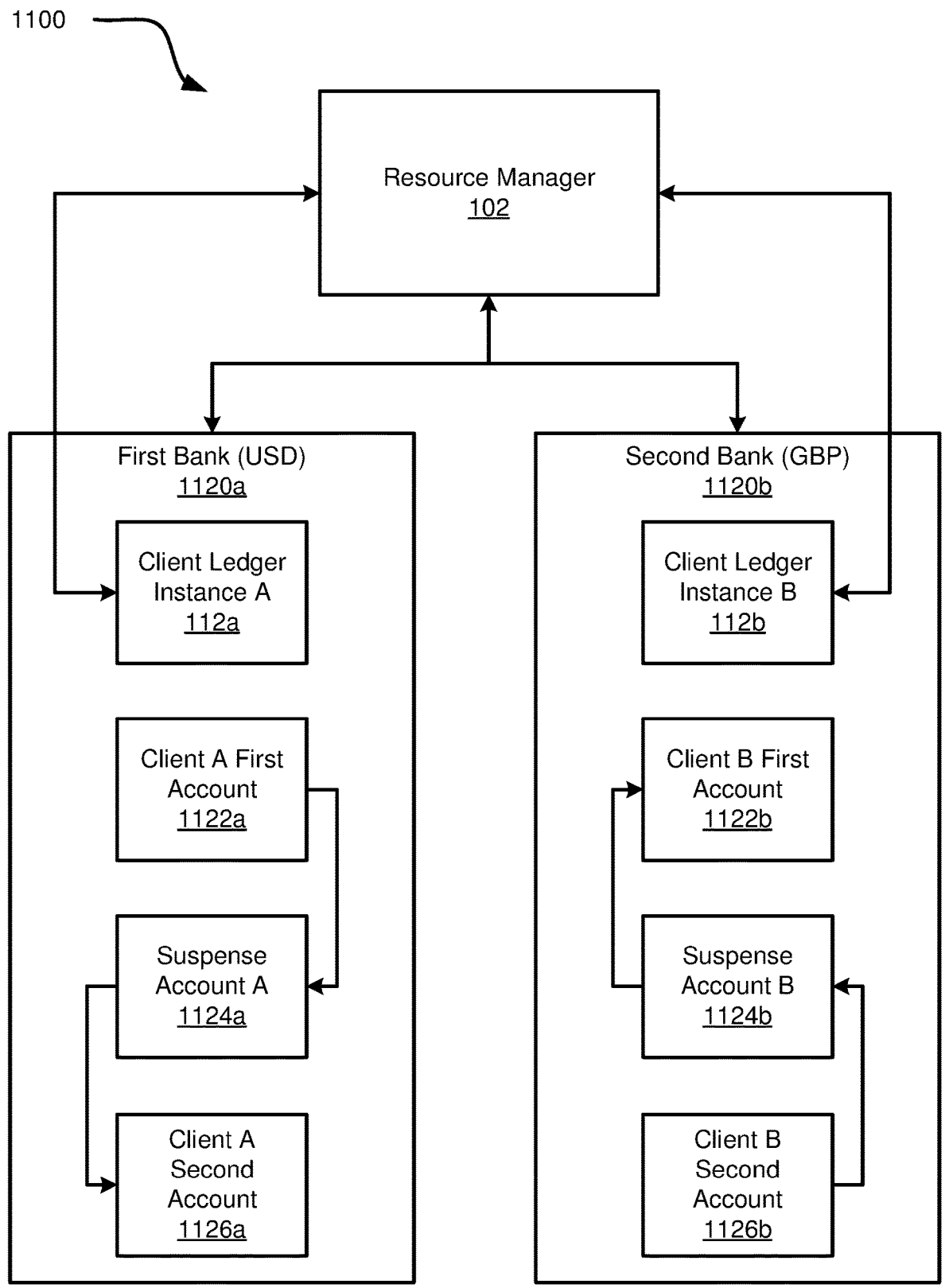
FIG. 11 is a schematic diagram of a system for executing an asset transfer between two financial institutions using different currencies.

FIG. 11 is a schematic diagram of a system 1100 for executing an asset transfer between two financial institutions using two different currencies. FIG. 11 specifically illustrates an example of a PVP (Payment Versus Payment) asset flow. In this example, the resource manager 102 is in communication with a first bank 1120a and a second bank 1120b. Funds are being transferred from client A first account 1122a at the first bank 1120 to client B first account 1122b at the second bank 1120b. Funds are also transferred from client B second account 1126b through the suspense account B 1124b and on to the client B first account 1122b.

The first bank 1120a operates with USD currency and the second bank 1120b operates with GBP currency. The first bank 1120a maintains client ledger instance A 112a that identifies all transactions and data associated with transactions that involve the first bank 1120a. The second bank 1120b maintains the client ledger instance B 112b that identifies all transactions and data associated with transactions that involve the second bank 1120b. The client ledger instances 112a, 112b are maintained by the resource manager 102 as part of the shared permissioned ledger 110.

In the example illustrated in FIG. 11, USD funds are being transferred out of client A first account 1122a at the first bank 1120a and GBP funds are being transferred out of client B second account 1126b at the second bank 1120b. To facilitate the transfer of funds out of client A first account 1122a, the funds being transferred are moved to the suspense account A 1124a at the first bank 1120a. Similarly, funds are moved from client B second account 1126b to suspense account B 1124b at the second bank 1120b.

The suspense accounts discussed herein are "For Benefit Of" (FBO) accounts operated by the resource manager 102 for members of the network. The resource manager 102 facilitates the transfer of assets into and out of the suspense accounts 1124a, 1124b. The resource manager 102 does not take ownership of the assets in the suspense accounts 1124a, 1124b. The credits and debits associated with each suspense account are issued by the resource manager 102 based on data entries stored on the shared permissioned ledger 110.

At the second bank 1120b, the transferred funds are received by the suspense account B 1124b. The funds are moved from the suspense account B 1124b to the client B first account 1122*b*. Similarly, at the first bank 1120*a*, the transferred funds are received by the suspense account A 1124*a* and moved to the client A second account 1126*a*. The resource manager 102 facilitates the transfer of funds between the first bank 1120*a* and the second bank 1120*b*.

Figure 12:
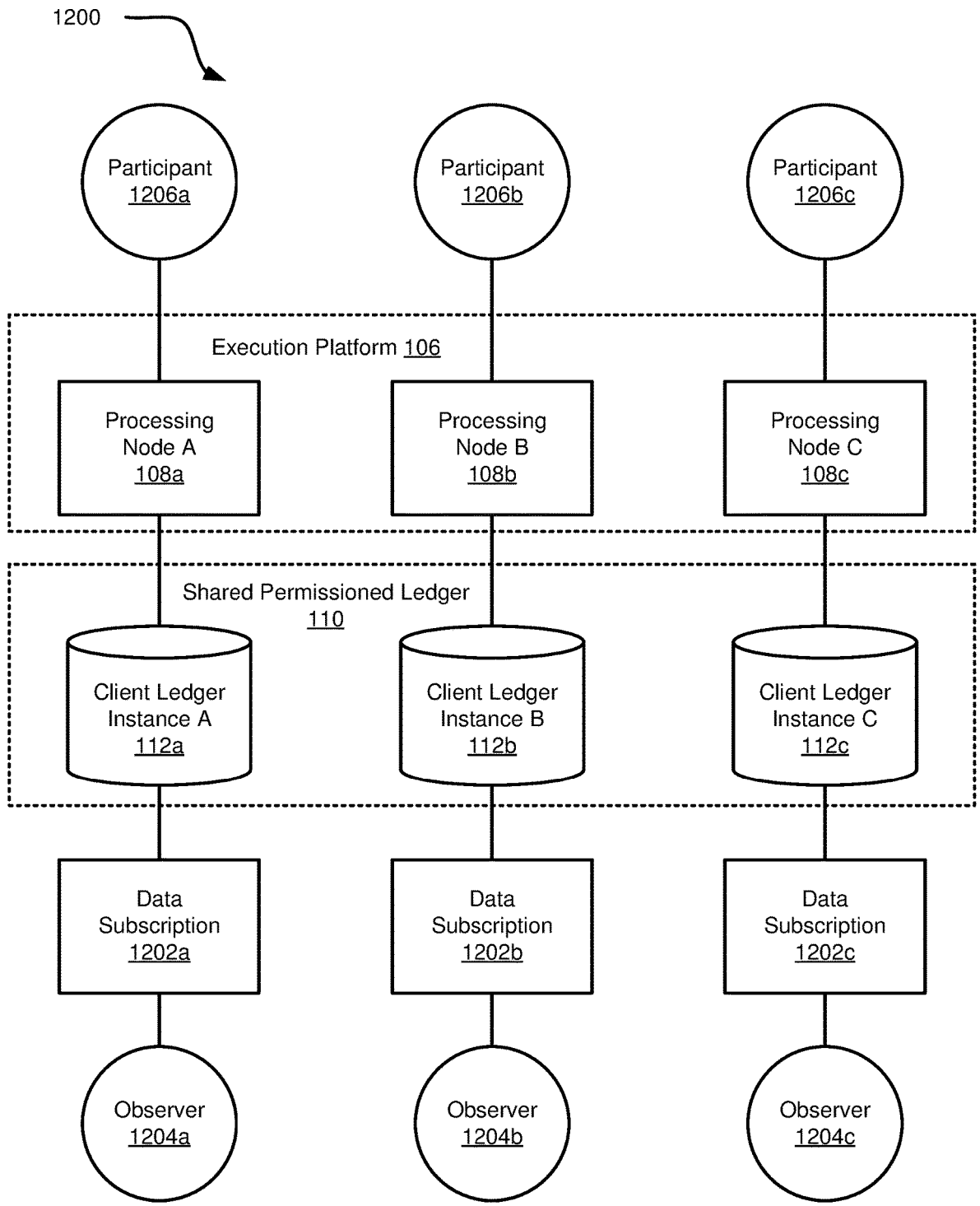
FIG. 12 is a schematic diagram of a system for pushing data by way of a subscription model to authorized nodes of a shared permissioned ledger.

FIG. 12 is a schematic diagram of a system 1200 for pushing data by way of a subscription model. The system 1200 is implemented by the resource manager 102 for tracking the status of different events, such as currency exchanges, trades, communications, and various transactions. The system 1200 includes one or more participants 1206*a*, 1206*b*, 1206*c* (collectively referred to herein as participants 1206) in communication with the execution platform 106. The participants 1206 may include any party to an event (e.g., principals to a trade or other transaction) and may further include client accounts managed by the resource manager 102. The participants 1206 can access data stored on their own respective client ledger instances 112. The participants 1206 cannot access data stored on other client ledger instances 112, as illustrated in FIG. 12. The participants 1206 may indicate to the data subscription 1202 model that they wish to be updated about state changes on an event.

The system 1200 further includes one or more observers 1204*a*, 1204*b*, 1204*c* that are not involved in a subscribed event but can nevertheless received updates about the event. In an example implementation, the event includes a plurality of trades between a first principal and a second principal. One or more of the first principal and the second principal may be participants 1206 managed by the resource manager 102 that can access their respective client ledger instances 112 to receive and/or retrieve information about the plurality of trades. The observer 1204 may include an outside party that needs information about the plurality of trades despite not being a part to any of the trades. Example observers 1204 include, for example, banks facilitating the trade, exchanges, clearinghouses, regulatory agencies, and so forth. The observer 1204 can subscribe to one or more events (e.g., trades, communications, transactions) and receive updates about those one or more events. The updates are retrieved from the shared permissioned ledger 110 and pushed to the observer 1204 by way of the data subscription 1202 module.

Information associated with the subscribed participants 1206 and subscribed observers 1204 is stored in the shared permissioned ledger 110. The data may be partitioned into a specific subscription database, which may be independent of the shared permissioned ledger 110 or may include a portion of the shared permissioned ledger 110. The resource manager 102 detects state changes for a particular event and identifies one or more transaction events that should be pushed to the subscribed participants 1206 and subscribed observers 1204 by way of the data subscription 1202 module.

The participants 1206 and observers 1204 may subscribe to any number of event types. Example event types include workflow initiated events, clearing and settlement instruction initiated events, balance checks failed events, overdraft requested events, overdraft approved events, and settlement completed events. When subscribing to an event type, the participants 1206 and observers 1204 specify the notification protocol. Example notification protocols include SMTP/email, SMS, text protocol, webhooks, push APIs, the w3c standard, and so forth. When an event type is triggered for which there is a subscription, the appropriate notification protocol is initiated between the resource manager 102 and the subscriber. The subscriber is notified using the notification protocol in substantially real-time.

The resource manager 102 additionally includes a query interface and a reporting interface to view events and associated metadata. The resource manager 102 provides a search API that provides the ability to search for the part of the shared permissioned ledger 110 that the particular subscriber is authorized to view. Only the participants 1206 and authorized observers 1204 to a particular event are granted access to view the details of the particular event. The search API and the reports can further be filtered by any or all of the following categories, including asset type, date range, amount (of asset type), participant identifier, workflow type, clearing type, and so forth.

The shared permissioned ledger 110 maintains a history of all transactions within a network or other operating environment. The shared permissioned ledger 110 provides a query interface for participants and observers to search for parts of the ledger they are authorized to view. The shared permissioned ledger 110 provides a subscription-based interface for participants to be notified of changes in the network as the changes occur.

In some implementations, transactions are initiated by client accounts for one-off money transfer requests or when a workflow is executed by the members of a clearing group. The execution of the workflow triggers one or more transactions that reflect the movement of assets between the participants. Each transaction can include metadata that the principals use for internal business processes. Examples of the metadata includes reconciliation instructions, specific messages, and accounting code.

In some cases, payments flow as part of a Forex (FX) workflow. Forex is a market for trading currencies. In an example Forex workflow where client A enters into a Forex trade with client B, the following reconciliations will be executed for the participants. Client A and client B will choose to trade directly with the market maker or through their correspondent banks that have a relationship with the market maker. The market maker creates the market and facilitates the trade by connection the two parties, including one party that is buying a first currency in return for one that is selling a second currency. The market maker earns the spread between the buying price and selling price which may be higher than market price. If correspondent banks are involved, the market maker wires the funds to the end accounts for clients A and B. This involves wiring funds through a central bank in respective countries. The market maker may have different ledger technologies in the two countries that may operate as different legal entities. The market maker may have nostro accounts to reconcile the fund payments of obligations between legal entities. A nostro account refers to an account at a bank that holds a foreign currency from another bank. In this case, multiple reconciliations may be needed, including between a client and correspondent banks on both sides of a transaction, and between a correspondent bank and market makers on both sides of the transaction.

Data is pushed by way of the data subscription 1202 module as a trade transitions through certain events. The data subscription 1202 model pushes trade events to participants 1206 and observers 1204 based on the rules set by the participants 1206 and observers 1204. The data may be pushed in a raw format or may be pre-formatted by the resource manager 102 and pushed to the participant 1206 and/or observer 1204 in a desired data format.

The resource manager 102 implements a default data subscription 1202 model for participants to a trade. The default model may be altered by any participant node. The default data subscription 1202 model generates duplicate or semi-duplicate data entries stored on the shared permissioned ledger 110. If a trade includes two participants, and each participant is associated with a client ledger instance 112 on the shared permissioned ledger 110, then the resource manager 102 generates a data entry representing a state change for the trade for each client ledge instance 112. The default data subscription 1202 model can be further enhanced by pushing data to other observer 1204 nodes.

An example data subscription 1202 includes a trigger indicating that, for example, if any trade is valued over $10 Million, then updates on the trade will be sent to an authorized observer node associated with a regulatory body. It should be appreciated that the data subscription 1202 model may include any suitable triggers as defined by client accounts, regulatory agencies, exchanges, clearinghouses, and so forth.

Figure 13:
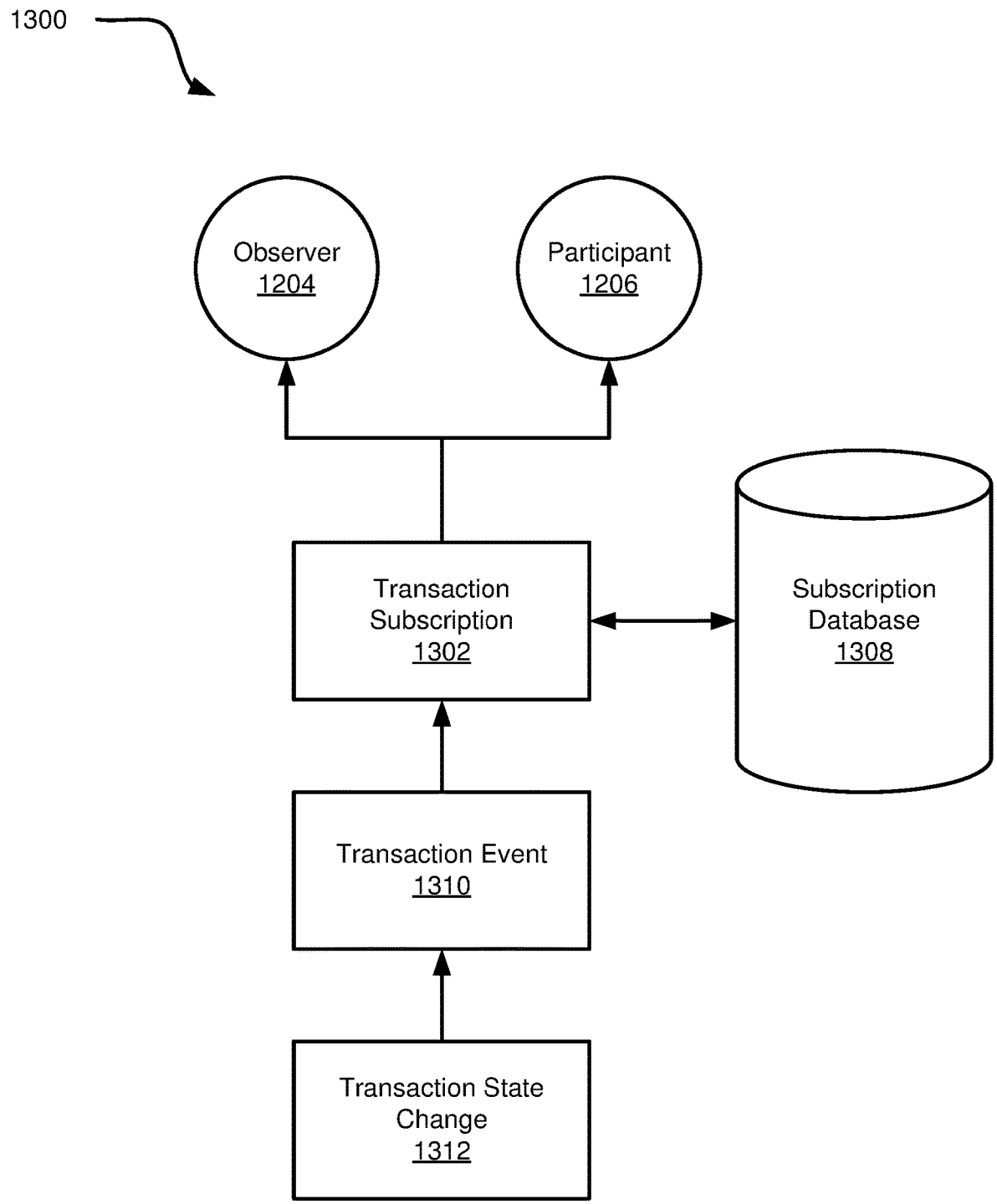
FIG. 13 is a schematic diagram of a system for pushing data events to participants and observers according to a subscription model.

FIG. 13 is a schematic diagram of a system 1300 for pushing data events to participants and observers according to a subscription model. The system 1300 includes a subscription database 1308, which may include a portion of the shared permissioned ledger 110, certain data entries stored across the shared permissioned ledger 110, and/or an independent database. The participants 1206 and observers 1204 to a transaction may create a transaction subscription 1302. The transaction subscription 1302 indicates what events the subscriber wishes to be notified about, and how the subscriber wishes to be notified. The resource manager 102 verifies the subscriber is authorized to subscribe to the requested transaction subscription 1302.

The transaction subscription 1302 is triggered by a transaction state change 1312 and/or applicable transaction event 1310. When the transaction subscription 1302 is triggered, the resource manager 102 causes a notification to be send to the subscriber, wherein the notification comprises information retrieved from the subscription database 1302. The subscribers are additionally granted permission to directly query the subscription database 1308 for information pertaining to the transaction subscription 1302.

The subscription database 1308 is an independent ledger instance on the shared permissioned database 110, similar to the independent client ledger instances 112 associated with the client accounts 104. The subscription database 1308 is an independent service that runs on top of the system 100 as part of the shared permissioned ledger 110. The subscription database 1308 indicates which client account nodes can interact with other client account nodes, and further indicates what data can be pushed out to authorized observers 1204 and/to other participants 1206 or other client account nodes within the system 100.

In an implementation, the subscription database 1308 includes a replicated copy of data stored on the shared permissioned ledger. In another implementation, the subscription database 1308 includes metadata pointing to data stored on the shared permissioned ledger. The subscription database 1308 includes data that can be pushed to participants 1206 and observers 1204. The data contained in the subscription database 1308 is replicated from data stored on the shared permissioned ledger so that each client account knows where the data will be replicated. Individual client accounts can see where their data is replicated and have access to any public node definitions (e.g., regulatory bodies) so the client accounts can setup subscription rules for replication to non-participant nodes of the transaction.

Figure 14:
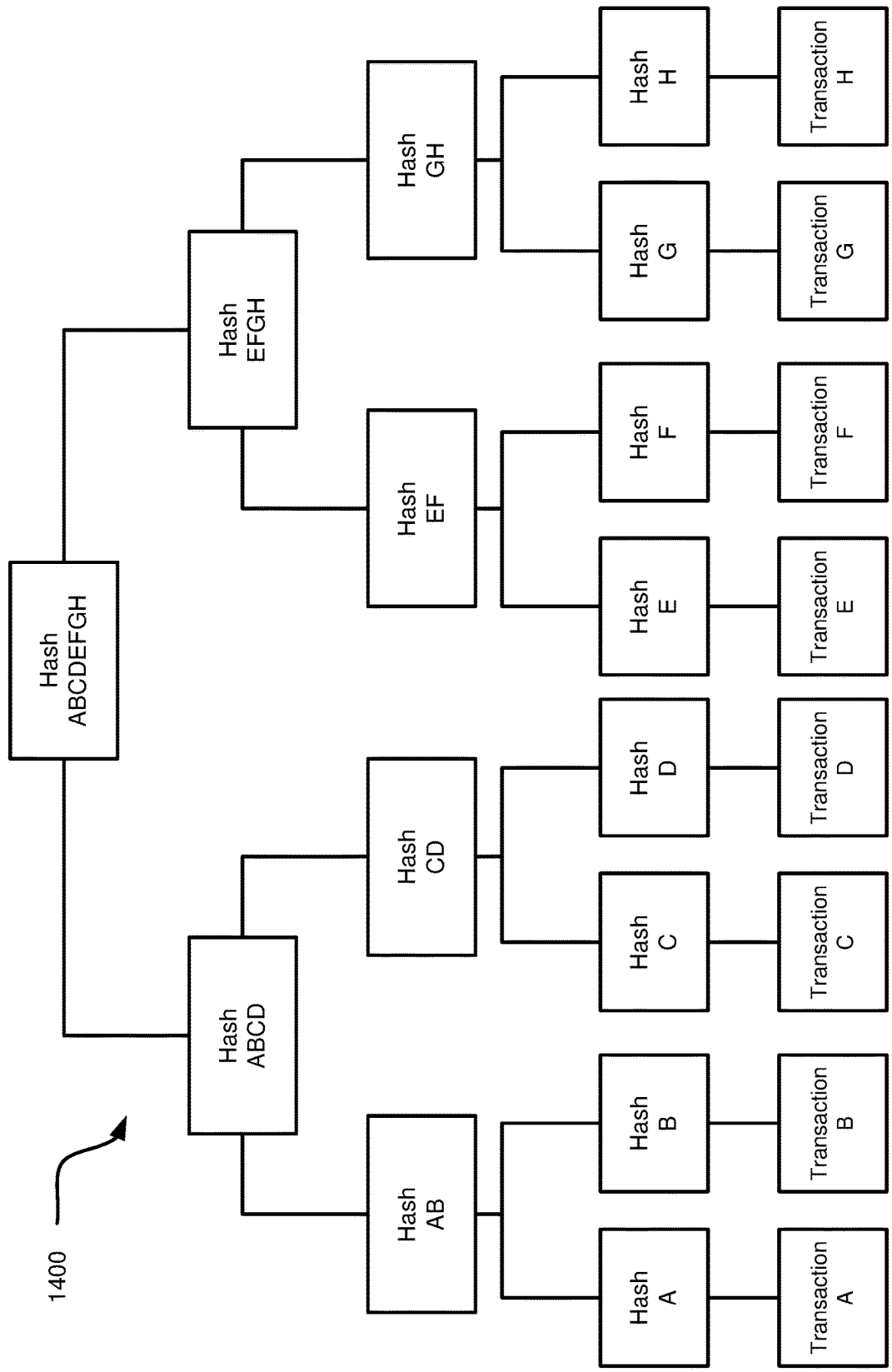
FIG. 14 is a schematic diagram of a hash tree that can be implemented with the methods and systems described herein for securing and organizing data on the shared permissioned ledger.

FIG. 14 is a schematic diagram of a hash tree 1400 that can be implemented with the methods and systems described herein for securing data on the shared permissioned ledger 110 and other datastores. The hash tree 1400 illustrated in FIG. 14 is a Merkle tree. A hash includes a string of numbers and letters that can be used to verify that a given set of data is the same as the original set of transactions, but not to obtain the original set of transactions. Each transaction may be hashed, and then each pair of transactions may be concatenated and hashed together, and so on until there is one hash for an entire block of data.

Visualized, the hash tree 1400 resembles a tree. The hashes on the bottom row are referred to as "leaves," the intermediate hashes are referred to as "branches," and the hash at the top is referred to as the "root." The root in the example hash tree 1400 is the Hash ABCDEFGH box. The root of a given block is stored in the header and the root may be combined with other information such as the software version, the previous block's hash, a timestamp, and so forth. The root may then run through a hash function to product the block's unique hash.

The transactions and metadata recorded on the shared permissioned ledger 110 include information that is sensitive and confidential to the businesses initiating the instructions. The resource manager 102 ensure security with the permissioned views and access to the shared permissioned ledger 110. The data for each participant is encrypted with a symmetric key that is unique for the participant. They keys may also include a key rotation policy where the data for that node is rekeyed. The keys for each node are bifurcated and saved in a secure storage location with role-based access controls. In some implementations, only a special service (referred to herein as the cryptographic service 404) can access they keys at runtime to encrypt and decrypt the data.

A reconciliation report has a certain payload when generated, and the payload, along with the public keys of the requester, are used to create a unique hash. The hash is created by hashing transaction data, for example, principals to the transaction, amount of the transaction (in the asset-type), account identifier, trade data, transaction data, value data, settlement data, and so forth. The hash is generated by applying public keys of the principals to the transaction and at least one public key associated with the resource manager 102. The has tree 1400 is generated for the trade bag keyset (see 1528 at FIG. 15) to allow for quick audits of the transactions. The hash is saved for auditing purposes in the resource manager 102. The resource manager 102 can digitally sign the reconciliation report with a private key that makes the reconciliation report available only to participants and authorized observers. The participants and authorized observers can verify the authenticity of the reconciliation reports with an audit server (see 2814 at FIG. 28).

FIG. 15 is a schematic diagram of a key hierarchy 1500. The multilevel key hierarchy 1500 illustrated in FIG. 15 includes parent keys that provide access to all child node data and may be implemented for hashing and encrypting data stored on the shared permissioned ledger 110 and other data structures described herein. The key hierarchy 1500 includes level zero keys 1502, level one keys 1504, level two keys 1506, and level three keys 1508. The level three keys 1508 have access to level three data and additionally have access to level two data, level one data, and level zero data. In some implementations, a unique document matching structure is created using keys generated from each of the attributes. The key hierarchy 1500 implements concepts similar to the hash tree 1400 data structure illustrated in FIG. 14. The key hierarchy 1500 is used to resolve conflicts down to an attribute-level between multiple parties.

The resource manager 102 implements keys to encrypt data stored on the shared permissioned ledger 110. In some implementations, the resource manager 102 will only encrypt data that will be shared between parties or transmitted. In an example, the resource manager 102 encrypts clearinghouse-level data (see 1902 at FIG. 19) that is provided to a clearinghouse-level authorized observer node. The resource manager 102 may additionally encrypt bankruptcy-specific data (see 1904 at FIG. 19) that is shared with other client nodes within a settlement group. The resource manager 102 may additionally encrypt confidential data (see 1906 at FIG. 19) that will not be shared with other parties or transmitted but must remain confidential. In an example, a trade is represented by buy-side data entries and is additionally represented by sell-side data entries. A copy of each of the buy-side data entries and the sell-side data entries may be stored on corresponding client ledger instances associated with counterparties to the trade. However, the buy-side data entries will be encrypted with one key and the sell-side data entries will be encrypted with a different key.

The resource manager 102 includes a cryptographic service, which may include a software module for encrypting data. The resource manager 102 may coordinate with a third-party service for encrypting data. The keys provide permissions and prevent unauthorized read and write access to the data. The keys provide a means for preventing unauthorized tampering of data.

The level three keys 1508 apply to trade bag UUIDs 1526 and data entries within the trade bag keyset 1528. This level three keys 1508 may specifically apply to clearinghouse and exchange payment 1530 data. The level two keys 1506 include the trade bundle identifiers 1522 and further include data entries within the trade bundle keyset 1520. The level two keys 1506 may specifically apply to aggregate client payment 1524 data. The level one keys 1504 apply to data entries within the trade set UUID 1518 group. The level zero keys 1502 apply to, for example, the CUSIP group identifier 1510, the trade data fees 1512, the trade data 1514 itself, and the trade UUID 1516.

The trade UUID 1516, trade set UUID 1518, trade bundle UUID 1522, and trade bag UUID 1526 each uniquely represent the trade or trade groups involved in a settlement process. The associated keys provide a means for principals and observers to reconcile the data among the participants. The levels illustrated in FIG. 15 allow for participants to only compare the data to which they have access. For instance, if a participant only has access to level zero keys 1502, then that participant cannot validate any data at level one and above. However, users with access to a trade or trade bag at level three keys 1508 have access to all levels of data, including level two, level one, and level zero0. This permits that participant to reconcile the trades and quickly drill down to individual trade level details to understand sources of discrepancy.

The key hierarchy 1500 is used to create reconciliation reports. The reconciliations can be created for each debit and credit pull of data. Once the documents are created in the structure illustrated in FIG. 15, the creation of the reconciliation report includes aggregating the documents for each matching party. The aggregations can be done for each payment cycle when assets were debited or credits to their respective accounts. This is a point-of-time reconciliation. Additionally, reconciliation reports can be created over a period of time (i.e., statements), or the reconciliation reports can be broken down by asset types r by certain types of trade positions.

They keys are made up of hash sets according to the hash tree 1400 illustrated in FIG. 14. The keys are hierarchical and permit users to drill down to discrepancies between trading partners based on trade identifiers and trade information that is represented by the keys.

The resource manager 102 generates reconciliation reports according to the key hierarchy 1500 illustrated in FIG. 15. The reconciliation reports enable participants and authorized observers to identify conflicts between parties. When two documents are presented, the hashes of the documents are checked against the ones previously saved. In some cases, the following steps may be executed to identify conflicts between the two documents. In some implementations, the reconciliation report is not encrypted and operates on data that is hashed using one-way hashing. In this implementation, during reconciliation, users cannot determine the source but can compare their own hashes against a counterparty's hashes.

The conflict resolution process includes determining whether the hash of each party matches. If the hashes do not match, the data is not what was sent to the party by the resource manager 102. If the hashes do not match, the resource manager 102 attempts to identify the common set of document subsets between the parties. The process walks down the level three keys 1508, level two keys 1506, and level one keys 1504 to identify which ones do not match for the common set of documents. For the ones that do not match, the conflict resolution process continues and walks down the list to the attribute level to identify the differences between the documents. Using this approach, multiple parties can identify and reach a consensus on the correct set of attributes. In some cases, the described systems and methods hash rows in two mismatched tables (such as in the shared permissioned ledger 110) and identifies the specific rows that do not match. The particular columns in the mismatched rows are analyzed to determine which specific columns do not match. This approach quickly finds the specific data values that do not match between the two tables.

The key hierarchy provides permissions to view lineage of how trades are executed from a business-wide perspective. Different business functions (e.g., different departments within a company) may use different keys for encrypting data. This ensures the security of data and prevents unauthorized nodes from reading or writing on the data. In this case, the key hierarchy will include a master or parent key that has access to all node encryption keys.

The resource manager 102 implements best practices for implementing encryption keys. In some cases, the encryption keys are rotated once per year, or once per month, or based on some other timeframe as decided by the client or other market factors. The resource manager 102 rotates the keys after data has been compromised. The resource manager 102 receives the encryption keys from a third party.

The shared permissioned ledger 110 implements bloom filters to significantly speed up the generation of reconciliation reports. Bloom filters are a data structure that provide the ability to lookup if a trade is part of a chain. The bloom filter conclusively indicates if a trade is not part of the report.

Figure 16:
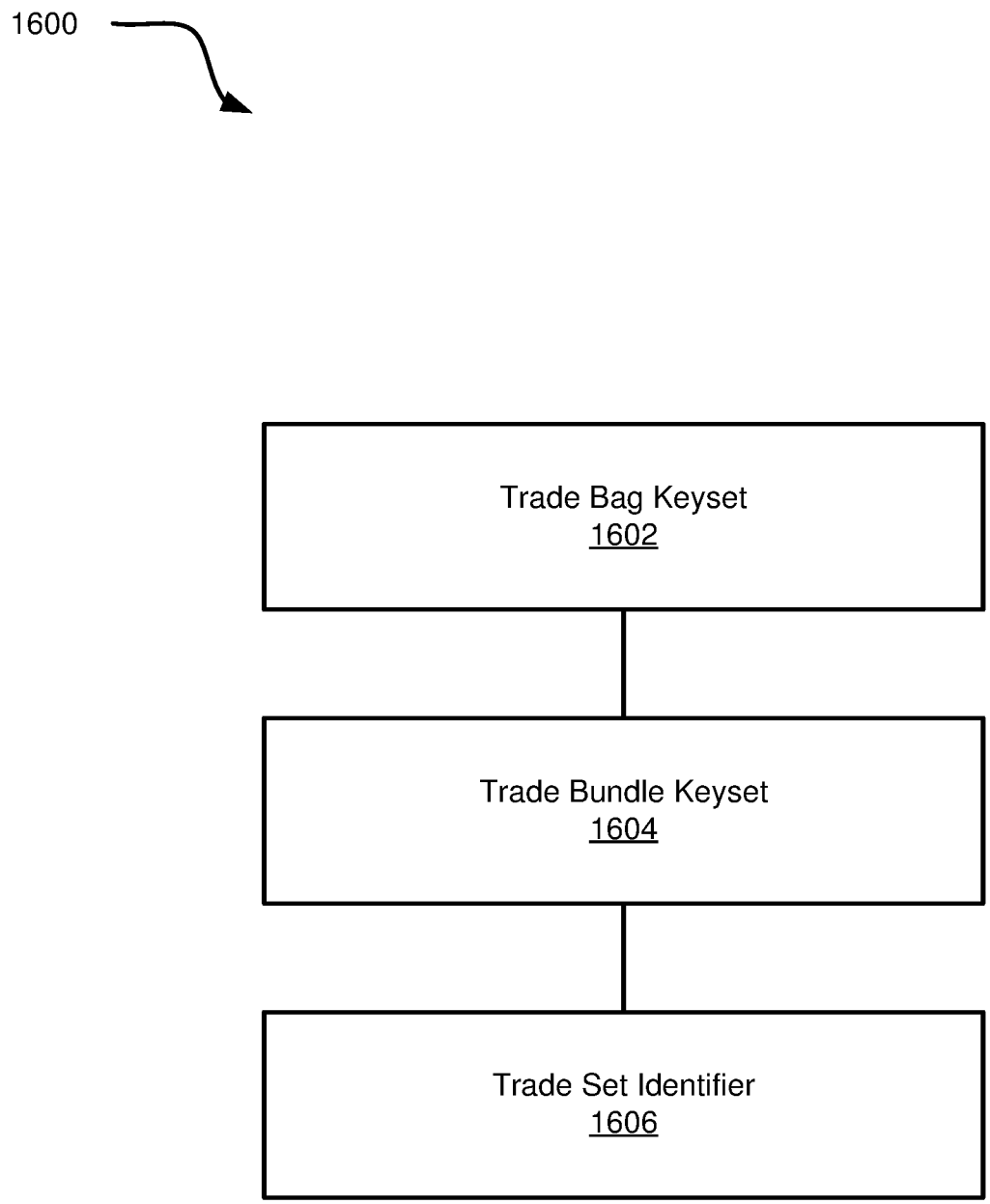
FIG. 16 is a schematic diagram of an example hierarchy for grouping trades.

FIG. 16 is a schematic diagram of an example hierarchy 1600 for grouping trades. The hierarchy 1600 includes a trade bag keyset 1602, a trade bundle keyset 1602, and a trade set identifier 1606. The trade bundle keyset 1602 may include a bundled collection of trade sets. The keysets include hashes of trade data organized hierarchically. The keysets are generated based on child keysets along with data at a particular level. Trades are selected into bundles based on business rules governed by contracts under which trades are executed. The trades are partitioned to allow for only the principals to access the trade information. If multiple principals are involved, the trade data is partitioned using keysets which can allow for access based on permissions.

A trade bundle defines a set of properties and elements on the trade that are encrypted using the same key. In some cases, not all elements (data points) on a trade are encrypted. This improves performance and reduces the processing resources devoted to encrypting and de-encrypting data. The hierarchy 1600 indicates a model for which columns will be encrypted.

In an implementation, different columns of data stored on the shared permissioned ledger 110 are encrypted with different encryption keys. This may apply when certain columns of data store confidential or proprietary information that needs to be protected with encryption, while other columns of data do not include confidential information. Additionally, this improves security of the data by ensuring that a single encryption key will not provide access to all columns of data.

Figure 17:
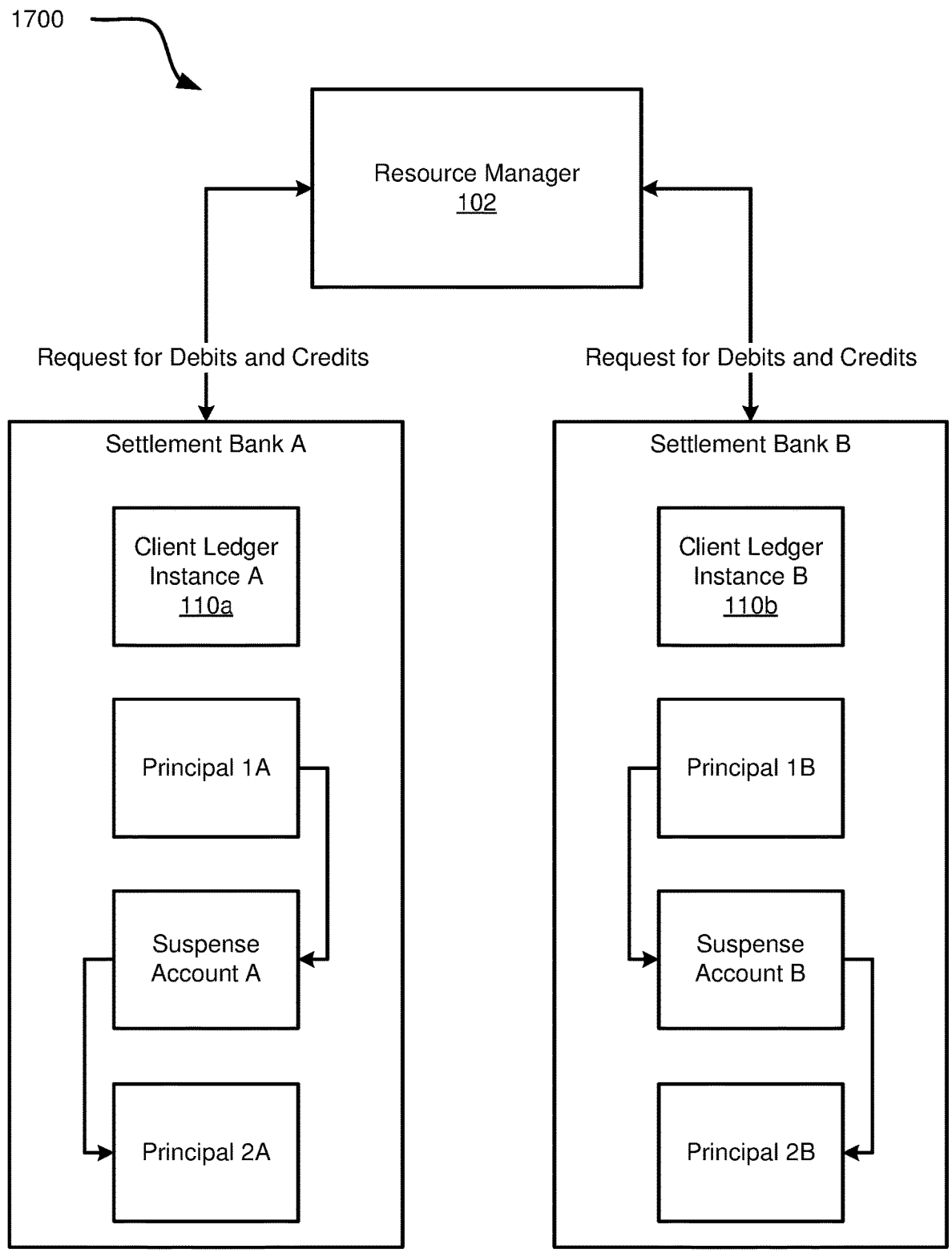
FIG. 17 is a schematic diagram of a system for asset transfer between settlement banks.

FIG. 17 is a schematic diagram of a system 1700 for asset transfer between settlement banks. In some cases, suspense accounts (may also be referred to as suspense accounts) are special purpose accounts. Suspense accounts are protected from the risk of default of the institution at which the accounts are held. Suspense accounts are additionally protected from default of the originator of the assets that funded the suspense account. The assets in suspense accounts are specifically for counterparties as was specified in the settlement instruction between the counterparties. Once the assets move from the sellers account into the suspense account, the assets cannot be recalled by the seller. There is no unwinding of the transaction that led to the funds going into the suspense account. In some cases, the suspense accounts may be multi-currency and/or multi-asset accounts.

The clearing module 206 integrates to the core ledgers of banks and settlement agencies to initiate and execute clearing and settlement. When an asset is cleared or settled, the asset moves through several state changes. The shared permissioned ledger 110 records the state changes and makes that information available to the permissioned client accounts in real-time (or substantially real-time). Parties in a trade can execute complex settlement instructions that determine the sequence of steps that must be followed to affect the movement of assets between participants. The resource manager 102 facilitates this with software workflows. Execution of a workflow results in multiple instructions sent and received through the clearing module 208, and further results in multiple data entries being generated and stored on the shared permissioned ledger 110.

The parties of a trade can be categorized as principals, observers, settlement agents, or regulatory bodies. Principals are typically the buyers and sellers in a transaction. For bilateral trades, this usually includes the broker-dealers and buy-side clients. For cleared trades this may also include a clearinghouse. Observers include all intermediaries in a trade that are involved in the asset movement between the buyers and the sellers in the trade lifecycle. In some cases, observers may extend credits or guarantee funds to the principals to complete a settlement.

Settlement agencies include technology companies that facilitate the post-trade settlement of the trade. In some cases, there is more than one settlement agent for a trade. Settlement agents typically act on the instructions of the principals or observers. Settlement agents can additionally provide data reports to all participants. The participants and observers of a trade may have different regulatory reporting requirements associated with one or more regulatory bodies. The type of reports depend on, for example, the trade type, asset type, and jurisdiction.

FIG. 17 illustrates an embodiment of an example bilateral asset transfer between two principals (e.g., Principal 1 and Principal 2). In this example, Principal 1A buys asset Y and sells asset X. Principal 2B buys asset X and sells asset Y. The resource manager 102 acts as the settlement agent for this bilateral asset transfer. The resource manager 102 utilizes suspense accounts at Settlement Bank A and Settlement Bank B. In this example, both Principal 1 and Principal 2 have nostro accounts to hold the assets of each type. A nostro accounts may include an account at a bank that holds funds in a foreign currency in another bank.

In the example of FIG. 17, suspense account A and suspense account B hold cleared funds for the benefit of a counterparty. Principal 1A is a source account for asset X (to be sold by Principal 1) and Principal 1B is a destination account for asset Y (to be sold by Principal 2 and purchased by Principal 1). This is also referred to as the nostro account for Principal 1 at Settlement Bank B.

Similarly, Principal 2A is a destination account for asset X (sold by Principal 1 and purchased by Principal 2). This is also referred to as the nostro account for principal 2 at Settlement Bank A. Principal 2B is the source account for asset Y (sold by Principal 2 and purchased by Principal 1).

In some embodiments, the accounts discussed with respect to FIG. 17 are located at different financial institutions. The resource manager 102 can operate with accounts held at any financial institution. For example, if asset X and Y are separate currencies (USD and GBP) then Suspense accounts that hold the USD and GBP will likely be in separate jurisdictions. In some embodiments, the existing account structures in place at the financial institutions will not need any changing. The only change at the financial institutions is the creation of a new type of an account called the suspense account.

The resource manager 102 issues clearing and settlement instructions to the settlement banks for each step that involves asset movement (e.g., steps 1a, 1b, 2a, and 2b). In the case of a debit, debit the account Principal 1A is debited asset X (number of units specified in the settlement instructions which are input as parameters to the workflow) and credited to Suspense account A. Account Principal 2B is then debited asset Y and credited to Suspense account B. Once the conformations of both debits are received, the system proceeds to a credit, credit where Suspense account B is debited asset Y and Principal 1B is credited asset Y. Additionally, Suspense account A is debited asset X and Principal 2A is credited asset X.

If there is a failure in the debit, debit transactions, the resource manager 102 will retry the failed leg as defined in the operating rules (e.g., the operating rules may define X times to retry or define a time-based threshold). If the transaction does not succeed, it will reverse the debits and credits to restore the original amounts in account Principal 1A and account Principal 2B.

Figure 18:
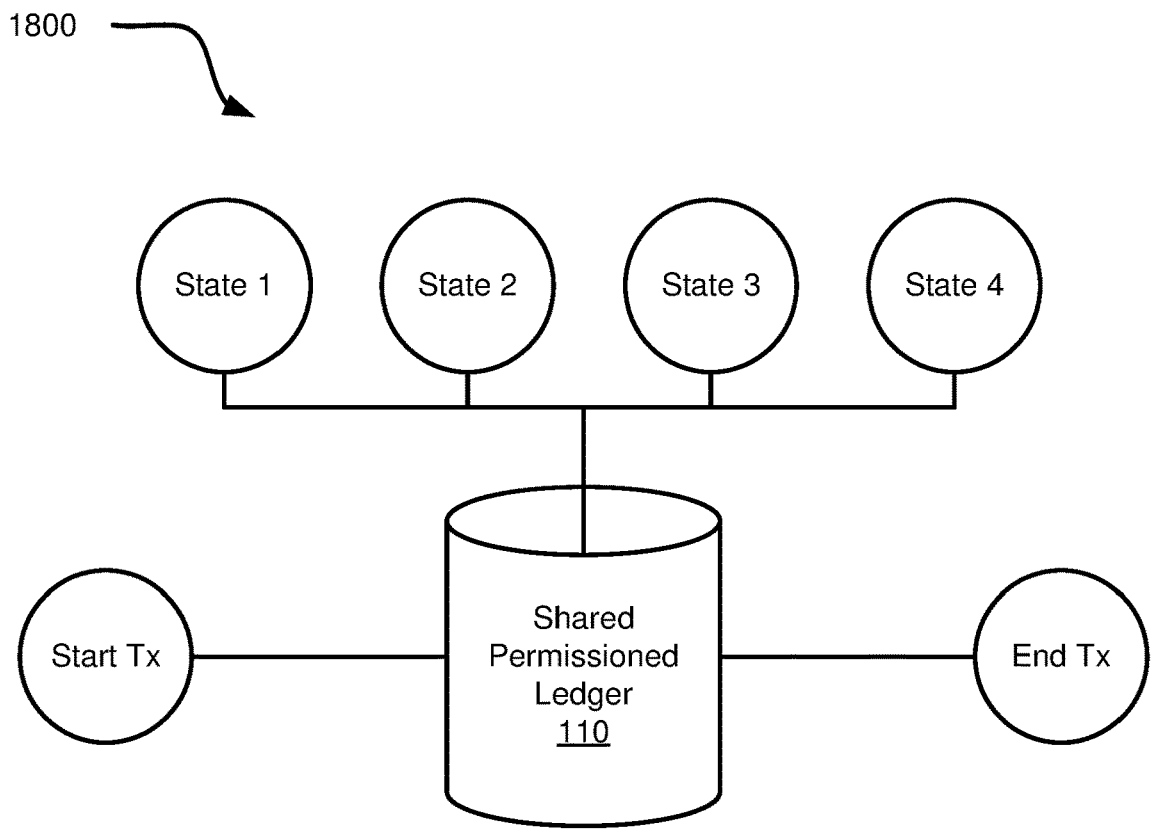
FIG. 18 is a schematic diagram of a system for communications between a shared permissioned ledger and outside parties.
Figure 18:
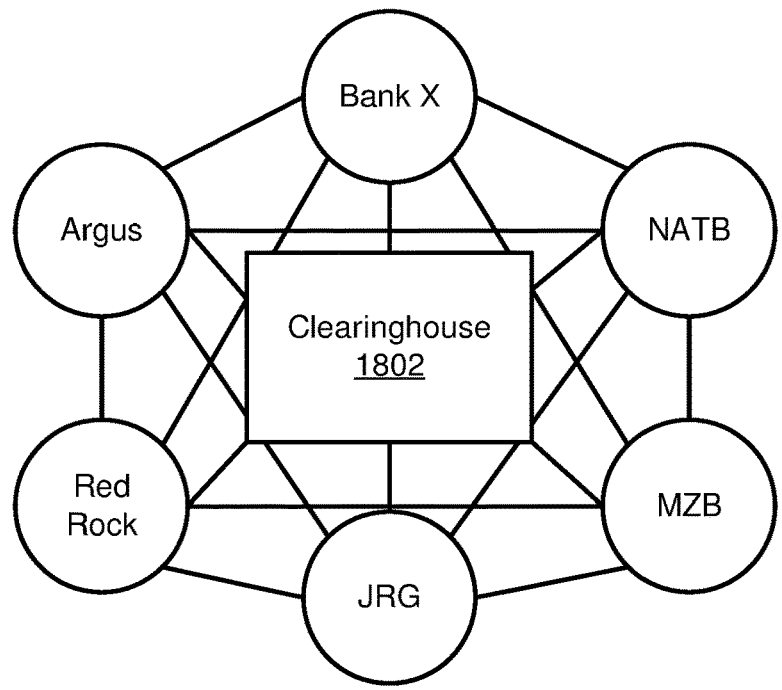

FIG. 18 is a schematic diagram illustrating a system 1800 for communication between the shared permissioned ledger 110 and outside parties. The shared permissioned ledger stores a plurality of data entries for each transaction, from the start of the transaction to the completion of the transaction. For example, the shared permissioned ledger 110 stores a data entry for Start Transaction, various states in the transaction (e.g., state one, state two, state three, and state four illustrated in FIG. 18), and further includes a data entry for the completion of the transaction.

The shared permissioned ledger 110 provides data to participants to a transaction and also to authorized observers to the transaction. The shared permissioned ledger 110 may provide information to an applicable clearinghouse 1802 over the transaction. The clearinghouse 1802 may communicate with numerous other entities and programs as illustrated in FIG. 18. When the product is a cleared product (i.e., it has a CCP) both sides of the transaction are available to the CCP, but all of the allocation data is not available.

Figure 19:
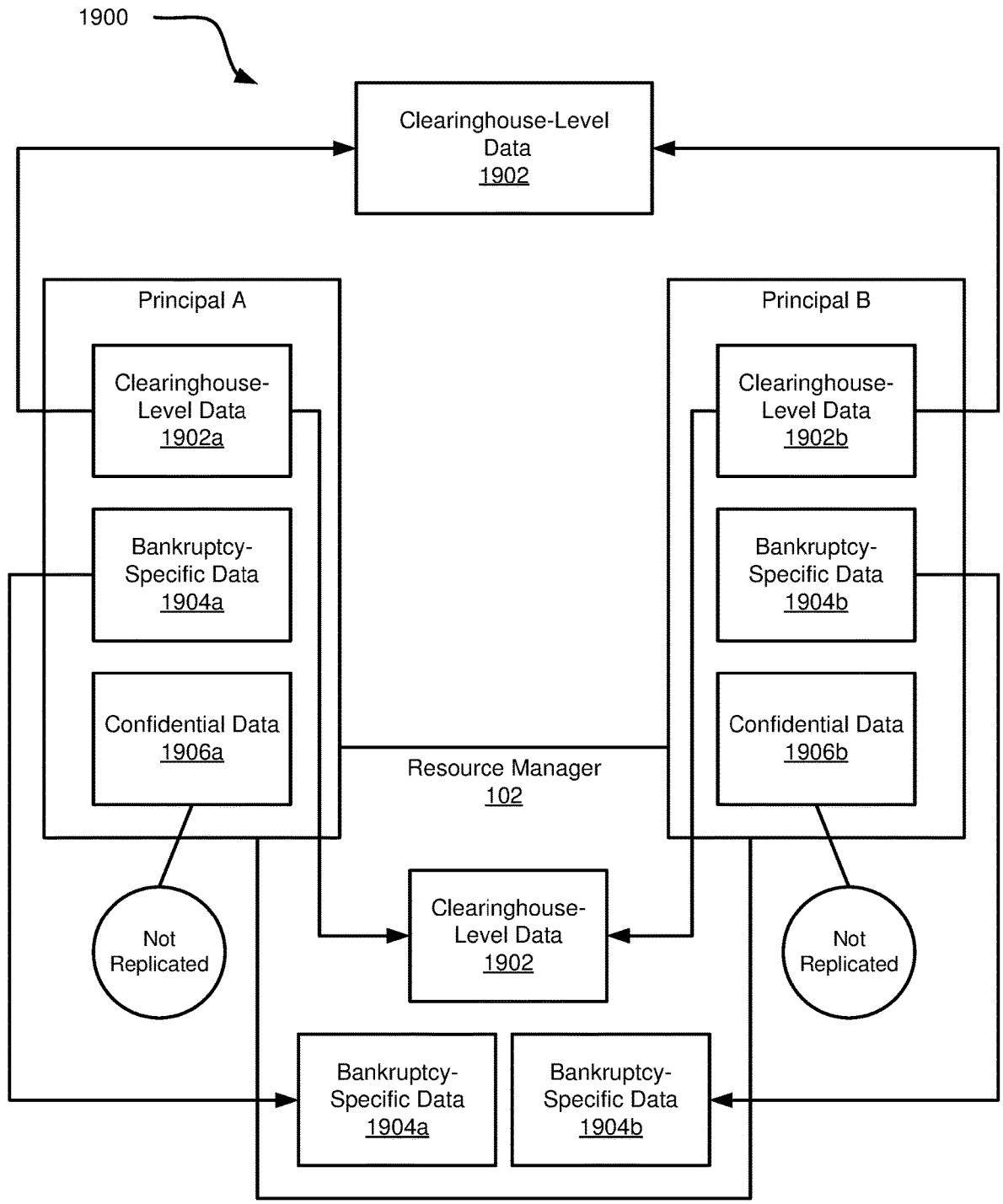
FIG. 19 is a schematic diagram of a system for data security and permissioned database access.

FIG. 19 illustrates a schematic diagram of a system 1900 for data security and permissioned database access. The resource manager 102 oversees data stored across the shared permissioned ledger 110 that has varying degrees of data privacy levels. In the example illustrated in FIG. 19, the resource manager 102 oversees data for Principal A and Principal B, which are serving as counterparties to a transaction. The resource manager 102 oversees clearinghouse-level data 1902 for each of Principal A and Principal B. The resource manager 102 additionally oversees bankruptcy-specific data 1904 for each of Principal A and Principal. B. The resource manager 102 ensures that confidential data 1906 for each of Principal A and Principal B is not replicated.

The bankruptcy-specific data 1904 includes the obligations of each principal (from the assets in its suspense accounts) to its counterparties. This data is not shared with the CCP. This data is shared with the resource manager 102. For example, it is possible that this is "calculated" in real time (or substantially real time) by the resource manager 102. If Principal A is declared insolvent, then, because the assets are ring-fenced in suspense accounts, counterparties can rest assured that the assets will be "settled." In this situation, settlement can mean one of the following scenarios, outlined below.

Settlement may indicate that assets are transferred to the rightful owner (as determined by the bankruptcy specific data) but reside in the same institution that held the suspense account. The underlying assumption is that suspense account was held at an institution that was not affected by the bankruptcy of Principal A. In this situation, the resource manager 102 has the requisite information in the shared permissioned ledger 110 and can, upon confirmation of the bankruptcy administrator, move the assets to Principal B.

Settlement may further indicate that assets have moved out of the existing suspense account and institution to a different custodian or settlement bank. In this situation, if the new custodian or settlement bank is a member of the systems and methods described herein, the resource manager 102 can, upon notification from the bankruptcy administrator, move the assets. Alternatively, the assets can be moved by the bankruptcy administrator and the action recorded on the shared permissioned ledger. Because the shared permissioned ledger 110 is replicated to Principal B, the same existing systems will get data as they would if this event had occurred in a non-bankruptcy scenario.

Bankruptcy scenarios can be difficult situations from multiple different perspectives, including reputational, financial stability of the overall ecosystem, and trust. The transparency afforded by the shared permissioned ledger 110 ensures that: (a) defaulted institutions transfer assets to their rightful owners of the assets and thereby control reputational risk for the ecosystem; (b) asset owners prevent a "run" on them as they never lose control or visibility of the assets; and (c) the overall ecosystem is able to control the damage stemming from a failed institution.

The resource manager 102 includes reporting capabilities that follow established norms and standards by the appropriate jurisdiction. In some embodiments, principals in a transaction can be from different jurisdictions that may interpret failure scenarios differently and will have different procedures to manage bank failures. For example, if a specific jurisdiction allows leverage that exceeds United States norms, then leverage in the system outside the United States can be made available to United States regulators. Although the United States regulators may not be able to curtail the leveraging, they will, at a minimum, be aware of the situation.

In some embodiments, the data in the shared permissioned ledger 110 is considered accurate and the data store (or database) is immutable. On top of this immutable data store is a platform that is built using state of the art, flexible technology components. As a result, the described systems and methods can provide visibility that a particular regulator seeks in a particular jurisdiction. Additionally, regulators may be nodes connected to the described systems and methods. If a particular bankruptcy situation falls under the purview of a regulator that was not included when the systems and methods were set up, the systems and methods can quickly provision a node for exclusive use of the particular regulator. This way, regulators can "share" data on bankruptcy scenarios. This data will follow the same accuracy and immutability as discussed above.

As discussed herein, the resource manager 102 may use a tiered architecture that can scale up to requests for clearing and settlement. This architecture provides for an automatically scaled architecture where specific services, such as clearing services, can scale up or shrink depending on the requests.

As discussed herein, the shared permissioned ledger 110 maintains a history of all transactions within the network. The shared permissioned ledger 110 provides a query interface for participants to search for parts of the ledger. Additionally, it also has a subscription-based interface to the participants to subscribe to changes in the network in real time (or substantially real time). In some embodiments, components of the shared permissioned ledger 110 include transaction states, securing the ledger entries, querying, and subscribing to the ledger, and ledger replication.

The resource manager 102 streamlines workflows by supporting rich metadata accompanying each asset transfer. The rich metadata helps financial institutions tie back asset movements to trades, accounts, and clients. Payments for asset movement are reconciled between all principals and observers of a transaction. In some cases, reconciliation is required for internal bookkeeping of an enterprise. Additionally, certain regulations require regular filing of certain types of events.

In some implementations, payments flow between principals in a cleared market, such as between an end customer and a clearinghouse. This introduces numerous issues with the reconciliation process in the cleared market space. For example, clearing members may act as both brokers and dealers to execute trades on behalf of clients and for themselves. A clearing member typically has numerous customers, and there are different types of trade positions that a customer may initiate, such as equities, futures, currency hedging, derivatives, and the like. The clearing member will likely execute a customer's trading activity at more than one exchange. A customer may clear through several clearing members.

The exchange, through a clearinghouse, may initiate settlements for all trades executed on the exchange via the clearing members. The clearinghouse computes net amounts that need to be debited or credited from accounts of clearing members. These can be for "mark to market" variations on the trade positions. The market prices is determined by the clearinghouse based on data from third-party sources. Following debits and credits to accounts, the clearing member reconciles single net payments to or from accounts to the positions across all clients. The clearing member sends requests for payments to each of the clients. In this step, the clearing member may add additional fees and other charges to the payment request. The client must now reconcile these to the actual positions. Because these are calls and may be delayed, the market positions may change, and the market value of the trade position may also change. In effect, the following reconciliations need to happen between participants.

The clearinghouse may reconcile the net debits and credits from each account at the settlement bank. In the case of a shortfall of funds, the clearinghouse requests payments from the settlement bank to authorize. The clearinghouse sends a request to the settlement bank and, when approved, the funds are debited. The clearinghouse additionally needs to reconcile metadata associated with the gross positions of each entity tied to the payment for each pull and push. This includes data tying to market data that is time bound. The fees and charges must also be tied into the payments. The clearinghouse must also reconcile collateral pledges and recall data tied to the payments. The payments include additional data attributes such as haircut amounts. The settlement of these assets outside the same bank will go through other settlement services such as DTC (Depository Trust Company).

The clearing members must reconcile the net debits from their accounts that need to be tied to the gross position for each of a plurality of clients. Any other data such as charges and fees need to be in to request a payment from the client or to tie in a credit push to the respective account. The clearing members additionally must reconcile payments from client that need to be tied to specific requests from clearing members. In some cases, the payments are not paid in full when there is a discrepancy between the books and data. The clearing members must additionally reconcile some trade positions that may not fully match and thus require manual adjustments at either the clearing member or the client. Partial payments are made to fulfil obligations by each party and further add to the complexity in reconciliations.

Clients must reconcile net payments to and from multiple other parties. Regulators, such as the CFTC (Commodity Futures Trading Commission), SEC (Securities and Exchange Commission), ESMA (European Securities and Markets Authority), CESR (Committee of European Securities Regulators), Federal Reserve, and the like, require different regulatory reporting filings that tie in payment to different positions of the respective parties. The regulators typically request filings from multiple parties and then run checks to ensure the records match.

Figure 23:
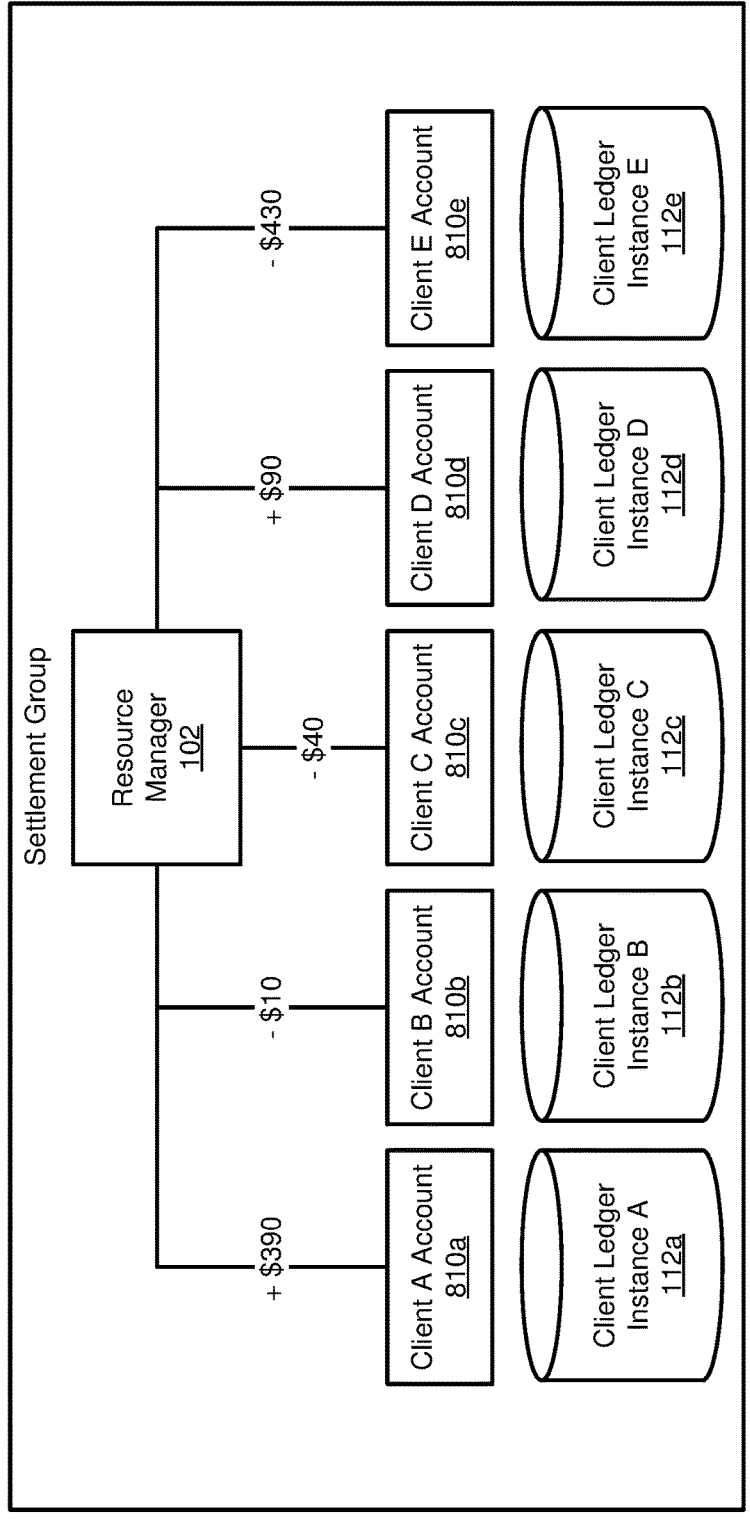
FIG. 23 illustrates an example of multilateral netting calculations.

FIG. 23 illustrates an example of multilateral netting calculations. The netting calculations can be calculated for all parties within a settlement group. The example multilateral netting calculation illustrated in FIG. 23 includes credits and debits between five parties within the same netting group, namely: node A, node B, node C, node D, and node E. The table illustrates various credits and debits between all nodes. For example, node A owes $250 to node B, $300 to node C, $40 to node D, and $20 to node E. Therefore, node A has a total debit of $610 to all parties within the settlement group. Each of the parties within the settlement group has a total credit to be received from other parties within the settlement group, and a total debit to be paid out to other parties within the settlement group. The net position is determined based on the total credit and the total debit for each party within the settlement group.

The resource manager 102 executes the multilateral netting by crediting and debiting each party based on the net position. In the example illustrated in FIG. 23, the resource manager 102 causes credits and debits to be initiated for each party within the settlement group based on the net positions. The resource manager 102 additionally causes new data entries to be stored on the client ledger instances for each party in the settlement group, wherein the new data entries reflect the net position of the applicable party.

In some implementations, the system 100 supports independent settlement groups for different asset types, for example, there may exist unique settlement groups for different currencies, securities, bonds, exchanges, commodities, and markets. The system 100 may additionally support settlement groups for exotic currency exchanges.

Figure 20A:
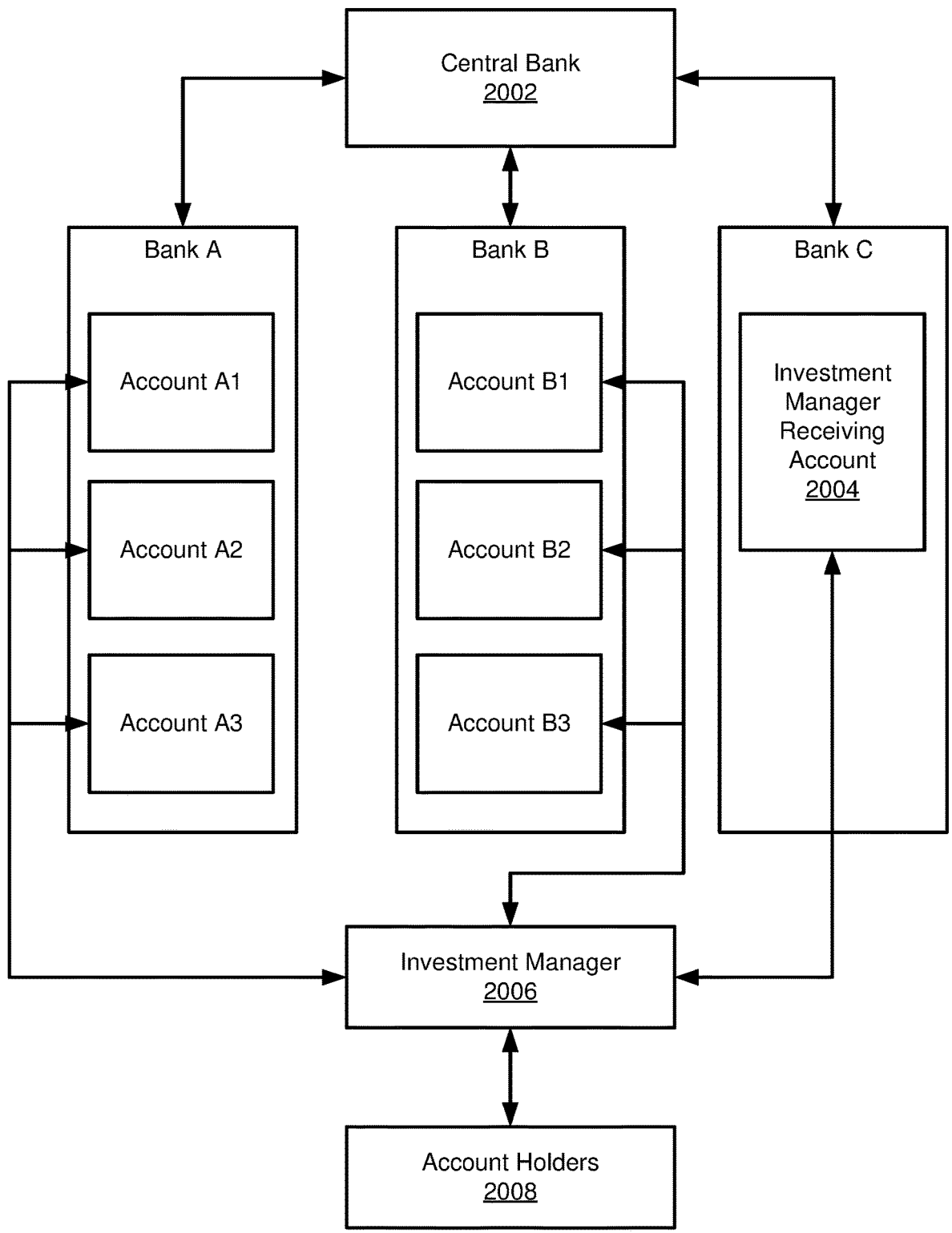
FIG. 20A is a schematic diagram of a prior art system for executing trades between parties.

FIG. 20A is a schematic diagram of a prior art system for executing trades between parties. As shown in the prior art system illustrated in FIG. 20A, three banks, including Bank A, Bank B, and Bank C are coupled to a central bank 2002 and an investment manager 2006. Account holders 2008 are associated with the investment manager 2006. Bank A and Bank B each have numerous accounts, and Bank C includes an investment manager receiving account 2004 that stores funds received by or managed by the investment manager 2006.

The accounts may reside within the context of a bank ledger. This introduces numerous issues and requires that the bank ledgers be queried in real-time to determine if the accounts are valid and have a sufficient balance. Additionally, funds must be earmarked or debited and held in an escrow account to ensure "good funds" for a grade. Further, assets must be transferred from individual user accounts to an account of the firm. The system 2000 illustrated in FIG. 20B represents an improvement of the prior art system illustrated in FIG. 20A.

Figure 20B:
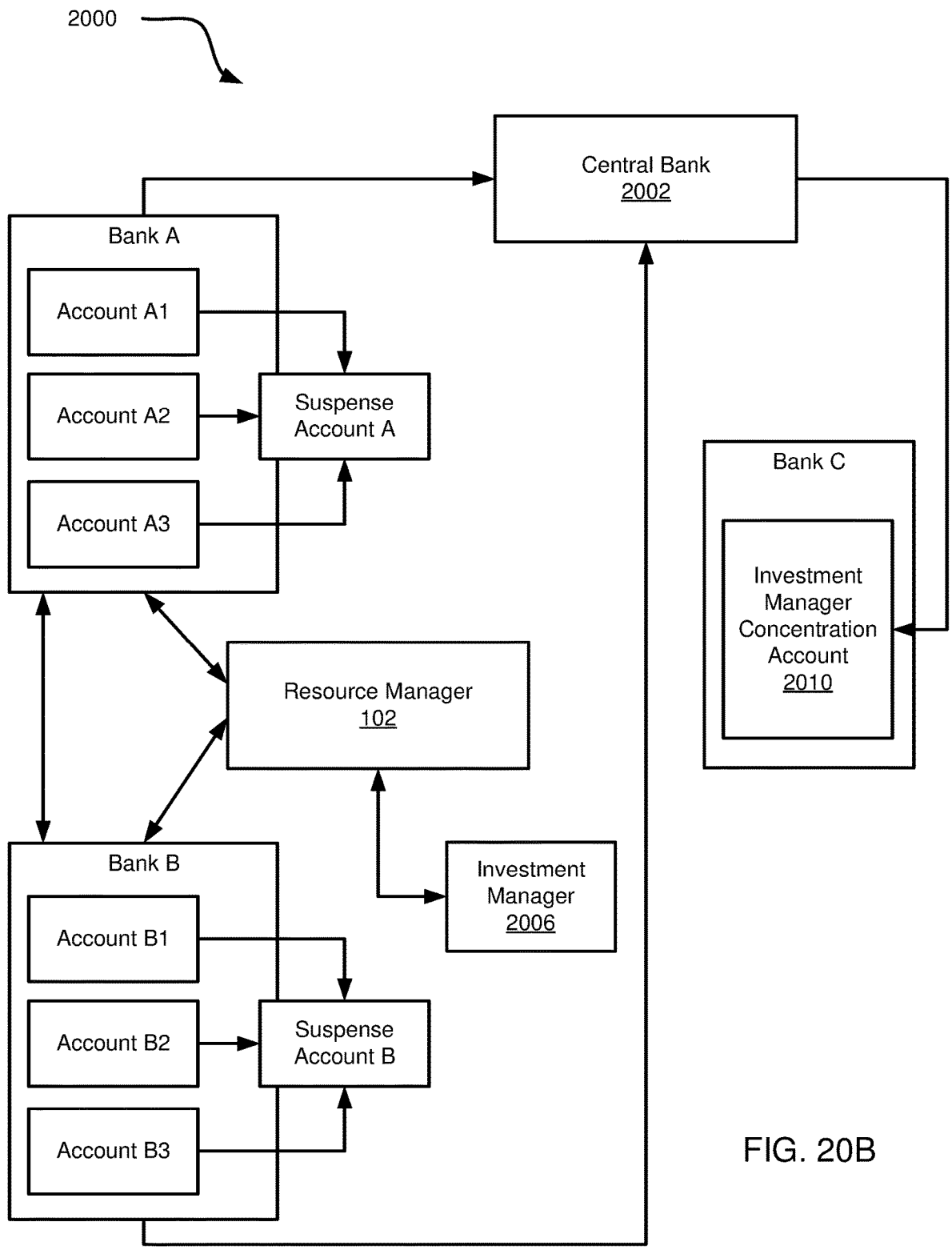
FIG. 20B is a schematic diagram of a system for improved transaction execution and streamlined communications between parties.

FIG. 20B is a schematic diagram of a system 2000 for improved transaction execution and streamlined communications between parties. FIG. 20B represents an improvement over the prior art system illustrated in FIG. 20B. The system 2000 includes three example banks, including Bank A, Bank B, and Bank C. Bank A and Bank B each include numerous accounts and a suspense account. The resource manager 102 is in communication with each of Bank A and Bank B and manages the suspense accounts at each bank. The resource manager 102 is additionally in communication with the investment manager 2006. Each of Bank A, Bank B, and Bank C communicates directly with the central bank 2002. Bank C includes an investment manager concentration account 2010, which may be used by an investment manager 2006 to facilitate the processing and settlement of one or more customer transactions.

The arrowed lines in FIG. 20B illustrate instructions and/or the movement of assets between accounts, parties, and computer-based software constructs. The instructions include, for example, settlement instructions associated with one or more accounts, such as Account A1, Account A2, Account A3, Account B1, Account B2, and Account B3, or settlement accounts Suspense Account A and Suspense Account B. The instructions further include settlement instructions issued between banks and to the central bank 2002.

Each of the accounts within Bank A and Bank B may be associated with a client account 104 managed by the resource manager 102. One client account 104 may associate multiple bank accounts with the resource manager 102. Each bank account may be associated with a certain type of trade, a certain currency, a certain settlement group, and so forth. When the client accounts 104 are onboarded to the system 2000, the resource manager 102 communicates and authorizes the respective bank accounts. The resource manager 102 controls and manages the suspense accounts in the banks and causes funds to be debited and credited between the bank accounts and the suspense accounts. The resource manager causes funds to move between suspense accounts to facilitate trades between banks accounts at Bank A and Bank B.

The system 2000 enables trades to be completed within settlement groups at any time of day, including when banks, exchanges, and currency markets are closed. Members of a settlement group that are connected to the same suspense account may move assets amongst each other during off hours, and in near real-time. A trade between members of a settlement group may be finalized and settled within minutes, rather than the typical 3-5 day time period common with prior art systems as illustrated in FIG. 20A. Asset transfers from bank accounts to a suspense account will be executed during regular market hours, but funds within the suspense account can be traded at any time and can be traded quickly and efficiently. The shared permissioned ledger 110 stores an indication of the ownership of all funds within the suspense accounts.

The suspense accounts additionally reduce risk when executing trades between client accounts 104. Client accounts 104 can rest assured that trades between other members of the settlement group will be executed securely, and with reduced risk, because the other party's funds are deposited within the suspense account and overseen by the resource manager 102.

The suspense accounts may be associated with a certain networked group of participants. In an example, one suspense account includes five settlement clients, and each of the five settlement clients is a hedge fund. In a further example, another suspense account include 200 settlement clients, and each of the 200 settlement clients is venture capitalist group. In a further example, a suspense account may include a variety of institution-types, such as hedge funds, banks, venture capitalists, brokerages, and so forth. Typically, a suspense account is associated with one currency. For example, a suspense account in the United States may trade in only USD while a suspense account in the United Kingdom may trade only in GBP and a suspense account in Germany may trade only in EUR. Different suspense accounts will be held at different banks, and these suspense accounts can trade with one another. In an example implementation, a singular hedge fund is associated with a client account coupled to the resource manager 102, and this hedge fund is a member of numerous suspense accounts within different geographic regions for trading different assets and currencies.

In most cases, assets can only be transferred into and out of the suspense accounts during operating hours for the bank where the suspense account is located. However, funds can be traded amongst settlement clients associated with the suspense account during any hours. These trades are tracked on the shared permissioned ledger 110 and can be executed in near real-time. Additionally, the suspense accounts reduce risk for all settlement clients associated with the suspense accounts, because the resource manager 102 can continuously track the obligations and exposures for the settlement clients associated with the suspense account.

The suspense accounts are asset-agnostic and can be associated with trades of different currencies, securities, bonds, Forex, and so forth. One suspense account may hold funds associated with a plurality of settlement clients. Each of the settlement clients associated with the suspense account can trade assets amongst each other more easily and with reduced risk.

Transactions between members of a suspense account (i.e., the settlement clients associated with the suspense account) does not require actual movement of funds. However, the movement of assets into and out of suspense accounts, and between different suspense accounts, requires the actual movement of funds. These movements will be reported to the central bank 2002. The shared permissioned ledger 110 serves as a centralized ledger for each member of a settlement group for all assets within the suspense account. The investment manager 2006 manages transfers of funds from suspense accounts to other accounts external to the system 100. Funds can be moved to the investment manager concentration account 2010 in some implementations, but this is not required to realize the benefits of the suspense accounts.

Figure 21:
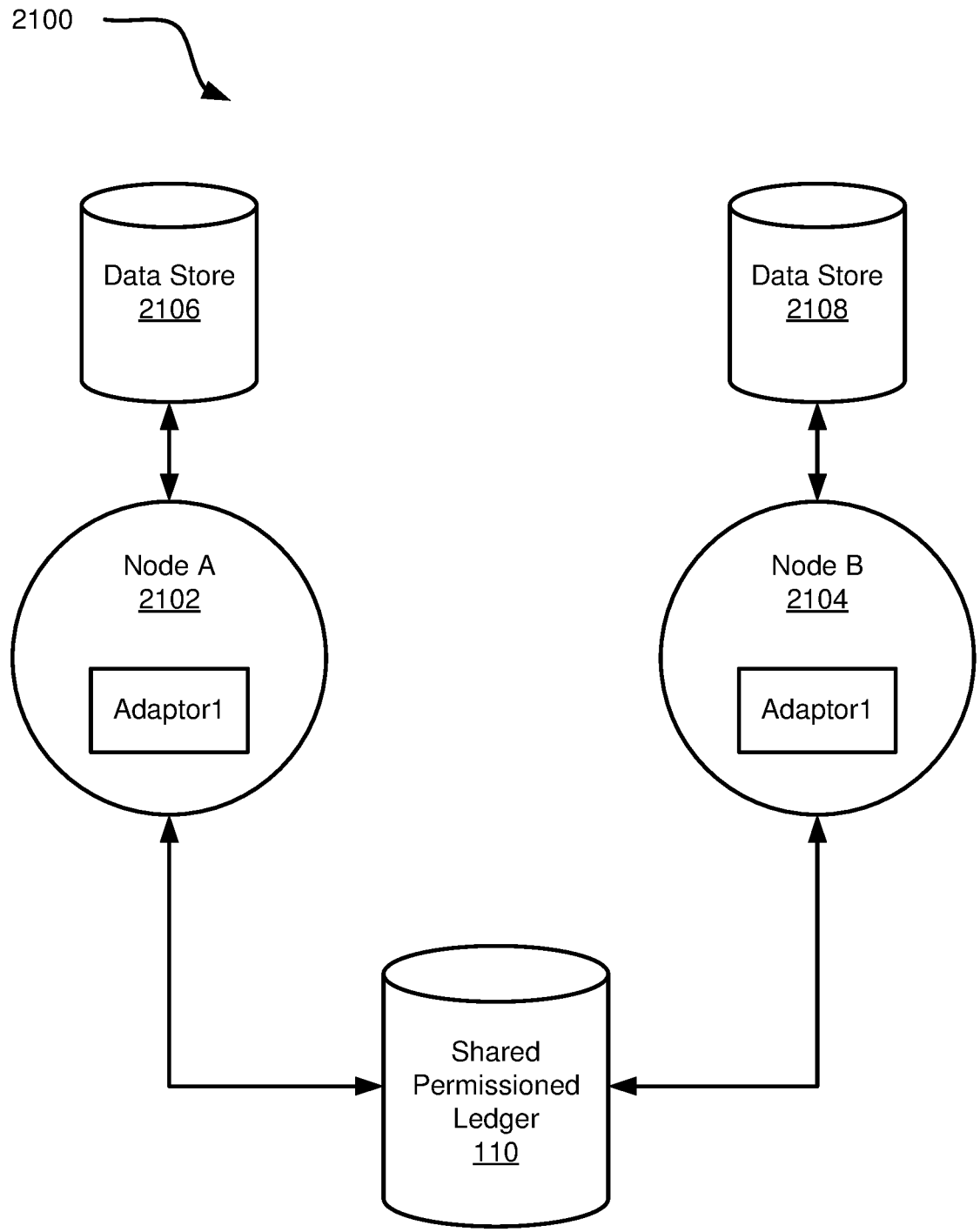
FIG. 21 is a schematic diagram of a system for communications between computing nodes and a distributed transaction store.

FIG. 21 is a schematic diagram of a system 2100 for communications between computing nodes and a distributed transaction store. As shown in FIG. 21, two nodes, including Node A 2102 and Node B 2104 are coupled to the shared permissioned ledger 110. The nodes may represent organizations, companies, participants, regulators, observers, individuals, and so forth. The shared permissioned ledger 110 stores various transaction-related data associated with any number of nodes, as well as transaction data associated with other entities or systems.

The onboarding process involves registering a new node (e.g., Node A 2102 or Node B 2104) with the resource manager 102. In some embodiments, a node is a virtual entity that corresponds to a legal entity in the real world. In addition to common metadata such as a name, type (direct, indirect, observer, and the like), and the like, the node setup involves providing a globally unique identifier for the node. This unique identifier can be used to refer to the node across the resource manager 102. A node can be searched in a directory either by using its name or its unique identifier. The setup process involves installing digital certificates that can identify the node in the financial management ecosystem as well as among its participants.

Authentication of participants and their transactions is achieved with a Public Key Infrastructure. Each participant will set up an Admin identity to control issuance of certificates to its users. The users can enroll with their organization's Certificate Authority and use their private key and certificate to sign transactions and identify themselves.

While a node is a virtual entity configured in the resource manager 102 ecosystem, the node can have its own legacy or current system backed by a data store 2106, 2108 to carry out its process. In some embodiments, integration to these systems are carried out by "adaptors" that are associated with the node. For example, adaptors can be software and/or hardware modules that are typically custom-developed, installed, and configured as part of the node. In particular implementations, the configuration process involves capturing a protocol of communication, capturing connectivity details that are specific to the protocol, and setting up identities. An important step, discussed herein, is the setting up of identities. This may involve importing or re-configuring the identity details such as certificates that are required to identify the node and its users in the existing legacy system. For example, this can involve the signatures used to sign the transactions in their internal DLT (Distributed Ledger Technology).

As shown in FIG. 21, the custom adaptor modules can follow either a push model or a pull model. In the push model, the adaptor is listening for updates happening in the underlying system and the same gets propagated into the financial management ecosystem discussed herein. In the pull model, the adaptor pulls the necessary details and pushes them into the node. In addition to transactions, the adaptor can also listen to and raise events that are relevant to the process being automated. Thus, the adaptor is both a publisher as well as a subscriber for the events in the underlying service.

Figure 22:
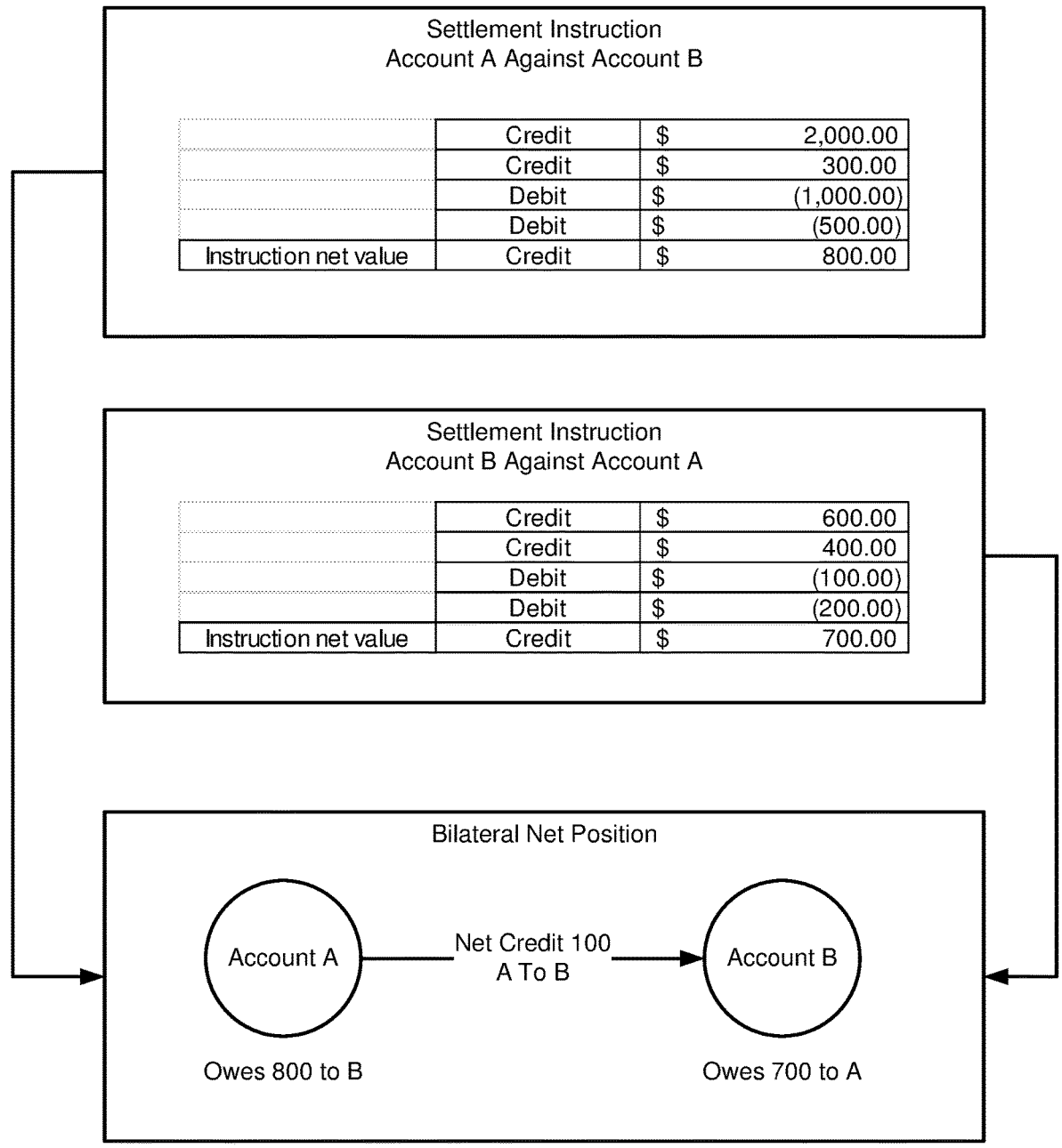
FIG. 22 illustrates an example of bilateral netting calculations.

FIG. 22 illustrates an example of bilateral netting calculations. The netting module 516 described herein calculates netting positions for parties by assessing an incoming normalized data stream in real-time. The netting module 516 can additionally access data stored on the shared database ledger 110 to calculate netting positions.

The example bilateral netting calculation illustrated in FIG. 22 includes various credits and debits from account A against account B, and additionally includes credits and debits from account B against account A. The instruction net value from A to B is $800 such that A owes $800 to B. The instruction net value from B to A is $700 such that B owes $700 to A. the bilateral net position is a net credit of $100 from A to B.

FIG. 23 illustrates an example of multilateral netting calculations. The netting calculations can be calculated for all parties within a settlement group. The example multilateral netting calculation illustrated in FIG. 23 includes credits and debits between five parties within the same netting group, namely: node A, node B, node C, node D, and node E. The table illustrates various credits and debits between all nodes. For example, node A owes $250 to node B, $300 to node C, $40 to node D, and $20 to node E. Therefore, node A has a total debit of $610 to all parties within the settlement group. Each of the parties within the settlement group has a total credit to be received from other parties within the settlement group, and a total debit to be paid out to other parties within the settlement group. The net position is determined based on the total credit and the total debit for each party within the settlement group.

The resource manager 102 executes the multilateral netting by crediting and debiting each party based on the net position. In the example illustrated in FIG. 23, the resource manager 102 causes credits and debits to be initiated for each party within the settlement group based on the net positions. The resource manager 102 additionally causes new data entries to be stored on the client ledger instances for each party in the settlement group, wherein the new data entries reflect the net position of the applicable party.

In some implementations, the system 100 supports independent settlement groups for different asset types, for example, there may exist unique settlement groups for different currencies, securities, bonds, exchanges, commodities, and markets. The system 100 may additionally support settlement groups for exotic currency exchanges.

Figure 24:
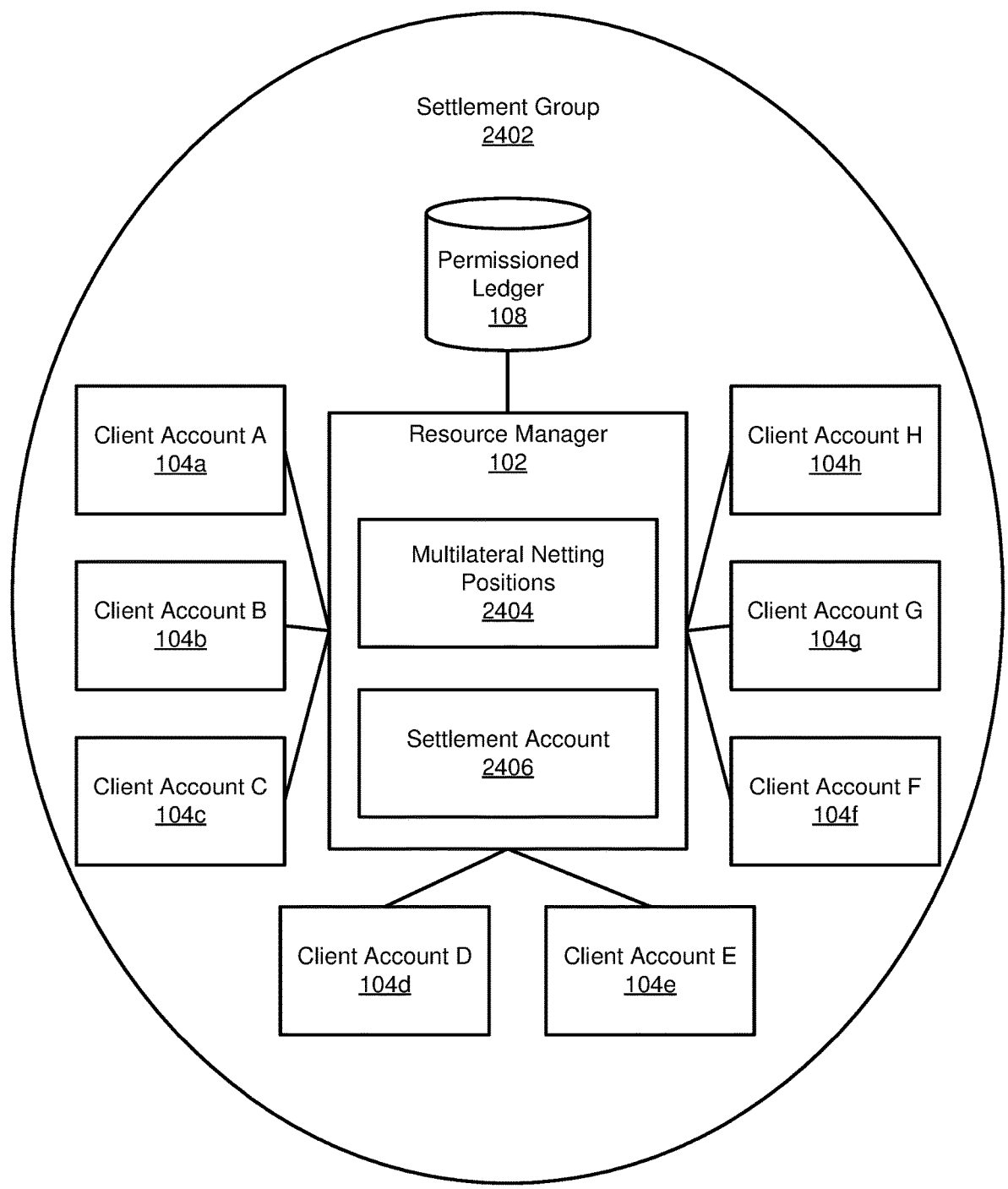
FIG. 24 is a schematic diagram of a settlement group comprising a plurality of client accounts, wherein trades within the settlement group are overseen and managed by a resource manager.

FIG. 24 is a schematic diagram of a settlement group 2402 as described herein. The systems and methods described herein deploy settlement groups comprising a plurality of client accounts. All parties within a settlement group must agree to the terms and conditions of the settlement group, including, for example, how liquidity, obligations, and demands are calculated for parties within the settlement group, thresholds for netting, thresholds for settling, and so forth. The parties in the settlement group may request additional thresholds for executing netting cycles and settling trades between other parties.

The settlement group 2402 described herein enables numerous benefits over traditional settlement systems. Parties within the settlement group 2402 fall under the jurisdiction of the resource manager 102 such that the resource manager has insight into the real-time trade data associated with the parties and can therefore calculate the liquidity of the parties in real-time. Parties within the settlement group 2402 can complete trades with each other nearly immediately after a trade is requested. Additionally, parties within the settlement group 2402 can complete trades with each other after-hours when institutions such as banks, clearinghouses, and exchanges are closed. These significant improvements are enabled by the computer-centric improvements described herein, wherein the client accounts within the settlement group are managed by a resource manger 102 that can oversee incoming data streams and calculate real-time liquidity, obligations, and exposures based on data stored within the client ledger instances 112.

The example settlement group 2402 illustrated in FIG. 24 includes the resource manager 102 in communication with a plurality of client accounts that have opted-in to the settlement group 2402. The client accounts included in the example include client account A 104a through client account H 104h. It should be appreciated that the settlement group 2402 may include any number of client accounts and/or independent nodes associated with single entities.

It should be noted that a client account can operate under the jurisdiction of the resource manager 102 without opting into any settlement group. However, the maximum benefits of the system 100 are realized when client accounts opt into settlement groups. In an embodiment, independent settlement groups are established for trading different assets. For example, independent settlement groups may be established for different currencies, for bonds, securities, and so forth. A client account can join any number of settlement groups and may choose to join a settlement group for each asset the client account trades with.

The resource manager 102 can manage trades between the client accounts within the settlement group 2402 in real-time such that trades can be executed after-hours and nearly immediately after the trade is requested. The resource manager 102 includes a multilateral netting positions 2404 module and a suspense account 2406 module for overseeing and managing operations of the settlement group 2402.

Settling is the act of closing out obligations between principals of a trade. The settlement is the act that involves the movement of assets. In some cases, the parties of the trade agree on a point in time in the future to settle the trades. This determination can be based on a certain time frame (e.g., settle one-hour before markets close), meeting a threshold number of trades or asset value, meeting a threshold liquidity, and so forth. Not all trades will be settled, and some types of trades are never settled and just roll forward. The principals may decide to run multiple settlement cycles on a settlement date.

The multilateral netting positions 2404 module calculates multilateral netting positions between the client accounts within the settlement group. The multilateral netting positions 2404 module may additionally calculate bilateral netting positions between any two parties within the settlement group 2402 or outside the settlement group 2402. The multilateral netting positions 2404 module calculates dynamic netting positions that are adjusted in near real-time as trade data is consumed by the data ingestion engine 224.

The suspense account 2406 The shared permissioned ledger tracks the balances each participant has in the suspense account. The ownership change for funds in the suspense account can happen independent of the settlement rails or hours of operations. Only transfer of funds outside of settlement bank requires the currency specific settlement times. Internal bank transfers can happen independent of the settlement cutoffs. The system 100 manages the suspense account 2406, which may be located at a third-party bank or other institution but is managed by the system 100 for the benefit of all participants within the settlement group 2402.

Figure 25:
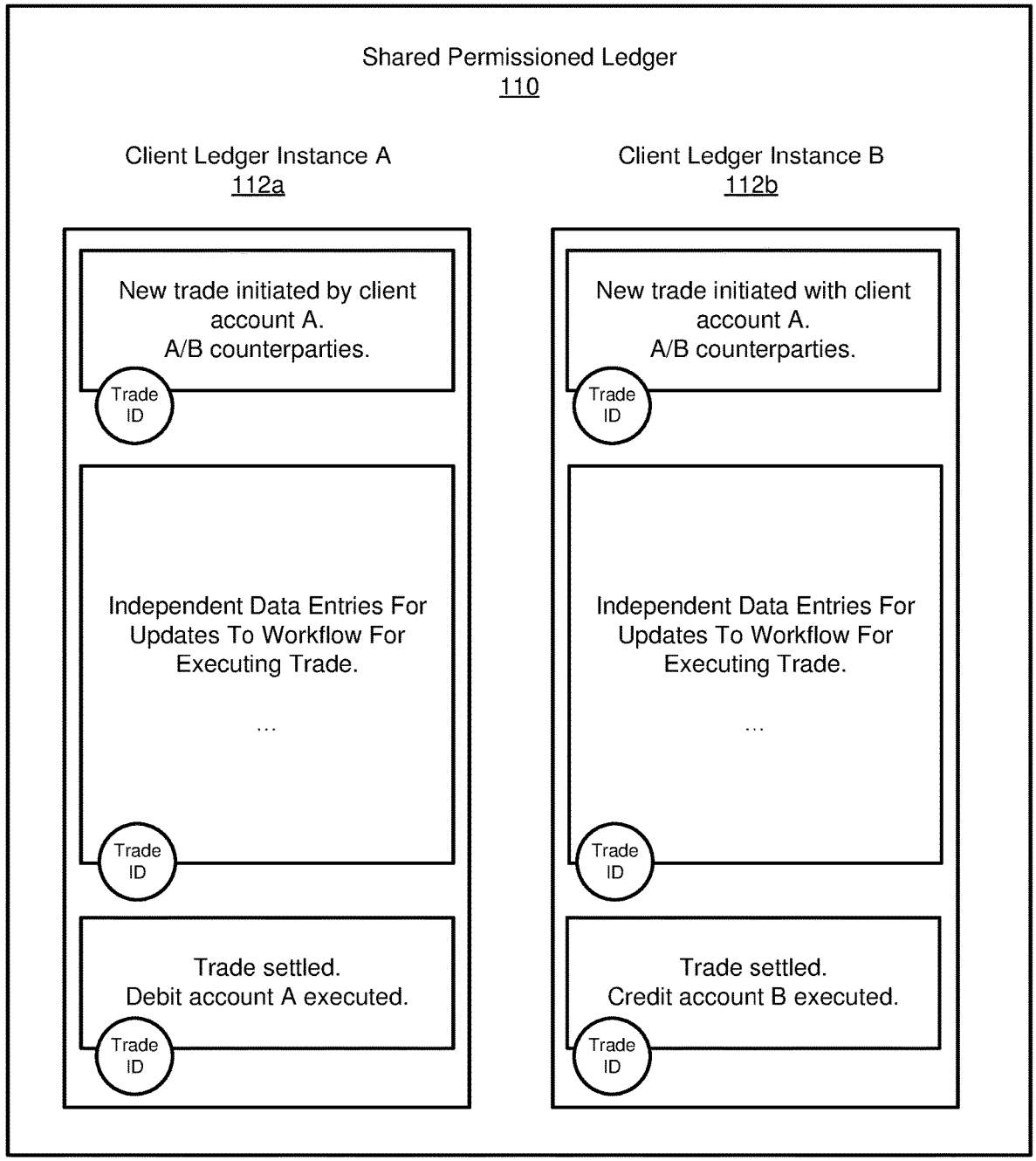
FIG. 25 is a schematic diagram illustrating example data entries stored on independent client ledger instances of a shared permissioned ledger over the course of execution of a trade.

FIG. 25 illustrates example data entries stored on the shared permissioned ledger 110 for counterparties to a trade. In the example illustrated in FIG. 25, client account A initiates a trade with client account B. The client ledger instance A 112a associated with client account A stores a ledger entry indicating that a new trade has been initiated by client account A, and that B is a counterparty. The data entry includes the unique trade identifier associated with the trade. A corresponding data entry is stored on client ledger instance B 112b associated with client account B. The corresponding data entry indicates that a new trade has been initiated with client account A, wherein A and B are counterparties. This data entry also includes the unique trade identifier assigned to the trade.

The client ledger instances 112 additionally include independent data entries for updates to the workflow for executing the trade. Each of these independent data entries includes unique trade identifier associated with the trade. These additional data entries may indicate, for example, that funds have been moved to a suspense account, that the workflow has determined whether sufficient funds are available in the suspense account, whether the trade has been approved by either party, and so forth. When the trade is settled, each of the client ledger instances 112 will store a data entry indicating that the trade has been settled. The data entry stored on client ledger instance A 112a will indicate that a debit on account A has been executed. The data entry stored on client ledger instance B 112b will indicate that a credit on account B has been executed. These data entries will also include the unique trade identifier associated with the trade.

The states stored in the ledger are governed by the states represented in the smart workflow governing the settlement process. Based on triggering events and the participants of the trade, the settlement service chooses the workflow to settle the funds. The workflows for a clearing group are agreed to as part of onboarding to a clearing group. The choice of workflow determines the steps/states the workflow will have. All states of the workflow are stored in the ledger. The workflow has 2 types of states, public states which are shared between the participants and private states which correspond to only a particular participant. The public states will be stored in both ledgers, however only the principal might have access to the underlying details of the transaction corresponding to the state. For example, the receipt of the funds could be a public state corresponding to a SWIFT message. The details of the SWIFT message will only be visible to the principal, and the other participant will only see an acknowledgement that the workflow state has changed due to receipt of the funds. The private states are only stored in client specific ledger, these correspond to any local steps which the transaction goes through which are not shared with other participants. An example could be an approval step for transfer of funds over a certain threshold.

The shared permissioned ledger 110 implements various constructs to ensure data integrity. The shared permissioned ledger 110 includes cryptographic safeguards that allow a transaction to span 1-n principals. The resource manager 102 ensures that no other users (other than the principals who are parties to the transaction) can view data in transit. Additionally, no other user should have visibility into the data as it traverses the various channels. In some embodiments, there is a confirmation that a transaction was received completely and correctly. The resource manager 102 also handles failure scenarios, such as loss of connectivity in the middle of the transaction. Any data transmitted to a system or device is explicitly authorized such that each data entry on the shared permissioned ledger 110 can only be seen and read by the principals who were a party to the transaction. Additionally, principals can give permission to regulators and other individuals to view the data selectively.

In some embodiments, the resource manager monitors for data tampering. If the data store (central data store or replicated data store) is compromised in any way and the data is altered, the resource manager should be able to detect exactly what changed. Specifically, the resource manager should guarantee all participants on the network that their data has not been compromised or changed. Information associated with changes are made available via events such that the events can be sent to principals via messaging or available to view on, for example, a user interface. Regarding data forensics, the resource manager is able to determine that the previous value of an attribute was X, it is now Y and it was changed at time T, by a person A. If a system is hacked or compromised, there may be any number of changes to attribute X and all of those changes are captured by the resource manager, which makes the tampering evident.

In particular embodiments, the resource manager leverages the best security practices for SaaS (Software as a Service) platforms to provide cryptographic safeguards for ensuring integrity of the data. For ensuring data integrity, the handshake between the client and an API server 2812 (discussed with respect to FIG. 6) establish a mechanism which allows both the client and the server to verify the authenticity of transactions independently. Additionally, the handshake provides a mechanism for both the client and the server to agree on a state of the ledger. If a disagreement occurs, the ledger can be queried to determine the source of the conflict.

The shared permissioned ledger 110 records states changes for a transaction, and in some cases, a transaction is rolled back due to an unrecoverable error, a cancellation of the transaction, and so forth. Additionally, the shared permissioned ledger 110 records when a transaction is "clearing pending," "cleared," "settlement pending," "completed," and/or "cancelled." Each transaction and the associated transaction states include additional metadata. The shared permissioned ledger 110 stores the state information and state changes for the transaction. A separate record is maintained for each state of the transaction. The records cannot be updated or modified.

In some cases, a transaction is created in error (e.g., "fat finger"). For these erroneous transactions to be reversed, the shared permissioned ledger 110 records a new transaction. The metadata for the new transaction includes a reference to the erroneous transaction that needs to be reversed. The parties are informed of the request to reverse the erroneous transaction as part of a new transaction. The new transaction also goes through the state changes illustrated in FIG. 29. When the new transaction is completed, the metadata of the initial transaction is also updated.

Figure 26:
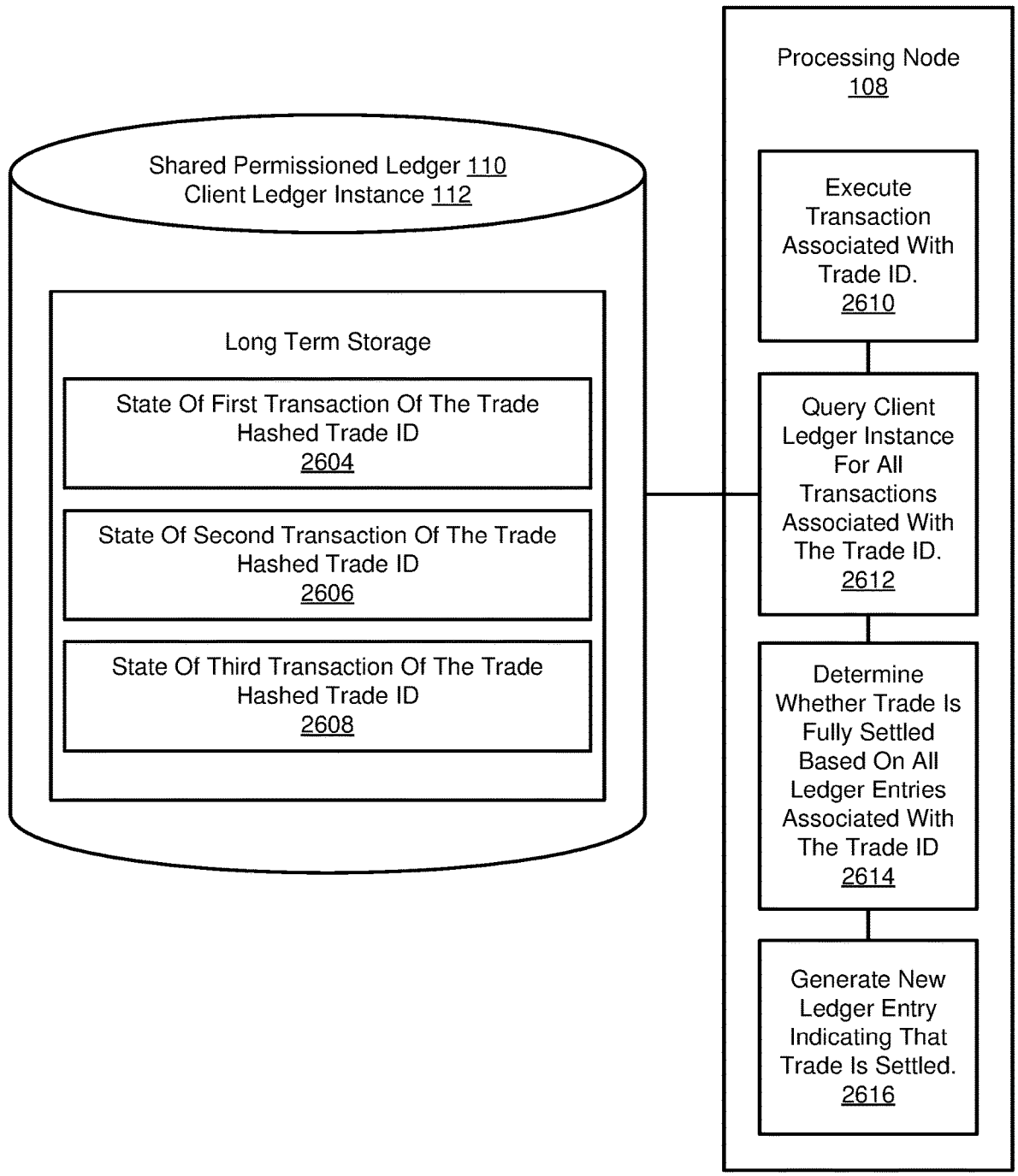
FIG. 26 is a schematic diagram of a system and process flow for matching trades and determining whether a trade has been fully settled.

FIG. 26 is a schematic diagram of a system and process flow for matching trades and determining whether a trade is fully settled. The system includes a client ledger instance 112 of the shared permissioned ledger and a client processing node 108 of the execution platform 106. The processing node 108 executes instances of the resource manager 102 for the client account associated with the client ledger instance 112.

The client ledger instance 112 includes a plurality of data entries applicable to a single trade. The trade has been executed in a plurality of trade-lets, including a first transaction, a second transaction, and a third transaction. The client ledger instance 112 includes at least one independent data entry for each of the trade-let executions of the trade. The client ledger instance 112 includes a state of the first transaction of the trade 2604, and this data entry includes a hashed trade ID associated with the trade. The client ledger instance 112 similarly includes a state of the second transaction of the trade 2606 that also includes the hashed trade ID associated with the trade; and a state of the third transaction of the trade 2608 which also includes a hashed trade ID associated with the trade.

The processing node 108 determines whether the trade has been settled in full. The processing node 108 executes a transaction associated with the trade ID at 2610. The processing node 108 queries the client ledger instance for all transaction associated with the trade ID at 2612. The processing node 108 determines whether the trade is fully settled based on all ledger entries comprising the trade ID at 2614. In response to determining that the trade has been fully settled, the processing node 108 generates a new ledger entry indicating that the trade is COMPLETED at 2616. Alternatively, the processing node 108 may determine that the trade has been partially settled. The processing node 108 may further determine whether an EXCEPTION has occurred on the trade because the trade has been over-settled beyond the initial order amount.

Figure 27:
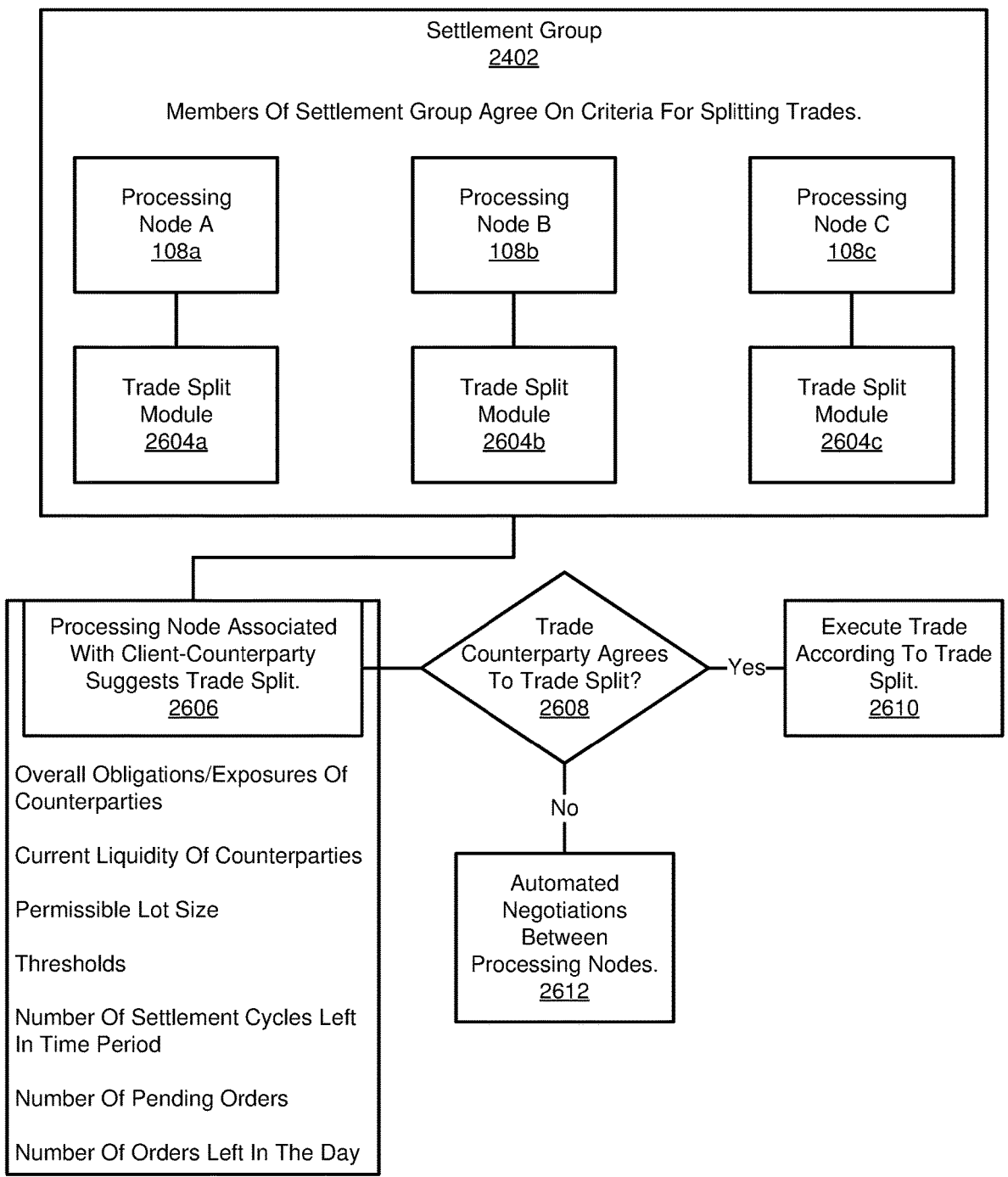
FIG. 27 is a schematic diagram of a system and process flow for negotiating a trade split between counterparties.

FIG. 27 is a schematic diagram of a system and process flow for negotiating a trade split between counterparties. The system includes a settlement group 2402. The settlement group includes one or more client accounts, outside entities, and/or observers. In the example illustrated in FIG. 27, the settlement group 2402 includes at least three client accounts 104. Each of the client accounts includes a processing node 108 and a trade split module 2604 that is executed by the processing node 108.

A process flow begins with a party requesting a trade. The party requesting the trade may be within the settlement group 2402 or outside the settlement group 2402. In an example implementation, the party requesting the trade is part of the settlement group 2402 and the counterparty to the trade is also part of the settlement group 2402. The processing node associated with a counterparty to a trade (i.e., the party requesting the trade and/or another party) suggests a trade split at 2606. The trade split is determined based on one or more factors including, for example, the overall obligations and exposures of the counterparties; the current liquidity of the counterparties; the permissible lot size; thresholds defined by the settlement group 2402 and/or the counterparties; the number of settlement cycles left in a certain time period; a number of pending orders to be completed by the counterparties and/or the settlement group 2402; a number of orders left to be completed in the day, and so forth. The processing node 108 that initially suggests the trade split at 2606 does not have access to all information associated with the trade, and specifically does not have access to information indicating the liquidity, obligations, and exposures of the counterparty to the trade. The processing node 108 must make these calculations based on the outputs from predictive models, information stored in the client ledger instance 112 associated with that processing node 108, and other data that is available to the processing node 108.

The processing node presents the potential trade split to the one or more counterparties. The one or more counterparties approve or decline the trade split at 2608. If the one or more counterparties approve the trade split at 2608, the trade will be executed according to the trade split at 2610. If the one or more counterparties decline the trade split at 2608, automated negotiations will begin between the applicable processing nodes at 2612 to determine the trade split. The negotiations may continue until the processing nodes (or users associated with the applicable accounts) agree to a trade split. If a trade split cannot be agreed upon, the trade may be cancelled.

The trade split indicates how the trade will be executed over time. For example, a trade may include an order to exchange 10 million USD for 8 million EUR. The trade may be executed through the foreign currency exchange market. The parties might not have the required liquidity on-hand to complete the trade in a single execution. The trade may be executed over a series of trade-let executions. For example, the trade may be settled with four separate trade-let executions, each for 2.5 million USD and 2 million EUR. The trade-lets may be executed at different times throughout a single day or may be executed over the course of several days. The parties to the trade agree to a trade split prior to the trade being settled.

Figure 28:
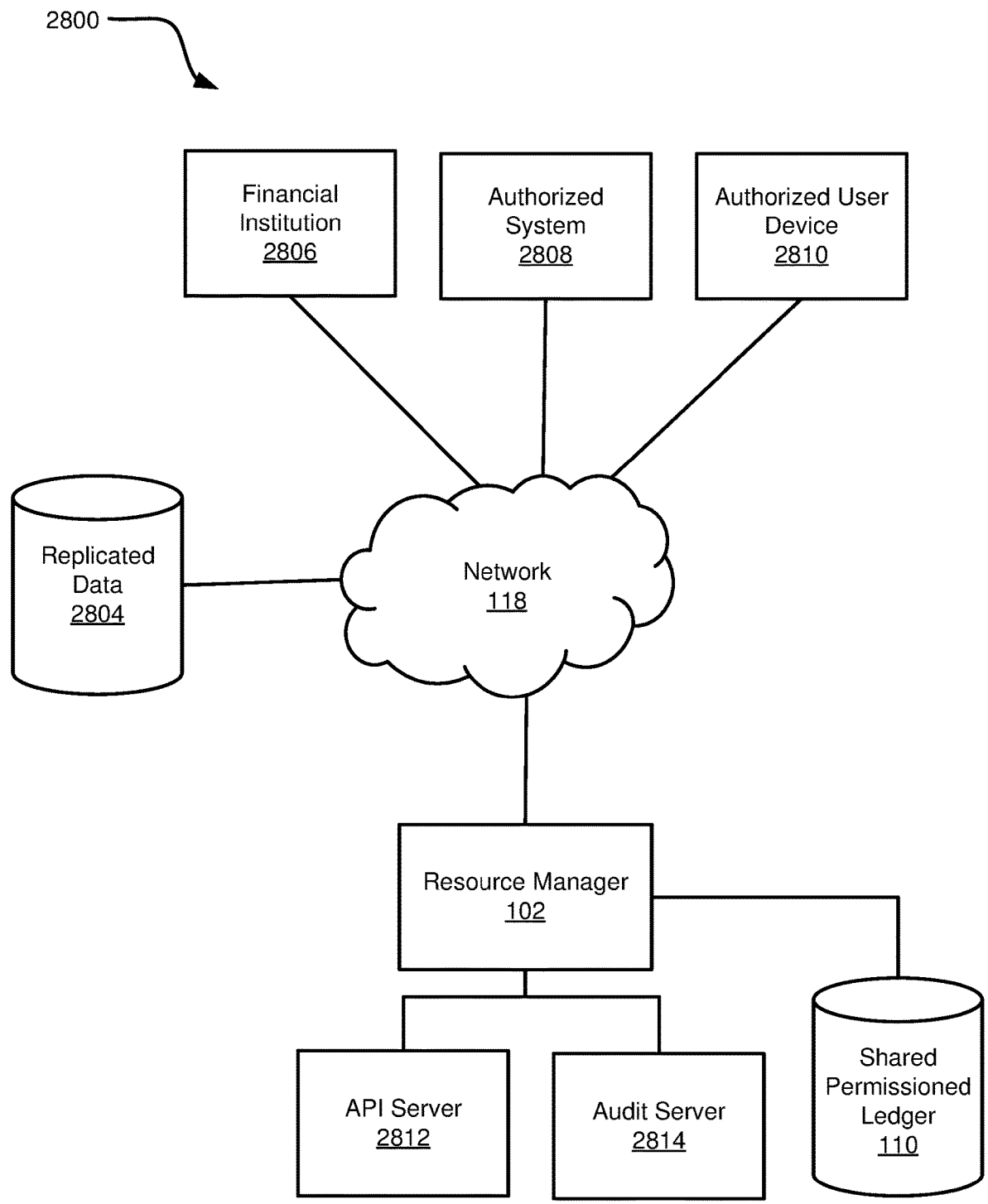
FIG. 28 is a schematic diagram of a system for centralized facilitation of financial transactions between parties.

FIG. 28 is a schematic diagram of a system 2800 for centralized facilitation of financial transactions between unrelated parties. The system includes the resource manager 102, the network 118, and the shared permissioned ledger 110 as described herein. In an implementation wherein the resource manager 102 oversees and facilitates financial transactions between parties, the resource manger 102 may communicate with financial institutions 2806, authorized systems 2808, and authorized user devices 2810 by way of the network 118 connection. The resource manager 102 additionally communicates with a replicated data 2804 database. The resource manager 102 includes and/or communicates with an API server 2812 and an audit server 2814.

In an embodiment, all interactions with the resource manager 102 and/or API server 2912 are secured with TLS (Transport Layer Security). The API server 2812 and the audit server 2814 communicate with the resource manager 102 by way of a suitable data communication link or data communication network, such as the network 118 illustrated in FIG. 28. The API server 2812 and the audit server 2814 may be incorporated in the resource manager 102. In a particular implementation, a single server performs the functions of the API server 2812 and the audit server 2814.

The replicated data 2804 stores data accessible to authorized systems and devices. The replicated data 2804 is a database storing immutable and auditable forms of transaction data between financial institutions. The immutable data cannot be deleted or modified and can instead only be replaced with new data entries referencing the outdated entries. The replicated data 2804 database may store append-only data that keeps track of all intermediate states of the transactions. Additional metadata may be stored along with the transaction data for referencing information available in external systems. In an embodiment, the replicated data 2804 datastore provides read-access to outside, authorized parties to read information associated with clients 104 in communication with the resource manager 102.

The resource manager 102 may communicate with outside parties by way of secure APIs. The API server 2812 of the resource manager 102 is secured with TLS (transport layer security). The resource manager 102 may additionally communicate with an audit server 2814. The API server 2812 and the audit server 2814 communicate with the resource manager 102 using a suitable data communication link or data communication network, such as a local area network or the Internet. The API server 2812 and the audit server 2814 may be incorporated into the resource manager 102.

In some embodiments, at startup, a client sends a few checksums it has sent and transaction IDs to the API server 2812, which can verify the checksums and transaction IDs, and take additional traffic from the client upon verification. In the case of a new client, mutually agreed upon seed data is used at startup. A client request may be accompanied by a client signature and, in some cases, a previous signature sent by the server. The API server 2812 verifies the client request and the previous server signature to acknowledge the client request. The client persists the last server signature and a random set of server hashes for auditing. Both client and server signatures are saved with requests to help quickly audit correctness of the resource manager ledger. The block size of transactions contained in the request may be determined by the client. A client SDK (Software Development Kit) assists with the client server handshake and embedding on server side signatures. The SDK also persists a configurable amount of server signatures to help with restart and for random audits. Clients can also set appropriate block size for requests depending on their transaction rates. The embedding of previous server signatures in the current client block provides a way to chain requests and provide an easy mechanism to detect tampering. In addition to a client-side signature, the requests are encrypted using public key cryptography to provide additional defense against client impersonation. The API server 2812 logs encrypted requests from the client. The encrypted requests are used, for example, during data forensics to resolve any disputes.

A client may communicate a combination of a previous checksum, a current transaction, and a hash of the current transaction to the resource manager 102. Upon receipt of the information, the resource manager 102 checks the previous checksum and computes a new checksum, and stores the client hash, the current transaction, and the current checksum in a storage device, such as the system data 116 database. The checksum history and hash the integrity of the data. Any modification to an existing row in the shared permissioned ledger 110 cannot be made easily because it would be detected by mismatched checksums in the historical data, thereby making it difficult to alter the data.

The integrity of the resource manager 102 is ensured by having server audits at regular intervals. The resource manager 102 uses chained signatures per client at the resource manager, and this ensures that an administrator of resource manager 102 cannot delete or update any entries without making the shared permissioned ledger 110 tamper evident. In some embodiments, the auditing is done at two levels: a minimal level which the SDK enforces using a randomly selected set of server signatures to perform an audit check; and a more thorough audit check run at less frequent intervals to ensure that the data is correct.

The resource manager 102 allows for the selective replication of data. The replicated data can be provided to the replicated data 2804 database, and these transactions can be made available to authorized users, including principal parties to a transaction and observers to the transaction. This approach allows principals or banks to only hold data for transactions they were a party to, while avoiding storage of other data related to transactions in which they were not involved. Additionally, resource manager 102 does not require clients to maintain a copy of the data associated with their transactions. Clients can request the data to be replicated to them at any time. Clients can verify the authenticity of the data stored on the shared permissioned ledger 110 by using the replicated data and comparing the signature the client sent to the resource manager with the request.

The resource manager 102 may communicate with a notarial system to maintain auditability and forensics for the core systems. Rather than relying on a single notary hosted by the resource manager 102, particular embodiments allow the notarial system to be installed and executed on any system that interacts with the resource manager 102 (e.g., financial institutions or clients that facilitate transactions initiated by the resource manager).

The resource manager 102 leverages the best security practices for SaaS (Software as a Service) platforms to provide cryptographic safeguards for ensuring integrity of the data. To ensure data integrity, the handshake between the client account and an API server establish a mechanism which allows both the client and the server to verify the authenticity of transaction independently. The handshake provides a mechanism for both the client account and the server to agree on a state of the shared permissioned ledger. If a disagreement occurs, the shared permissioned ledger is queried to determine the source of the conflict.

The systems and methods discussed herein support different asset classes. Each asset class may have a supporting set of metadata characteristics that are distinct. Additionally, the requests and data may be communicated through multiple "hops" between the originating system and the resource manager. During these hops, data may be augmented (e.g., adding trade positions, account details, and the like) or changed. In certain types of transactions, such as cash transactions, the resource manager 102 streamlines the workflow by supporting rich metadata accompanying each cash transfer. This rich metadata helps banks tie back cash movements to trades, accounts, and clients.

Figure 29:
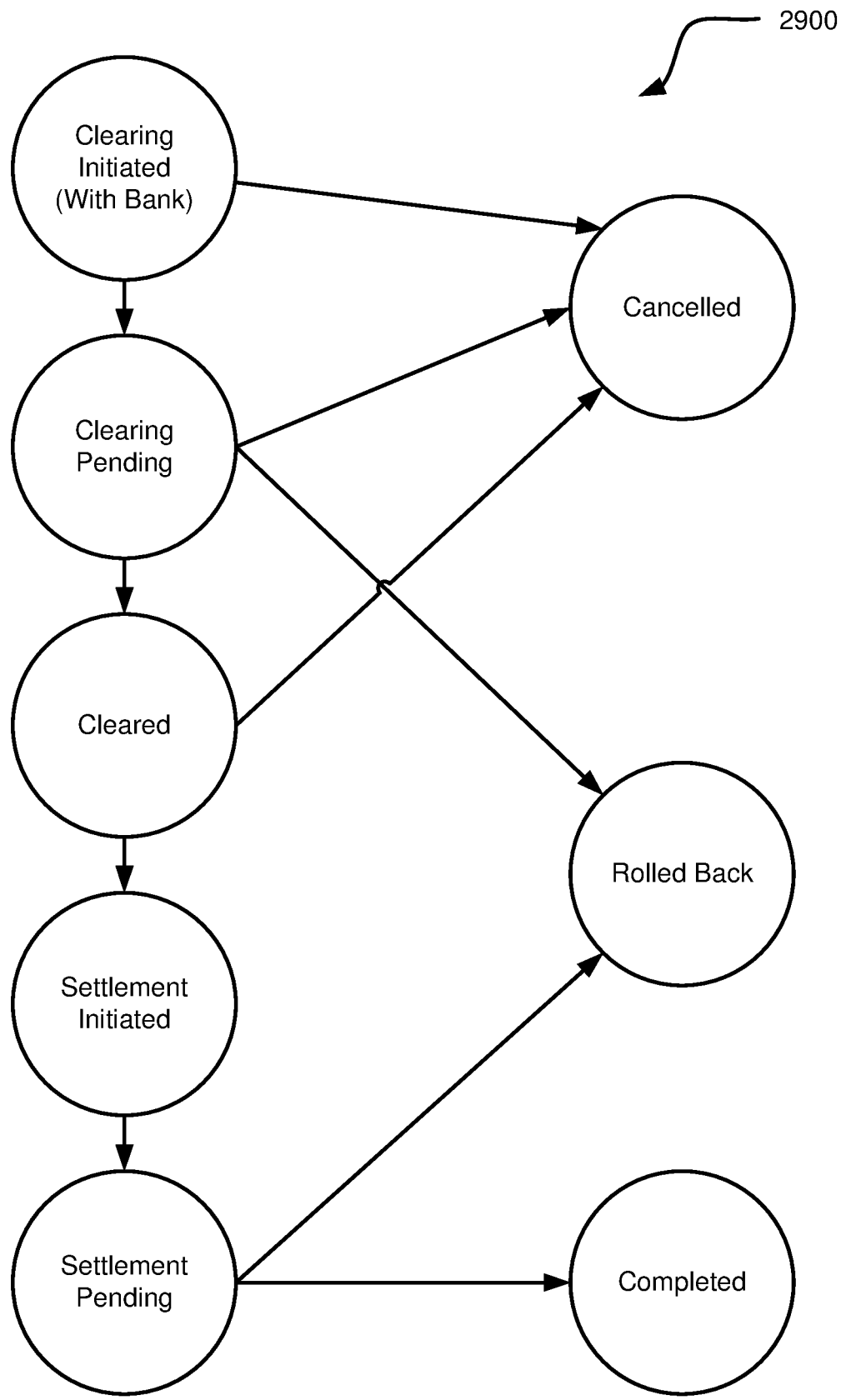
FIG. 29 illustrates an example state diagram showing various states that a trade may undergo from initiation to settlement.

FIG. 29 illustrates an example state diagram 2900 showing various states that a transaction may pass through. As shown in FIG. 29, a particular transaction may be initiated ("new"), then clearing is initiated with a bank, after which the transaction's state is "clearing pending." The next transaction state is "cleared", then settlement is initiated, after which the transaction state is "settlement pending." After the transaction has settled, the state becomes "completed." As shown in state diagram 2900, the state diagram may branch to "cancelled" at locations in the state diagram. For example, a transaction may be cancelled due to insufficient funds, a mutual decision to reverse the transaction before settlement, a bank internal ledger failure, and the like. Additionally, the state diagram may branch to "rolled back" at multiple locations. For example, a transaction may be rolled back due to an unrecoverable error, a cancellation of the transaction, and the like.

Each transaction and the associated transaction states may have additional metadata. The shared permissioned ledger 110 may contain the state information and state changes for a transaction. A separate record is maintained for each state of the transaction. The record is not updated or modified. In some embodiments, all transactions are final and irreversible. The metadata for the new transaction includes a reference to the erroneous transaction that needs to be reversed. The parties are informed of the request to reverse the erroneous transaction as part of a new transaction. The new transaction also goes through the state changes shown in FIG. 29. When the new transaction is completed, the metadata of the initial transaction is also updated.

In some embodiments, the transactions and the metadata recorded in the shared permissioned ledger contain information that are very sensitive and confidential to the businesses initiating the instructions. The systems and methods described herein maintain the security of this information by encrypting data for each participant using a symmetric key that is unique to the participant. In some embodiments, the keys also have a key rotation policy where the data for that node is rekeyed. The keys for each node are bifurcated and saved in a secure storage location with role-based access controls. In some embodiments, only a special service called a cryptographic service can access these keys at runtime to encrypt and decrypt the data.

Figure 30:
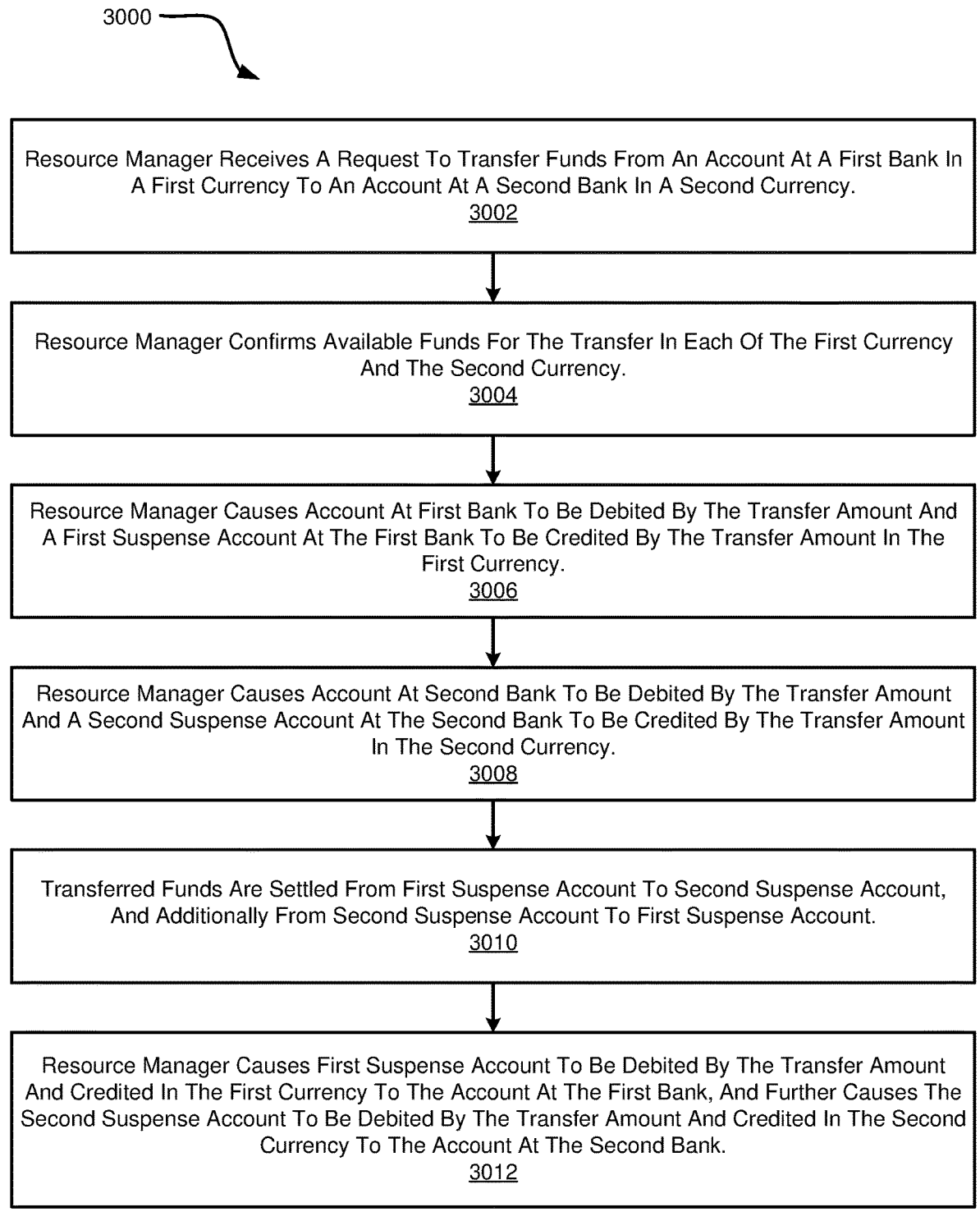
FIG. 30 is a schematic flow chart diagram of a method for transferring assets between funds in different currencies.

FIG. 30 is a schematic flow chart diagram of a method 3000 for transferring assets (e.g., funds) between two banks in different currencies. The method may represent an execution of the asset transfer illustrated in FIG. 11. The method 3000 begins and the resource manager 102 receives at 3002 a request to transfer funds from an account at a first bank in a first currency to an account at a second bank in a second currency. The resource manager 102 confirms at 3004 available funds for the transfer in each of the first currency at the first bank and the second currency at the second bank. The resource manager 102 causes at 3006 an account at the first bank to be debited by the transfer amount and a first suspense account at the first bank to be credited by the transfer amount in the first currency. The resource manager 102 causes at 3008 an account at the second bank to be debited by the transfer amount and a second suspense account at the second bank to be credited by the transfer amount in the second currency. The transferred funds are settled at 3010 from the first suspense account to the second suspense account, and additionally from the second suspense account to the first suspense account. The resource manager causes at 3012 the first suspense account to be debited by the transfer amount and credited in the first currency to the account at the first bank, and further causes the second suspense account to be debited by the transfer amount and credited in the second currency to the account at the second bank.

Figure 31:
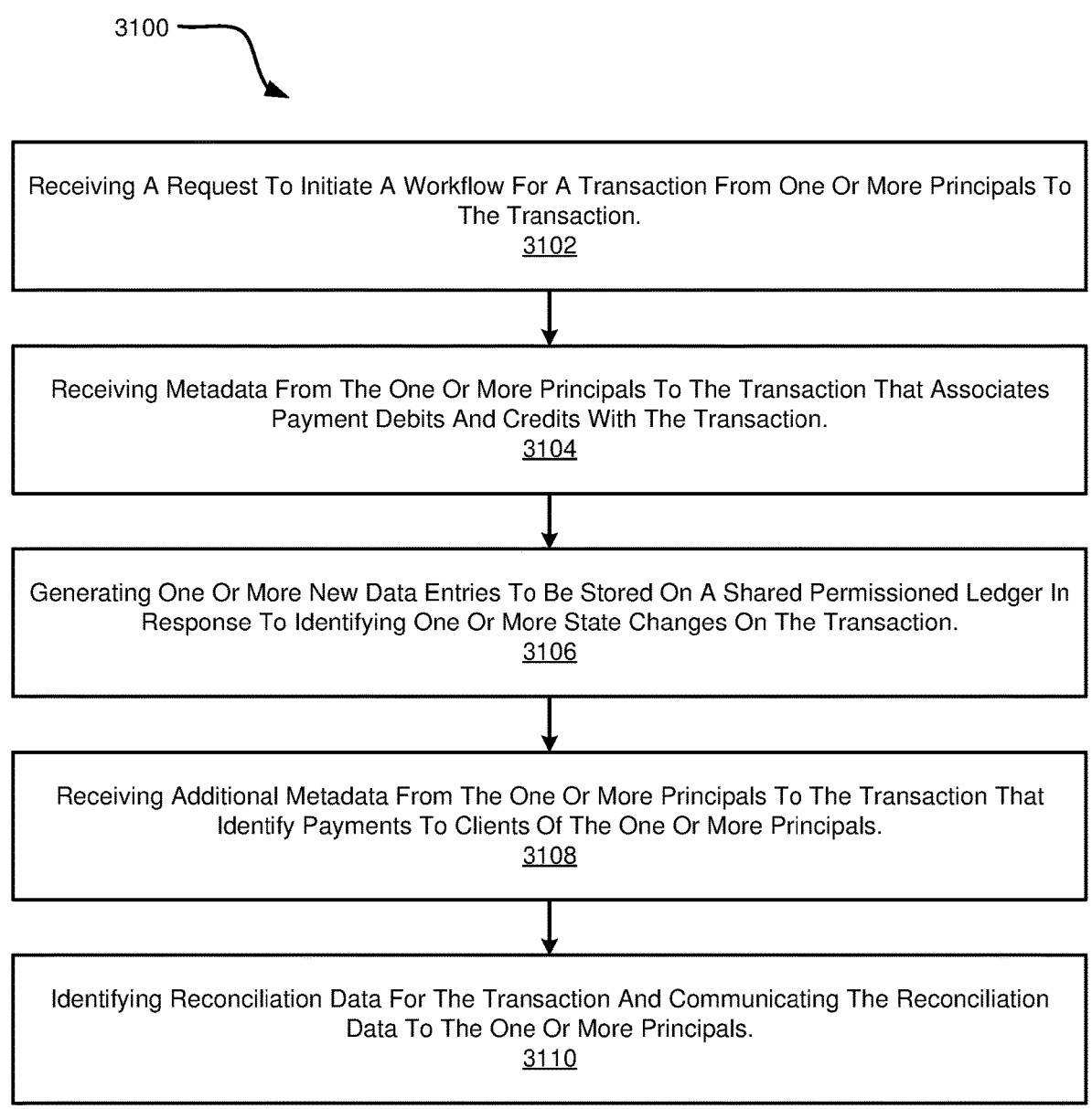
FIG. 31 is a schematic flow chart diagram of a method for initiating a workflow and generating reconciliation data applicable to the workflow.

FIG. 31 is a schematic flow chart diagram of a method 3100 for initiating a workflow and generating reconciliation data applicable to the workflow. Initially, one or more principals to a transaction are onboarded with the resource manager 102. The principals associate their respective client accounts with real-world banking accounts held at various banks or other financial institutions. These associated banking accounts are used for debiting and crediting funds.

The method 3100 begins and the resource manager 102 receives at 3102 a request to initiate a workflow for a transaction from one or more principals to the transaction. The resource manager 102 receives at 3104 metadata from the one or more principals to the transaction that associates payment debits and credits with the transaction. The resource manager 102 generates at 3106 one or more new data entries to be stored on a shared permissioned ledger in response to identifying one or more state changes on the transaction. The resource manager 102 receives at 3108 additional metadata from the one or more principals to the transaction that identifies payments to clients of the one or more principals. The resource manager 102 identifies at 3110 reconciliation data for the transaction and communicates the reconciliation data to the one or more principals.

The resource manager 102 orchestrates the systems and methods discussed herein into a workflow. The workflow may be initiated by authorized users and/or may be automatically triggered by the resource manager 102. When a payment is initiated, the appropriate metadata is passed, and when possible, the resource manager 102 uses the ISO 20022 format for passing additional metadata. The metadata is structured and ties payments in with the amounts to be debited and credited to each principal, and the type of payments. The type of payments includes, for example, whether the payment includes a net payment or gross payment. If the payment is net, the metadata includes the makeup of each unique group of like fees, margins, and so forth. If some of these types have a sub-type, the metadata includes the appropriate subtype (e.g., initial margin versus variation margin, and so forth). For each group of items, the metadata includes the gross position by each trade position. For each trade position, additional metadata may be passed. For example, the CUSIP (Committee on Uniform Security Identification Procedures) number, the number of units, the market prices, fees, and so forth.

Each principal can utilize multiple accounts using the systems and methods described herein. The resource manager 102 sends each bank that holds each account the appropriate messages to initiate the debits and credits. If any of the payments require a settlement message to be sent, the resource manager 102 initiates the appropriate settlement message with the central bank. The shared permissioned ledger 110 records all for the transactions and the state changes associated with each transaction.

The communications between the resource manager 102, client accounts, and principals to various transactions are often asynchronous. The resource manager 102 generates a transaction identifier and a UUID (universal unique identifier) as a reference with each request to track the responses. The systems across the resource manager 102 are heterogenous and sometimes do not return the reference numbers back. In this case, the amounts, the positions, and the account number are used to smartly match payments to the reference.

For payments that involve one-to-many or many-to-one payments, the principals may send the metadata about the net amounts. For example, clearinghouses may send all net metadata positions and CUSIPs. In many cases, there are likely several million CUSIPs held across multiple clearing members. The payment initiation from each clearing member's account is now associated with a different UUID. Each clearing member sends the trade positions of each of the clients that is associated with (or in communication with) the resource manager 102. The resource manager 102 initiates debits and credits from the accounts of the clients to and from the accounts of the clearing members. The resource manager 102 matches trade positions for the end clients and then ties in the net payments of the trade position, fees, charges, and so forth.

Figure 32:
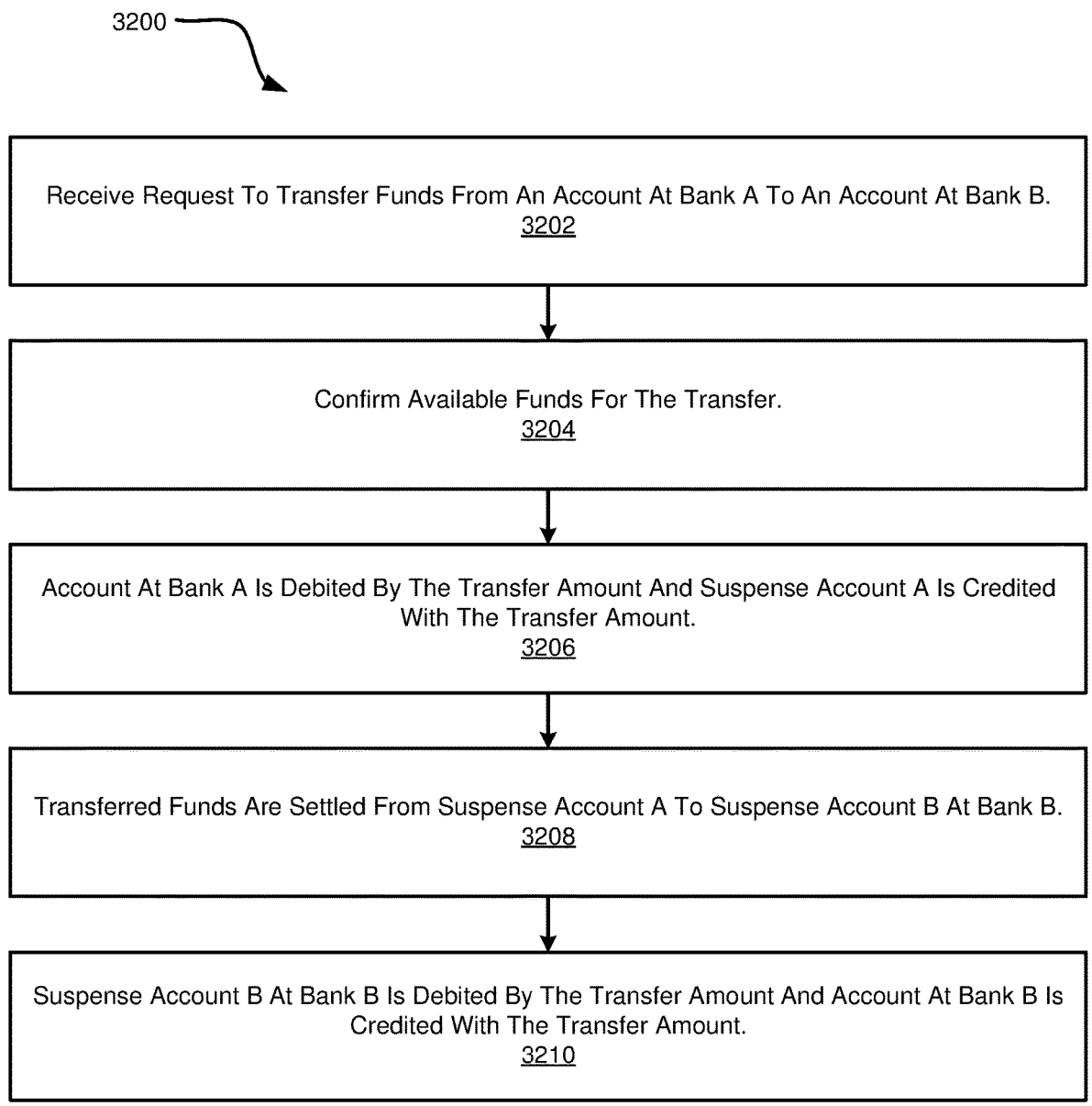
FIG. 32 is a schematic flow chart diagram of a method for transferring assets between financial institutions.

FIG. 32 is a schematic flow chart diagram of a method 3200 for transferring assets (e.g., funds) between two financial institutions. The method 3200 begins and the resource manager 102 receives at 3202 a request to transfer funds from an account at Bank A to an account at Bank B. The request may be received by Bank A, Bank B, or another financial institution, system, device, and the like. The resource manager 102 confirms at 3204 whether there are available funds for the transfer. The resource manager 102 may confirm that an account at bank A comprises sufficient funds to satisfy the amount of funds defined in the received transfer request. If available funds are confirmed at 3204, the resource manager 102 generates a suspense account A at Bank A and creates a suspense account B at Bank B. The suspense account A and suspense account B may be temporary suspense accounts created for a particular transfer of funds. In other implementations, the suspense account A and suspense account B are temporary suspense accounts but are used for a period of time (or for a number of transactions) to support transfers between bank A and bank B.

If available funds are confirmed at 2094, the account at Bank A is debited at 3206 by the transfer amount and suspense account A (at Bank A) is credited with the transfer amount. The resource manager 102 debits the transfer amount from the account at Bank A and credits that transfer amount to the suspense account A. In some embodiments, ownership of the transferred assets changes as soon as the transfer amount is credited to suspense account A.

The transferred funds are settled at 3208 from suspense account A (at Bank A) to suspense account B (at Bank B). The resource manager 102 may settle funds from suspense account A in bank A to suspense account B in bank B. The settlement of funds between two suspense accounts is determined by the counterparty rules set up between the two financial institutions involved in the transfer of funds. For example, a counterparty may choose to settle at the top of the hour or at a certain threshold to manage risk exposure. The settlement process may be determined by the asset type, the financial institution pair, and/or the type of transaction. In some embodiments, transactions can be configured to settle in gross or net. For gross transaction settlement of a PVP workflow, the settlement occurs instantaneously over existing protocols supported by financial institutions, such as FedWire, NSS, and the like. Netted transactions may also settle over existing protocols based on counterparty and netting rules. In some embodiments, the funds are settled after each funds transfer. In other embodiments, the funds are settled periodically, such as once an hour or once a day. Thus, rather than settling the two suspense accounts after each funds transfer between two financial institutions, the suspense accounts are settled after multiple transfers that occur over a period of time. Alternatively, some embodiments settle the two suspense accounts when the amount due to one financial institution exceeds a threshold value.

The method 3200 continues as suspense account B (at Bank B) is debited at 3210 by the transfer amount and account at Bank B is credited with the transfer amount. After finishing step 3210, the funds transfer from account A at bank A to account B at bank B is complete.

In some embodiments, the resource manager 102 facilitates (or initiates) the debit, credit, and settlement activities by sending appropriate instructions to Bank A and/or Bank B. The appropriate bank then performs the instructions to implement at least a portion of method 3200. The example of method 3200 can be performed with any type of asset. In some embodiments, the asset transfer is a transfer of funds using one or more traditional currencies, such as U.S. Dollars (USD) or Great British Pounds (GBP).

Figure 33:
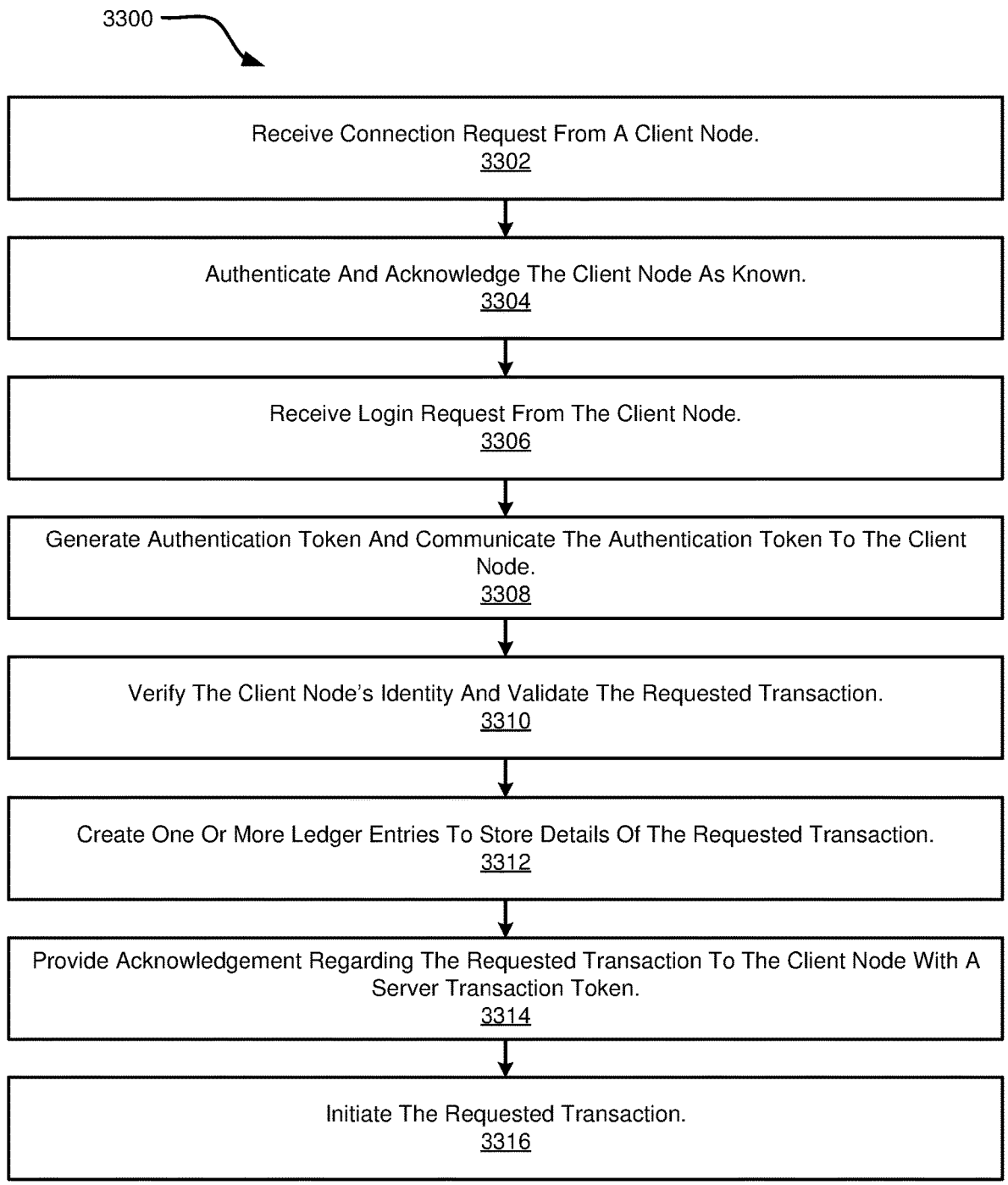
FIG. 33 is a schematic flow chart diagram of a method for authenticating a client and validating a transaction.

FIG. 33 illustrates an embodiment of a method 3300 for authenticating a client and validating a transaction. Initially, the resource manager 102 receives at 3302 a connection request from a client node, such as a financial institution, an authorized system, an authorized user device, or other client types mentioned herein. The resource manager 102 authenticates at 3304 and, if authenticated, acknowledges the client node as known. The method 3300 continues as the resource manager 102 receives at 3306 a login request from the client node. In response to the login request, the resource manager 102 generates at 3308 an authentication token and communicates the authentication token to the client node. In some embodiments, the authentication token is used to determine the identity of the user for future requests, such as fund transfer requests. The identity is then further checked for permissions to the various services or actions.

The resource manager 102 further receives at 3310 a transaction request from the client node, such as a request to transfer assets between two financial institutions or other entities. In response to the received transaction request, the resource manager 102 verifies at 3312 the client node's identity and validates the requested transaction. In some embodiments, the client node's identity is validated based on an authentication token, and then permissions are checked to determine if the user has permissions to perform a particular action or transaction. Transfers of assets also involve validating approval of an account by multiple roles to avoid compromising the network. If the client node's identity and requested transaction are verified, the resource manager creates 3314 one or more ledger entries to store the details of the transaction. The ledger entries may be stored on the shared permissioned ledger 110 as discussed herein. The resource manager 102 then sends at 3316 an acknowledgement regarding the transaction to the client node with a server transaction token. In some embodiments, the server transaction token is used at a future time by the client when conducting audits. Finally, the resource manager 102 initiates at 3318 the transaction using, for example, the systems and methods discussed herein.

As discussed herein, the described systems and methods facilitate the movement of assets between principals (also referred to as "parties" or "participants"). The principals are typically large financial institutions in capital markets that trade multiple financial products. Trades in capital markets can be complex and involve large asset movements (also referred to as "settlements"). The systems and methods described herein can integrate to financial institutions and central settlement authorities such as the US Federal Reserve or DTCC (Depository Trust & Clearing Corporation) to facilitate the final settlement of assets. The described systems and methods also have the ability to execute workflows such as DVP, threshold based settlement, or time-based settlement between participants. Using the workflows, transactions are settled in gross or net amounts.

The systems and methods discussed herein include a hardware and/or software platform that facilitates the movement of assets between principals. In some embodiments, the participants are large financial institutions in capital markets that trade multiple financial products. Trades in capital markets can be complex and involve large asset movements (also referred to as "settlements"). The clearing and settlement gateway discussed herein can integrate to financial institutions and central settlement authorities such as the U.S. Federal Reserve, DTC, and the like to facilitate the final settlement of assets.

Figure 34:
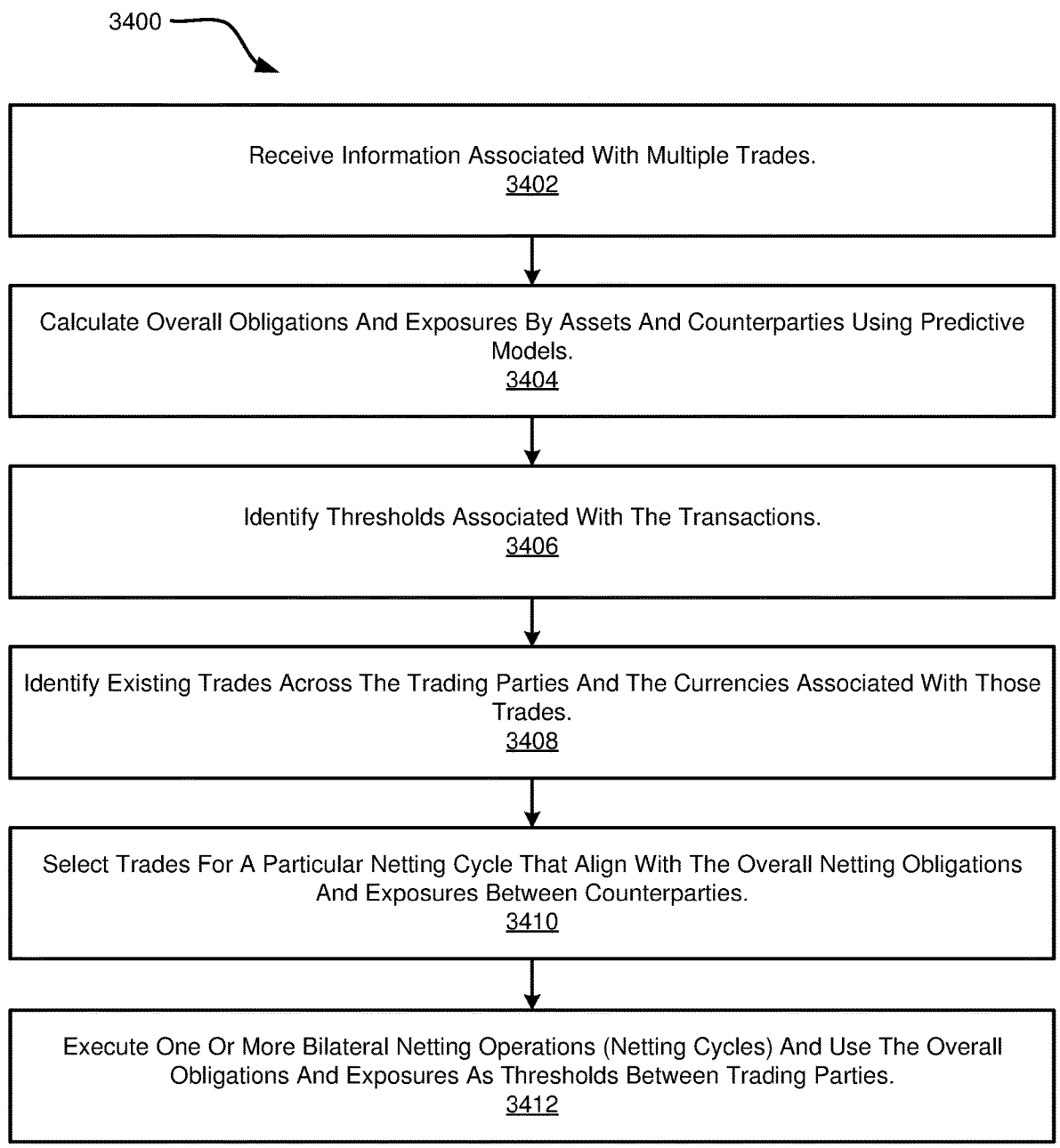
FIG. 34 is a schematic flow chart diagram of a method for netting transactions.

FIG. 34 is a schematic flow chart diagram of a method 3400 for netting transactions. In some embodiments, method 3400 is performed, at least partially, by the resource managers discussed herein. Initially, method 3400 receives 3402 information associated with multiple trades. The received information may be associated with any number of trades between any number of different parties using any number of different currencies. Based on the received trade information, the method calculates 3404 the overall obligations and exposures by assets and counterparties using predictive models. As discussed herein, these predictive models may include one or more stochastic trading liquidity models.

The method 3400 continues by identifying 3406 one or more thresholds associated with any number of transactions. In some embodiments, these thresholds are based on particular parties and/or particular currencies. Example thresholds may define liquidity limits (e.g., minimum liquidity), exposure limits (e.g., maximum exposure), and the like. For example, a first party may set one or more threshold parameters associated with a second party. Further, a first party may set one or more threshold parameters associated with a particular currency. The thresholds may be set by system administrators, parties, financial institutions, or other individuals or institutions.

The method 3400 further identifies 3408 existing trades across the trading parties and the currencies associated with those trades. In a particular example, multiple trades may be executed between multiple parties. A demand optimization engine selects at 3410 trades for a particular netting cycle, which align with the overall bilateral netted obligations and exposures between counterparties. For example, the demand optimization engine analyzes configured obligations and exposure thresholds set in the system. Also, the demand optimization engine uses predictive models (e.g., stochastic trading liquidity models) to calculate projected obligations and exposures. These inputs, along with the set of existing trades across the trading parties and currencies are used to select the trades for the particular netting cycles. In some embodiments, the demand optimization engine considers or analyzes other inputs and options for making trade selections, such as trade settlement priority.

Using the selected trades, the demand optimization engine performs at 3412 multiple bilateral netting operations (e.g., netting cycles) and uses the overall obligations and exposures as thresholds between trading parties. In some embodiments, the demand optimization engine determines the most optimum route to settle the trades between partners. This may be similar to route optimization and selects the order in which the netting groups are settled between partners in any given cycle. In some embodiments, the demand optimization engine may settle multilaterally. In this situation, the multilateral nets are treated as FOP transactions with all parties setting their transactions to complete the netting cycle.

In many existing systems, transaction netting typically happens once per day, such as at the end of the business day. However, the systems and methods discussed herein may be performed at any time of day and may be performed multiple times during a particular day. For example, the methods discussed herein may be performed periodically each day to monitor trades and predict future liquidity, exposure, and the like. If the methods discussed herein identify a problem (e.g., based on threshold values), action can be taken immediately instead of waiting until the end of the business day or some other future time. This periodic monitoring can protect parties by identifying problems (or potential problems) quickly instead of waiting for a one-a-day analysis.

Figure 35:
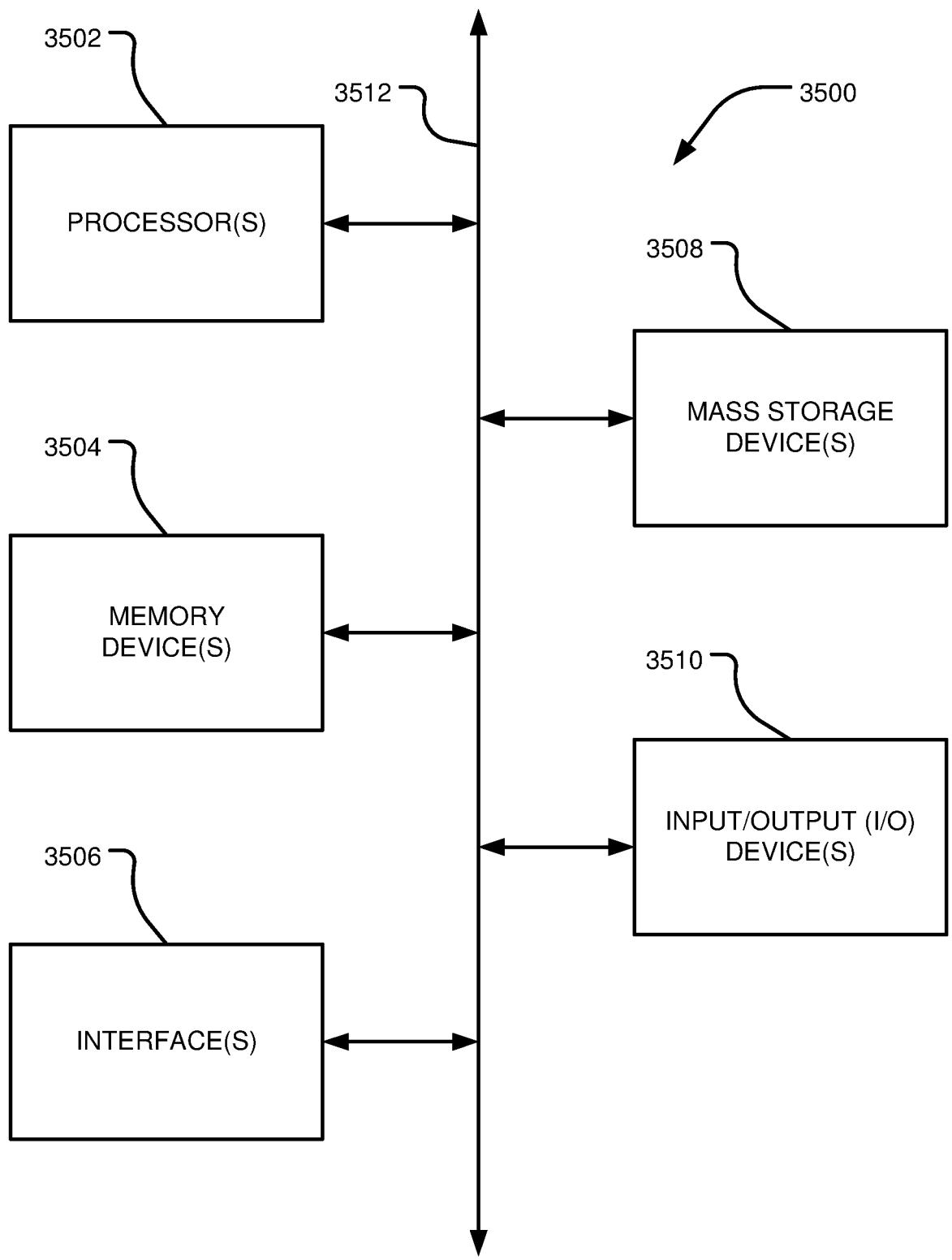
FIG. 35 is a schematic block diagram illustrating example components of a computing device.

FIG. 35 is a block diagram illustrating an example computing device 3500. Computing device 3500 may be used to perform various procedures, such as those discussed herein. Computing device 3500 can function as a server, a client, a client node, a resource manager, or any other computing entity. Computing device 3500 can be any of a wide variety of computing devices, such as a workstation, a desktop computer, a notebook computer, a server computer, a handheld computer, a tablet, a smartphone, and the like. In some embodiments, computing device 3500 represents any of the computing devices discussed herein.

Computing device 3500 includes one or more processor(s) 3502, one or more memory device(s) 3504, one or more interface(s) 3506, one or more mass storage device(s) 3508, and one or more Input/Output (I/O) device(s) 3510, all of which are coupled to a bus 3512. Processor(s) 3502 include one or more processors or controllers that execute instructions stored in memory device(s) 3504 and/or mass storage device(s) 3508. Processor(s) 3502 may also include various types of computer-readable media, such as cache memory.

Memory device(s) 3504 include various computer-readable media, such as volatile memory (e.g., random access memory (RAM)) and/or nonvolatile memory (e.g., read-only memory (ROM)). Memory device(s) 3504 may also include rewritable ROM, such as Flash memory.

Mass storage device(s) 3508 include various computer readable media, such as magnetic tapes, magnetic disks, optical disks, solid state memory (e.g., Flash memory), and so forth. Various drives may also be included in mass storage device(s) 3508 to enable reading from and/or writing to the various computer readable media. Mass storage device(s) 3508 include removable media and/or non-removable media.

I/O device(s) 3510 include various devices that allow data and/or other information to be input to or retrieved from computing device 3500. Example I/O device(s) 3510 include cursor control devices, keyboards, keypads, microphones, monitors or other display devices, speakers, printers, network interface cards, modems, lenses, CCDs or other image capture devices, and the like.

Interface(s) 3506 include various interfaces that allow computing device 3500 to interact with other systems, devices, or computing environments. Example interface(s) 3506 include any number of different network interfaces, such as interfaces to local area networks (LANs), wide area networks (WANs), wireless networks, and the Internet.

Bus 3512 allows processor(s) 3502, memory device(s) 3504, interface(s) 3506, mass storage device(s) 3508, and I/O device(s) 3510 to communicate with one another, as well as other devices or components coupled to bus 3512. Bus 3512 represents one or more of several types of bus structures, such as a system bus, PCI bus, IEEE 3594 bus, USB bus, and so forth.

For purposes of illustration, programs and other executable program components are shown herein as discrete blocks, although it is understood that such programs and components may reside at various times in different storage components of computing device 3500 and are executed by processor(s) 3502. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

EXAMPLES

The following examples pertain to further embodiments.

Example 1 is a system. The system includes a resource manager in communication with a network, wherein the resource manager comprises a data ingestion engine and a netting module. The system includes an execution platform comprising a plurality of processing nodes, wherein each of the plurality of processing nodes is assigned to one client account of a plurality of client accounts coupled to the resource manager. The system includes a shared permissioned ledger comprising a plurality of ledger instances, wherein each of the plurality of ledger instances is assigned to one client account of the plurality of client accounts, and wherein storage resources on the shared permissioned ledger are independently scalable from processing resources on the execution platform. The system is such that the data ingestion engine comprises a plurality of node-specific ingestors, wherein each of the plurality of node-specific ingestors is assigned to a data stream event channel pushed by one of the plurality of client accounts. The system is such that each of the plurality of node-specific ingestors feeds data from the assigned data stream even channel to an assigned node-specific normalizer configured to normalize the data. The system is such that the netting module is executed on independent processing nodes for each of the plurality of client accounts to identify one or more trades to be included in a netting group based on the normalized data.

Example 2 is a system as in Example 1, wherein the resource manager is coupled to a first client account and a second client account, and wherein: the execution platform comprises a first processing node assigned to the first client account and a second processing node assigned to the second client account; the shared permissioned ledger comprises a first ledger instance assigned to the first client account and a second ledger instance assigned to the second client account; the first processing node executes a first instance of the data ingestion engine for consuming data pushed by the first client account, wherein the first instance of the data ingestion engine comprises one or more node-specific ingestors and one or more node-specific normalizers each assigned to one data stream event channel pushed by the first client account; the second processing node executes a second instance of the data ingestion engine for consuming data pushed by the second client account, wherein the second instance of the data ingestion engine comprises one or more node-specific ingestors and one or more node-specific normalizers each assigned to one data stream event channel pushed by the second client account.

Example 3 is a system as in any of Examples 1-2, wherein the resource manager scales the processing resources on the execution platform and the storage resources on the shared permissioned ledger up and down to the first processing node, the second processing node, the first ledger instance, and the second ledger instance based on client need.

Example 4 is a system as in any of Examples 1-3, wherein the shared permissioned ledger stores normalized data entries comprising trade data associated with the plurality of client accounts, and wherein: the first ledger instance stores trade data only associated with the first client account; the second ledger instance stores trade data only associated with the second client account; the first processing node does not have read or write authorization on the second ledger instance; and the second processing node does not have read or write authorization on the first ledger instance.

Example 5 is a system as in any of Examples 1-4, wherein the one or more node-specific normalizers of the first processing node push normalized data to a first normalized data channel, and wherein the one or more node-specific normalizers of the second processing node push normalized data to a second normalized data channel, and wherein: the first processing node executes a first instance of the netting module, wherein the first instance of the netting module reads the first normalized data channel and does not have authorization to the second normalized data channel; and the second processing node executes a second instance of the netting module, wherein the second instance of the netting module reads the second normalized data channel and does not have authorization to read the first normalized data channel.

Example 6 is a system as in any of Examples 1-5, wherein each of the first instance of the netting module and the second instance of the netting module execute netting instructions for calculating netting obligations, wherein the first instance of the netting module calculates netting obligations for the first client account, and wherein the second instance of the netting module calculates netting obligations for the second client account, and wherein the netting instructions comprise: determining a most recent netting cycle based on data stored on the shared permissioned ledger, wherein the most recent netting cycle comprises trades wherein the first client account and the second client account are counterparties; identifying one or more pending trades between the first client account and the second client account since the most recent netting cycle; generating a current netting group comprising the one or more pending trades since the most recent netting cycle; and dynamically updating the current netting group with new trades between the first client account and the second client account based on data received from the first normalized data channel and/or the second normalized data channel.

Example 7 is a system as in any of Examples 1-6, wherein the netting instructions further comprise determining when the current netting group should be closed and settled based on rules-based triggers and specifications set by the first client account and/or the second client account comprising one or more of: a predetermined time and/or date for settling netting groups, a trade-quantity risk profile, a trade-value risk profile, a liquidity threshold, or an output of a stochastic predictive model for calculating future obligations and exposures.

Example 8 is a system as in any of Examples 1-7, wherein the netting instructions further comprise: assigning a netting ID to the current netting group; identifying a trade ID for trades within the current netting group; causing updated data entries to be stored on the shared permissioned ledger for each trade within the netting group, wherein the updated data entries comprise the netting ID and an applicable trade ID.

Example 9 is a system as in any of Examples 1-8, wherein the netting instructions further comprise executing the stochastic predictive model to predict future obligations and exposures based on historical data, wherein executing the stochastic predictive model comprises calculating a predictive quantity for each asset type traded within the current netting group at a future time.

Example 10 is a system as in any of Examples 1-9, wherein each of the plurality of client account represents a financial institution comprising one or more of a bank, credit union, hedge fund, asset management system, asset management organization, mutual fund, clearinghouse, or exchange, and wherein the financial institution pushes financial trade data to the data ingestion engine.

Example 11 is a system as in any of Examples 1-10, wherein the data ingestion engine receives financial trade in a plurality of data formats, and wherein the plurality of node-specific normalizers comprise a software module for translating ingested raw data from a language defined by the applicable client account to a canonical format used by the resource manager.

Example 12 is a system as in any of Examples 1-11, wherein the netting module calculates bilateral netting for two parties and further calculates multilateral netting for three or more parties in a settlement group.

Example 13 is a system as in any of Examples 1-12, wherein the plurality of processing nodes are configured to calculate trade splits for an assigned client account, wherein the trade split comprises an indication of how many trade-let executions should be executed to settle a trade in full.

Example 14 is a system as in any of Examples 1-13, wherein calculating the trade splits comprises suggesting a trade split based on one or more of: obligations and exposures of the assigned client account for an asset type applicable to a certain trade; current liquidity of the assigned client account; predicted liquidity of a counterparty to the certain trade based on an output from a stochastic liquidity model; permissible lot size as defined by the assigned client account; one or more risk thresholds or liquidity thresholds defined by the assigned client account; a number of settlement cycles remaining in a defined time period; a number of pending trades associated with the assigned client account; or a number of pending trade orders left to settled in a defined time period.

Example 15 is a system as in any of Examples 1-14, wherein the processing node is further configured to provide the suggested trade split to one or more counterparties for the certain trade for approval or denial by the one or more counterparties.

Example 16 is a system as in any of Examples 1-15, wherein the resource manager further comprises a liquidity router for calculating a lowest-cost pathway for executing a currency exchange, wherein the lowest-cost pathway comprises one or more of: a lowest cost based on currency exchange rate losses or a lowest-cost based on fewest number of hop trades.

Example 17 is a system as in any of Examples 1-16, wherein each of the plurality of client accounts engaging in currency exchange comprises an independent liquidity router, wherein each of the independent liquidity routers is assigned to one client account of the plurality of client accounts such that the independent liquidity routers can only access data stored on the ledger instance assigned to the one client to which the independent liquidity router is assigned.

Example 18 is a system as in any of Examples 1-17, wherein the liquidity router executes a currency predictive model for calculating the lowest-cost pathway for executing the currency exchange, wherein the currency predictive model is a stochastic model for predicting current and future liquidity of a plurality of currencies based on one or more of: current currency positions of counterparties to a trade, current liquidity for a plurality of currencies, least cross, historical best rates for the plurality of currencies, and an identification of market makers likely to have liquidity in any of the plurality of currencies, and wherein the currency predictive model outputs results to a pseudo ledger.

Example 19 is a system as in any of Examples 1-18, wherein the liquidity router calculates the lowest-cost pathway for executing the currency exchange based on outputs stored on the pseudo ledger and by executing a shortest path algorithm in graph theory, wherein: a first algorithm node indicates an initial currency in the currency exchange; a second algorithm node indicates a final currency in the currency exchange; one or more intermediary nodes indicate currency pairs that can be exchanged; and edges between nodes in the shortest path algorithm indicate a back-to-back trade between two ledgers for an applicable currency pair.

Example 20 is a system as in any of Examples 1-19, wherein one or more of the initial currency or the final currency in the currency exchange is an exotic currency, wherein exotic currencies comprises non-G10 currencies.

Example 21 is a system. The system includes a resource manager in communication with a network. The system includes an execution platform comprising a plurality of processing nodes, wherein each of the plurality of processing nodes is assigned to one client account of a plurality of client accounts coupled to the resource manager. The system includes a shared permissioned ledger comprising a plurality of ledger instances, wherein each of the plurality of ledger instances is assigned to one client account of the plurality of client accounts. The system is such that the resource manager comprises one or more processors for executing instructions stored in non-transitory computer readable storage media. The instructions include scaling processing resources on the execution platform independently from scaling storage resources on the shared permissioned ledger based on need. The instructions include defining a settlement group comprising one or more settlements clients from the plurality of client accounts, wherein the settlement group comprises trading rules that apply to each of the one or more settlement clients. The instructions include ingesting data from each of the plurality of client accounts by way of a data ingestion engine comprising a plurality of node-specific ingestors, wherein each of the plurality of node-specific ingestors is assigned to a data stream event channel pushed by one of the plurality of client accounts. The instructions include assigning the ingested data an encryption level on a key hierarchy within the shared permissioned ledger based on content of the ingested data. The instructions include authenticating an observer node associated with at least one of the one or more settlement clients, wherein the observer node is granted read access to certain data on the shared permissioned ledger.

Example 22 is a system as in Example 21, wherein the instructions further comprise: ingesting data from each of the plurality of client accounts by way of the data ingestion engine; normalizing the ingested data to a canonical format readable by the resource manager to generate normalized data; partitioning the normalized data across the plurality of ledger instances of the shared permissioned ledger based on ownership, wherein a first client account assigned to a first ledger instance can only read or write to data stored on the first ledger instance.

Example 23 is a system as in any of Examples 21-22, wherein the instructions further comprise: assigning the normalized data an encryption level on the key hierarchy of the shared permissioned level based on content of the normalized data; encrypting the normalized data with an appropriate encryption key based on the assigned encryption level on the key hierarchy; and assigning permissions to the normalized data based on the assigned encryption level on the key hierarchy.

Example 24 is a system as in any of Examples 21-23, wherein the instructions are such that encrypting the normalized data comprises: identifying an owner of a normalized data entry based on which node-specific ingestor consumed the normalized data entry; determining whether the normalized data entry will be shared with a node that does not have ownership of the normalized data entry; receiving an encryption key from a third party service, wherein the encryption key is assigned to the owner of the normalized data entry; and in response to determining the normalized data entry will be shared with a non-owner, encrypting the normalized data entry with the encryption key.

Example 25 is a system as in any of Examples 21-24, wherein the key hierarchy for the shared permissioned ledger comprises: level zero keys applied to data comprising one or more of a group identifier, a trade data fee, trade data, or a trade identifier; level one keys applied to data comprising a trade set identifier; level two keys assigned to data comprising one or more of a trade bundle keyset or a trade bundle identifier; and level three keys assigned to data comprising one or more of a trade bag keyset or a trade bag identifier.

Example 26 is a system as in any of Examples 21-25, wherein the observer node is associated with one or more of a clearinghouse, exchange, settlement agent, or regulatory agency, and wherein the instructions further comprise: generating a data subscription model for the observer node based on permissions granted to the observer node by an associated settlement client, wherein the data subscription model identifies one or more events occurring within the settlement group; triggering the data subscription model when any of the one or more events occurs within the settlement group; identifying data stored on a ledger instance associated with the settlement client that is part of the data subscription model; and providing the identified data to the observer node by way of a data push notification and/or a data pull authorization.

Example 27 is a system as in any of Examples 21-26, wherein the instructions further comprise generating a reconciliation report for the associated settlement client, wherein generating the reconciliation report comprises: identifying trade data to be included in the reconciliation report; hashing the trade data with a unique hash based on a public key assigned to the associated settlement client; storing the unique hash on a datastore independent of the shared permissioned ledger; and digitally signing the reconciliation report with a private key, wherein the private key ensures the reconciliation report is available only to the associated settlement client and the observer node.

Example 28 is a system as in any of Examples 21-27, wherein the instructions further comprise: authorizing a suspense account and associating the suspense account with the settlement group, wherein assets traded between the one or more settlement clients of the settlement group are traded within the suspense account; and tracking ownership of assets within the suspense account with data entries stored across the plurality of ledger instances of the shared permissioned ledger.

Example 29 is a system as in any of Examples 21-28, wherein the instructions further comprise: receiving a request to execute a transaction between a first settlement client and a second settlement client; determining whether sufficient assets exist in the suspense account belonging to the first settlement client and/or the second settlement client for executing the transaction; in response to determining that sufficient assets exist to execute the transaction, generating one or more data entries on the shared permissioned ledger indicating the assets have transferred ownership within the suspense account according to the requested transaction.

Example 30 is a system as in any of Examples 21-29, wherein the first settlement client is associated with a first ledger instance of the shared permissioned ledger, and wherein the second settlement client is associated with a second ledger instance of the shared permissioned ledger, and wherein the instructions are such that generating the one or more data entries comprises: generating a first data entry to be stored on the first ledger instance, wherein the first data entry represents the transaction from a point of view of the first settlement client; and generating a second data entry to be stored on the second ledger instance, wherein the second data entry represents the transaction from a point of view of the second settlement client; wherein the first settlement client does not have read or write authorization on the second ledger instance; and wherein the second settlement client does not have read or write authorization on the first ledger instance.

Example 31 is a system as in any of Examples 21-30, wherein the instructions are such that the transaction can be executed at any time based on data entries stored on the shared permissioned ledger such that the transaction can be settled during non-operating hours for a bank associated with the suspense account.

Example 32 is a system as in any of Examples 21-31, wherein the resource manager is coupled to a first client account and a second client account, and wherein: the execution platform comprises a first processing node assigned to the first client account and a second processing node assigned to the second client account; the shared permissioned ledger comprises a first ledger instance assigned to the first client account and a second ledger instance assigned to the second client account; the first processing node executes a first instance of the data ingestion engine for consuming data pushed by the first client account, wherein the first instance of the data ingestion engine comprises one or more node-specific ingestors and one or more node-specific normalizers each assigned to one data stream event channel pushed by the first client account; and the second processing node executes a second instance of the data ingestion engine for consuming data pushed by the second client account, wherein the second instance of the data ingestion engine comprises one or more node-specific ingestors and one or more node-specific normalizers each assigned to one data stream event channel pushed by the second client account.

Example 33 is a system as in any of Examples 21-32, wherein the shared permissioned ledger stores normalized data entries comprising trade data associated with the plurality of client accounts, and wherein: the first ledger instance stores trade data only associated with the first client account; the second ledger instance stores trade data only associated with the second client account; the first processing node does not have read or write authorization on the second ledger instance; and the second processing node does not have read or write authorization on the first ledger instance.

Example 34 is a system as in any of Examples 21-33, further comprising a normalization module for normalizing data consumed by the data ingestion engine, and wherein one or more node-specific normalizers of the first processing node push normalized data to a first normalized data channel, and wherein one or more node-specific normalizers of the second processing node push normalized data to a second normalized data channel, and wherein: the first processing node executes a first instance of a reconciliation module, wherein the first instance of the netting module reads the first normalized data channel and does not have authorization to the second normalized data channel; and the second processing node executes a second instance of the reconciliation module, wherein the second instance of the netting module reads the second normalized data channel and does not have authorization to read the first normalized data channel.

Example 35 is a system as in any of Examples 21-34, wherein each of the plurality of client account represents a financial institution comprising one or more of a bank, credit union, hedge fund, asset management system, asset management organization, mutual fund, clearinghouse, or exchange, and wherein the financial institution pushes financial trade data to the data ingestion engine.

Example 36 is a system as in any of Examples 21-35, wherein the data ingestion engine receives financial trade data in a plurality of data formats, and wherein the plurality of node-specific ingestors comprise a software module for translating ingested raw data from a language defined by the applicable client account to a canonical format used by the resource manager.

Example 37 is a system as in any of Examples 21-36, wherein the instructions further comprise: identifying a first settlement client within the settlement group; identifying clearinghouse-level data owned by the first settlement client and stored on a ledger instance associated with the first settlement client, wherein the clearinghouse-level data is assigned permissions to be shared with an authorized observer node; identifying bankruptcy-specific data stored on the ledger instance associated with the first settlement client, wherein the bankruptcy-specific data comprises obligations of the first settlement client to its counterparties; and identifying confidential data stored on the ledger instance associated with the first settlement client, wherein the confidential data comprises permissions and encryptions indicating the confidential data will not be shared with other parties.

Example 38 is a system as in any of Examples 21-37, wherein the instructions further comprise: providing the clearinghouse-level data to an authorized observer node with permission to view the clearinghouse-level data; identifying a second settlement client within the settlement group with authorization to view the bankruptcy-specific data associated with the first settlement client; enabling the second settlement client to read the bankruptcy-specific data associated with the first settlement client; and ensuring the confidential data is not replicated.

Example 39 is a system as in any of Examples 21-38, wherein the instructions further comprise: generating a first reconciliation report for the first settlement client based on the clearinghouse-level stored on the ledger instance associated with the first settlement client, wherein the first reconciliation report reconciles net debits and credits for the one or more settlement clients within the settlement group; and generating a second reconciliation report for the second settlement client based on clearinghouse-level stored on a ledger instance associated with the second settlement client, wherein the second reconciliation report reconciles net debits and credits for the one or more settlement clients within the settlement group; wherein the first reconciliation report and the second reconciliation report are generated according to the key hierarchy.

Example 40 is a system as in any of Examples 21-39, wherein the instructions further comprise: determining whether a conflict exists between the first reconciliation report and the second reconciliation report by determining whether a first hash associated with the first settlement client matches a second hash associated with the settlement client; in response to determining the first hash does not match the second hash, identifying a common set of documents between the first settlement client and the second settlement client; and identifying differences between common documents by hashing data rows from the common documents into tables and identifying rows that do not match.

In the above disclosure, reference has been made to the accompanying drawings, which form a part hereof, and in which is shown by way of illustration specific implementations in which the disclosure may be practiced. It is understood that other implementations may be utilized, and structural changes may be made without departing from the scope of the present disclosure. References in the specification to "one embodiment," "an embodiment," "an example embodiment," "selected embodiments," "certain embodiments," etc., indicate that the embodiment or embodiments described may include a particular feature, structure, or characteristic, but every embodiment may not necessarily include the particular feature, structure, or characteristic. Additionally, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that may be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can include at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired and wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions include, for example, instructions and data which, when executed at a processor, cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a module may include computer code configured to be executed in one or more processors and may include hardware logic/electrical circuitry controlled by the computer code. These example devices are provided herein purposes of illustration and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure are described herein, it should be understood that they are presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the described exemplary embodiments but should be defined only in accordance with the following claims and their equivalents. The description herein is presented for the purposes of illustration and description. It is not intended to be exhaustive or to limit the disclosure to the precise form disclosed. Many modifications and variations are possible in light of the disclosed teaching. Further, it should be noted that any or all of the alternate implementations discussed herein may be used in any combination desired to form additional hybrid implementations of the disclosure.

What is claimed is:

1. A system comprising:
   a resource manager in communication with a network;
   an execution platform comprising a plurality of processing nodes, wherein each of the plurality of processing nodes is dedicated to only one client account of a plurality of client accounts coupled to the resource manager;
   a database comprising a shared permissioned ledger, wherein the shared permissioned ledger is stored across a plurality of independent ledger instances, wherein each of the plurality of independent ledger instances is dedicated to one client account of the plurality of client accounts such that a first ledger instance dedicated to a first client account is stored on independent storage resources from a second ledger instance dedicated to a second client account;
   a data ingestion engine comprising a plurality of node-specific ingestors, wherein each of the plurality of node-specific ingestors is dedicated to a single client account associated with the database, and wherein each of the plurality of node-specific ingestors is assigned to one data stream event channel pushed by one of the plurality of client accounts, and wherein the data ingestion engine independently scales processing and storage resources for each of the plurality of node-specific ingestors;
   wherein the resource manager comprises one or more processors for executing instructions stored in non-transitory computer readable storage media, the instructions comprising:
      reducing latency in data analysis with a stateless Application Program Interface that automatically scales and load-balances processing resources on the execution platform independently from scaling storage resources on the shared permissioned ledger based on need, wherein the shared permissioned ledger comprises scalable storage hardware partitioned to the plurality of independent ledger instances based on need;
      defining a settlement group comprising one or more settlement clients from the plurality of client accounts, wherein the settlement group comprises trading rules that apply to each of the one or more settlement clients;
      identifying ingested data associated with each of the one or more settlement clients, wherein the ingested data is ingested by one or more node-specific ingestors of the data ingestion engine;
      normalizing the ingested data to a canonical format readable by the resource manager to generate normalized data;
      partitioning the normalized data across the plurality of ledger instances of the shared permissioned ledger based on ownership, wherein the first client account assigned to the first ledger instance can only read or write to data stored on the first ledger instance;
      assigning the ingested data an encryption level on a key hierarchy within the shared permissioned ledger based on content of the ingested data;
      encrypting at least a portion of the ingested data with a client-specific key associated with the encryption level;
      tracking real-time liquidity, obligations, and exposures between each of the one or more settlement clients of the settlement group based on data stored on the shared permissioned ledger; and
      authenticating an observer node associated with at least one of the one or more settlement clients, wherein the observer node is granted read access to certain data on the shared permissioned ledger;
   wherein the database is not distributed across a blockchain network; and
   wherein the shared permissioned ledger comprises permissions such that the first client account does not have permission to access data stored on the second ledger for the second client account.

2. The system of claim 1, wherein the instructions are such that: assigning the ingested data the encryption level on the key hierarchy of the shared permissioned level comprises assigning after the ingested data is normalized to the canonical format; and encrypting the ingested data comprises encrypting the normalized data; wherein the instructions further comprise assigning permissions to the normalized data based on the assigned encryption level on the key hierarchy.

3. The system of claim 2, wherein the instructions are such that encrypting the normalized data comprises:
identifying an owner of a normalized data entry based on which node-specific ingestor consumed the normalized data entry;
determining whether the normalized data entry will be shared with a node that does not have ownership of the normalized data entry;
receiving the client key from a third-party service, wherein the client key is assigned to the owner of the normalized data entry; and
in response to determining the normalized data entry will be shared with a non-owner, encrypting the normalized data entry with the client key.

4. The system of claim 1, wherein the key hierarchy for the shared permissioned ledger comprises:
level zero keys applied to data comprising one or more of a group identifier, a trade data fee, trade data, or a transaction identifier;
level one keys applied to data comprising a trade set identifier;
level two keys assigned to data comprising one or more of a trade bundle keyset or a trade bundle identifier; and
level three keys assigned to data comprising one or more of a trade bag keyset or a trade bag identifier.

5. The system of claim 1, wherein the observer node is associated with one or more of a clearinghouse, exchange, settlement agent, or regulatory agency, and wherein the instructions further comprise:
generating a data subscription model for the observer node based on permissions granted to the observer node by an associated settlement client, wherein the data subscription model identifies one or more events occurring within the settlement group;
triggering the data subscription model when any of the one or more events occurs within the settlement group;
identifying data stored on a ledger instance associated with the settlement client that is part of the data subscription model; and
providing the identified data to the observer node by way of a data push notification and/or a data pull authorization.

6. The system of claim 5, wherein the instructions further comprise generating a reconciliation report for the associated settlement client, wherein generating the reconciliation report comprises:
identifying trade data to be included in the reconciliation report;
hashing the trade data with a unique hash based on a public key assigned to the associated settlement client;
storing the unique hash on a datastore independent of the shared permissioned ledger; and
digitally signing the reconciliation report with a private key, wherein the private key ensures the reconciliation report is available only to the associated settlement client and the observer node.

7. The system of claim 1, wherein the instructions further comprise:
authorizing a suspense account and associating the suspense account with the settlement group, wherein assets traded between the one or more settlement clients of the settlement group are traded within the suspense account; and
tracking ownership of assets within the suspense account with data entries stored across the plurality of ledger instances of the shared permissioned ledger.

8. The system of claim 7, wherein the instructions further comprise:
receiving a request to execute a transaction between a first settlement client and a second settlement client;
determining whether sufficient assets exist in the suspense account belonging to the first settlement client and/or the second settlement client for executing the transaction;
in response to determining that sufficient assets exist to execute the transaction, generating one or more data entries on the shared permissioned ledger indicating the assets have transferred ownership within the suspense account according to the requested transaction.

9. The system of claim 8, wherein the first settlement client is associated with the first ledger instance of the shared permissioned ledger, and wherein the second settlement client is associated with the second ledger instance of the shared permissioned ledger, and wherein the instructions are such that generating the one or more data entries comprises:
generating a first data entry to be stored on the first ledger instance, wherein the first data entry represents the transaction from a point of view of the first settlement client; and
generating a second data entry to be stored on the second ledger instance, wherein the second data entry represents the transaction from a point of view of the second settlement client;
wherein the first settlement client does not have read or write authorization on the second ledger instance; and
wherein the second settlement client does not have read or write authorization on the first ledger instance.

10. The system of claim 8, wherein the instructions are such that the transaction can be executed at any time based on data entries stored on the shared permissioned ledger such that the transaction can be settled during non-operating hours for a bank associated with the suspense account.

11. The system of claim 1, wherein the resource manager is coupled to the first client account and the second client account, and wherein:
the execution platform comprises a first processing node assigned to the first client account and a second processing node assigned to the second client account;
the shared permissioned ledger comprises the first ledger instance assigned to the first client account and the second ledger instance assigned to the second client account;
the first processing node executes a first instance of the data ingestion engine for consuming data pushed by the first client account, wherein the first instance of the data ingestion engine comprises one or more node-specific ingestors and one or more node-specific normalizers each assigned to one data stream event channel pushed by the first client account; and
the second processing node executes a second instance of the data ingestion engine for consuming data pushed by the second client account, wherein the second instance of the data ingestion engine comprises one or more node-specific ingestors and one or more node-specific normalizers each assigned to one data stream event channel pushed by the second client account.

12. The system of claim 11, wherein the shared permissioned ledger stores normalized data entries comprising trade data associated with the plurality of client accounts, and wherein:
the first ledger instance stores trade data only associated with the first client account;
the second ledger instance stores trade data only associated with the second client account;
the first processing node does not have read or write authorization on the second ledger instance; and
the second processing node does not have read or write authorization on the first ledger instance.

13. The system of claim 12, further comprising a normalization module for normalizing data consumed by the data ingestion engine, and wherein one or more node-specific normalizers of the first processing node push normalized data to a first normalized data channel, and wherein one or more node-specific normalizers of the second processing node push normalized data to a second normalized data channel, and wherein:
the first processing node executes a first instance of a reconciliation module, wherein the first instance of the netting module reads the first normalized data channel and does not have authorization to the second normalized data channel; and
the second processing node executes a second instance of the reconciliation module, wherein the second instance of the netting module reads the second normalized data channel and does not have authorization to read the first normalized data channel.

14. The system of claim 1, wherein each of the plurality of client accounts represents a financial institution comprising one or more of a bank, credit union, hedge fund, asset management system, asset management organization, mutual fund, clearinghouse, or exchange, and wherein the financial institution pushes financial trade data to the data ingestion engine.

15. The system of claim 1, wherein the data ingestion engine receives financial trade data in a plurality of data formats, and wherein the plurality of node-specific ingestors comprise a software module for translating ingested raw data from a language defined by the applicable client account to a canonical format used by the resource manager.

16. The system of claim 1, wherein the instructions further comprise:
identifying a first settlement client within the settlement group;
identifying clearinghouse-level data owned by the first settlement client and stored on a ledger instance associated with the first settlement client, wherein the clearinghouse-level data is assigned permissions to be shared with an authorized observer node;
identifying bankruptcy-specific data stored on the ledger instance associated with the first settlement client, wherein the bankruptcy-specific data comprises obligations of the first settlement client to its counterparties; and
identifying confidential data stored on the ledger instance associated with the first settlement client, wherein the confidential data comprises permissions and encryptions indicating the confidential data will not be shared with other parties.

17. The system of claim 16, wherein the instructions further comprise:
providing the clearinghouse-level data to an authorized observer node with permission to view the clearinghouse-level data;
identifying a second settlement client within the settlement group with authorization to view the bankruptcy-specific data associated with the first settlement client;
enabling the second settlement client to read the bankruptcy-specific data associated with the first settlement client; and
ensuring the confidential data is not replicated.

18. The system of claim 17, wherein the instructions further comprise:
generating a first reconciliation report for the first settlement client based on the clearinghouse-level data stored on the ledger instance associated with the first settlement client, wherein the first reconciliation report reconciles net debits and credits for the one or more settlement clients within the settlement group; and
generating a second reconciliation report for the second settlement client based on clearinghouse-level data stored on a ledger instance associated with the second settlement client, wherein the second reconciliation report reconciles net debits and credits for the one or more settlement clients within the settlement group;
wherein the first reconciliation report and the second reconciliation report are generated according to the key hierarchy.

19. The system of claim 18, wherein the instructions further comprise:
determining whether a conflict exists between the first reconciliation report and the second reconciliation report by determining whether a first hash associated with the first settlement client matches a second hash associated with the settlement client;
in response to determining the first hash does not match the second hash, identifying a common set of documents between the first settlement client and the second settlement client; and
identifying differences between common documents by hashing data rows from the common documents into tables and identifying rows that do not match.

\* \* \* \* \*